United States Patent
Inada et al.

(10) Patent No.: US 12,531,501 B2
(45) Date of Patent: Jan. 20, 2026

(54) POWER CONVERSION DEVICE AND DRIVE DEVICE

(71) Applicant: HITACHI ASTEMO, LTD., Hitachinaka (JP)

(72) Inventors: Ryoichi Inada, Tokyo (JP); Nobuyasu Kanekawa, Tokyo (JP); Hiroshi Nakano, Tokyo (JP); Satoru Shigeta, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 149 days.

(21) Appl. No.: 18/555,574

(22) PCT Filed: Feb. 21, 2022

(86) PCT No.: PCT/JP2022/007050
§ 371 (c)(1),
(2) Date: Oct. 16, 2023

(87) PCT Pub. No.: WO2022/230328
PCT Pub. Date: Nov. 3, 2022

(65) Prior Publication Data
US 2024/0204710 A1    Jun. 20, 2024

(30) Foreign Application Priority Data

Apr. 30, 2021 (JP) ................. 2021-078037

(51) Int. Cl.
*H02P 29/028* (2016.01)
*H02P 27/14* (2006.01)
*H02P 29/68* (2016.01)

(52) U.S. Cl.
CPC ............ *H02P 29/028* (2013.01); *H02P 27/14* (2013.01); *H02P 29/68* (2016.02)

(58) Field of Classification Search
CPC ........ H02P 29/028; H02P 27/14; H02P 29/68; H02M 1/0025; H02M 7/53871; H02M 7/53873; H02M 1/325
(Continued)

(56) References Cited

U.S. PATENT DOCUMENTS

| | | | |
|---|---|---|---|
| 8,681,457 B2 * | 3/2014 | Minegishi | B60K 6/365 |
| | | | 318/434 |
| 9,571,026 B2 * | 2/2017 | Agata | H02M 1/32 |
| 10,658,920 B2 * | 5/2020 | He | H02P 27/08 |

FOREIGN PATENT DOCUMENTS

| JP | H05-344738 A | 12/1993 |
|---|---|---|
| JP | H08-111930 A | 4/1996 |

(Continued)

OTHER PUBLICATIONS

Japanese Office Action issued in corresponding JP Application No. 2021-078037, dated Nov. 26, 2024 with English translation (7 pages).

(Continued)

*Primary Examiner* — David Luo
(74) *Attorney, Agent, or Firm* — Foley & Lardner LLP

(57) ABSTRACT

A power conversion device includes a power conversion circuit in which upper and lower arm circuits in which switching elements are connected in series are connected in parallel for at least three phases, a plurality of fuses that are connected in series with the switching elements of the respective phases of the power conversion circuit and blown at a predetermined rated current or more, a short-circuit failure location determination unit that determines a short-circuit failure location of the switching element, and a fuse blowout-time current control unit that controls driving of another switching element different from the switching element so that a current flowing through the switching element determined to be the short-circuit failure location by (Continued)

the short-circuit failure location determination unit becomes equal to or more than the rated current of the fuse.

14 Claims, 28 Drawing Sheets

(58) Field of Classification Search
USPC .................. 318/400.22, 400.21, 400.01, 700
See application file for complete search history.

(56) References Cited

FOREIGN PATENT DOCUMENTS

| | | |
|---|---|---|
| JP | 2001-057782 A | 2/2001 |
| JP | 2005-012951 A | 1/2005 |
| JP | 2007-282313 A | 10/2007 |
| JP | 2011-223788 A | 11/2011 |
| JP | 2021-010257 A | 1/2021 |

OTHER PUBLICATIONS

International Search Report with English Translation and Written Opinion dated Apr. 19, 2022 in corresponding International Application No. PCT/JP2022/007050 (8 pages).

\* cited by examiner

FIG. 4

| CURRENT STATE | OCCURRENCE MATTER | NEXT STATE |
|---|---|---|
| NORMAL STATE | SHORT-CIRCUIT FAILURE LOCATION INFORMATION OF POWER SEMICONDUCTOR ELEMENT IS RECEIVED | POWER SEMICONDUCTOR ELEMENT SHORT-CIRCUIT FAILURE STATE |
| | OTHER THAN ABOVE | NORMAL STATE |
| POWER SEMICONDUCTOR ELEMENT SHORT-CIRCUIT FAILURE STATE | FUSE BLOWOUT SIGNAL IS RECEIVED | STATE AFTER FUSE BLOWOUT |
| | OTHER THAN ABOVE | POWER SEMICONDUCTOR ELEMENT SHORT-CIRCUIT FAILURE STATE |
| STATE AFTER FUSE IS BLOWN | — | STATE AFTER FUSE BLOWOUT |

FIG. 5

| SHORT-CIRCUIT FAILURE LOCATION | U-PHASE TARGET CURRENT | V-PHASE TARGET CURRENT | W-PHASE TARGET CURRENT |
|---|---|---|---|
| U-PHASE UPPER ARM | $I_{fuse} \times 1.8$ | $I_{fuse} \times -0.9$ | $I_{fuse} \times -0.9$ |
| U-PHASE LOWER ARM | $I_{fuse} \times -1.8$ | $I_{fuse} \times 0.9$ | $I_{fuse} \times 0.9$ |
| V-PHASE UPPER ARM | $I_{fuse} \times -0.9$ | $I_{fuse} \times 1.8$ | $I_{fuse} \times -0.9$ |
| V-PHASE LOWER ARM | $I_{fuse} \times 0.9$ | $I_{fuse} \times -1.8$ | $I_{fuse} \times 0.9$ |
| W-PHASE UPPER ARM | $I_{fuse} \times -0.9$ | $I_{fuse} \times -0.9$ | $I_{fuse} \times 1.8$ |
| W-PHASE LOWER ARM | $I_{fuse} \times 0.9$ | $I_{fuse} \times 0.9$ | $I_{fuse} \times -1.8$ |

($I_{fuse}$: FUSE RATED CURRENT)

FIG. 10

| SHORT-CIRCUIT FAILURE LOCATION | U-PHASE TARGET CURRENT | V-PHASE TARGET CURRENT | W-PHASE TARGET CURRENT | NEUTRAL POINT TARGET CURRENT |
|---|---|---|---|---|
| U-PHASE UPPER ARM | $I_{fuse} \times 2.7$ | $I_{fuse} \times -0.9$ | $I_{fuse} \times -0.9$ | $I_{fuse} \times -0.9$ |
| U-PHASE LOWER ARM | $I_{fuse} \times -2.7$ | $I_{fuse} \times 0.9$ | $I_{fuse} \times 0.9$ | $I_{fuse} \times 0.9$ |
| V-PHASE UPPER ARM | $I_{fuse} \times -0.9$ | $I_{fuse} \times 2.7$ | $I_{fuse} \times -0.9$ | $I_{fuse} \times -0.9$ |
| V-PHASE LOWER ARM | $I_{fuse} \times 0.9$ | $I_{fuse} \times -2.7$ | $I_{fuse} \times 0.9$ | $I_{fuse} \times 0.9$ |
| W-PHASE UPPER ARM | $I_{fuse} \times -0.9$ | $I_{fuse} \times -0.9$ | $I_{fuse} \times 2.7$ | $I_{fuse} \times -0.9$ |
| W-PHASE LOWER ARM | $I_{fuse} \times 0.9$ | $I_{fuse} \times 0.9$ | $I_{fuse} \times -2.7$ | $I_{fuse} \times 0.9$ |

($I_{fuse}$: FUSE RATED CURRENT)

FIG. 12

| STATE | U-PHASE CURRENT PHASE | V-PHASE CURRENT PHASE | W-PHASE CURRENT PHASE |
|---|---|---|---|
| AFTER U-PHASE FUSE IS BLOWN | NO (CURRENT DOES NOT FLOW) | −30 DEGREES FROM NORMAL STATE | +30 DEGREES FROM NORMAL STATE |
| AFTER V-PHASE FUSE IS BLOWN | +30 DEGREES FROM NORMAL STATE | NO (CURRENT DOES NOT FLOW) | −30 DEGREES FROM NORMAL STATE |
| AFTER W-PHASE FUSE IS BLOWN | −30 DEGREES FROM NORMAL STATE | +30 DEGREES FROM NORMAL STATE | NO (CURRENT DOES NOT FLOW) |

FIG. 20

| CURRENT STATE | OCCURRENCE MATTER | NEXT STATE |
|---|---|---|
| NORMAL STATE | RECEIVE SHORT-CIRCUIT FAILURE LOCATION INFORMATION OF POWER SEMICONDUCTOR ELEMENT | POWER SEMICONDUCTOR ELEMENT SHORT-CIRCUIT FAILURE STATE |
| | OTHER THAN ABOVE | NORMAL STATE |
| POWER SEMICONDUCTOR ELEMENT SHORT-CIRCUIT FAILURE STATE | RECEIVE UPPER FUSE BLOWOUT SIGNAL | STATE AFTER UPPER FUSE IS BLOWN |
| | RECEIVE LOWER FUSE BLOWOUT SIGNAL | STATE AFTER LOWER FUSE IS BLOWN |
| | OTHER THAN ABOVE | POWER SEMICONDUCTOR ELEMENT SHORT-CIRCUIT FAILURE STATE |
| STATE AFTER UPPER FUSE IS BLOWN | RECEIVE BOTH FUSE BLOWOUT SIGNALS | STATE AFTER BOTH FUSES ARE BLOWN |
| | OTHER THAN ABOVE | STATE AFTER UPPER FUSE IS BLOWN |
| STATE AFTER LOWER FUSE IS BLOWN | RECEIVE BOTH FUSE BLOWOUT SIGNALS | STATE AFTER BOTH FUSES ARE BLOWN |
| | OTHER THAN ABOVE | STATE AFTER LOWER FUSE IS BLOWN |
| STATE AFTER BOTH FUSES ARE BLOWN | --- | STATE AFTER BOTH FUSES ARE BLOWN |

FIG. 27

| CURRENT STATE | OCCURRENCE MATTER | NEXT STATE |
|---|---|---|
| NORMAL STATE | SHORT-CIRCUIT FAILURE LOCATION INFORMATION OF POWER SEMICONDUCTOR ELEMENT IS RECEIVED AND MAXIMUM TEMPERATURE OF POWER SEMICONDUCTOR ELEMENT IN NORMAL PHASE IS EQUAL TO OR MORE THAN THRESHOLD | FUSE BLOWOUT CONTROL STATE BY THROUGH CURRENT |
| | SHORT-CIRCUIT FAILURE LOCATION INFORMATION OF POWER SEMICONDUCTOR ELEMENT IS RECEIVED AND MAXIMUM TEMPERATURE OF POWER SEMICONDUCTOR ELEMENT IN NORMAL PHASE IS LESS THAN THRESHOLD | FUSE BLOWOUT CONTROL STATE BY PHASE CURRENT |
| | OTHER THAN ABOVE | NORMAL STATE |
| FUSE BLOWOUT CONTROL STATE BY THROUGH CURRENT | RECEIVE UPPER FUSE BLOWOUT SIGNAL | STATE AFTER UPPER FUSE IS BLOWN |
| | RECEIVE LOWER FUSE BLOWOUT SIGNAL | STATE AFTER LOWER FUSE IS BLOWN |
| | OTHER THAN ABOVE | FUSE BLOWOUT CONTROL STATE BY THROUGH CURRENT |
| STATE AFTER UPPER FUSE IS BLOWN | RECEIVE BOTH FUSE BLOWOUT SIGNALS | STATE AFTER BOTH FUSES ARE BLOWN |
| | OTHER THAN ABOVE | STATE AFTER UPPER FUSE IS BLOWN |
| STATE AFTER LOWER FUSE IS BLOWN | RECEIVE BOTH FUSE BLOWOUT SIGNALS | STATE AFTER BOTH FUSES ARE BLOWN |
| | OTHER THAN ABOVE | STATE AFTER LOWER FUSE IS BLOWN |
| FUSE BLOWOUT CONTROL STATE BY PHASE CURRENT | RECEIVE BOTH FUSE BLOWOUT SIGNALS | STATE AFTER BOTH FUSES ARE BLOWN |
| | OTHER THAN ABOVE | FUSE BLOWOUT CONTROL STATE BY PHASE CURRENT |
| STATE AFTER BOTH FUSES ARE BLOWN | — | STATE AFTER BOTH FUSES ARE BLOWN |

POWER CONVERSION DEVICE AND DRIVE DEVICE

TECHNICAL FIELD

The present invention relates to a power conversion device and a drive device.

BACKGROUND ART

When a short-circuit failure occurs in a switching element constituting an inverter, current of a failure phase cannot be controlled, and there is a possibility that a motor output torque becomes excessive or winding burnout of a motor is caused. Therefore, a technique is known in which a current of a failure phase at the time of a short-circuit failure is cut off using a fuse or the like.

PTL 1 describes an invention of a power conversion device in which a fuse is provided between a DC power supply and an inverter circuit, and when a failure of a switching element in the inverter circuit is detected, a switching element arranged in series with the failed switching element is turned on to cause a short-circuit current to flow, and the fuse is blown.

CITATION LIST

Patent Literature

PTL 1: JP 2005-12951 A

SUMMARY OF INVENTION

Technical Problem

In the power conversion device described in PTL 1, a switching element arranged in series with a failed switching element is turned on to generate a short-circuit current, and a fuse arranged between a DC power supply and an inverter circuit is blown, for the purpose of preventing co-failure at the time of switching element failure. In this configuration, a current flows through the switching elements of the respective phases via the same fuse, and when a short-circuit failure occurs in any of the switching elements, fuses corresponding to all the switching elements are blown regardless of the failure location. As a result, since the power cannot be supplied to the inverter circuit after the fuse is blown, the load cannot be driven after the failure occurs.

Solution to Problem

According to an aspect of the present invention, there is provided a power conversion device including: a power conversion circuit in which upper and lower arm circuits in which switching elements are connected in series are connected in parallel for at least three phases; a plurality of fuses that are connected in series with the switching elements of the respective phases of the power conversion circuit and blown at a predetermined rated current or more; a short-circuit failure location determination unit that determines a short-circuit failure location of the switching element; and a fuse blowout-time current control unit that controls driving of another switching element different from the switching element so that a current flowing through the switching element determined to be the short-circuit failure location by the short-circuit failure location determination unit becomes equal to or more than the rated current of the fuse.

According to another aspect of the present invention, there is provided a drive device including: a power conversion device that outputs a three-phase alternating current; and a rotating electrical machine that is driven by the three-phase alternating current, in which the power conversion device includes a power conversion circuit in which upper and lower arm circuits in which switching elements are connected in series are connected in parallel for at least three phases, a plurality of fuses that are connected in series with the switching elements of the respective phases of the power conversion circuit and blown at a predetermined rated current or more, a short-circuit failure location determination unit that determines a short-circuit failure location of the switching element, and a fuse blowout-time current control unit that controls driving of another switching element different from the switching element so that a current flowing through the switching element determined to be the short-circuit failure location by the short-circuit failure location determination unit becomes equal to or more than the rated current of the fuse.

Advantageous Effects of Invention

When a short-circuit failure occurs in a switching element, a fuse at a failure location can be reliably blown.

BRIEF DESCRIPTION OF DRAWINGS

FIG. 4 is a table illustrating internal state determination of a state determination unit 19.

FIG. 5 illustrates a setting example of a target current value 14a of each phase when a fuse is blown.

FIG. 10 illustrates a setting example of a target current value 142a of each phase and a neutral point when a fuse is blown.

FIG. 12 illustrates a current phase of remaining two phases after a fuse is blown.

FIG. 20 is a table illustrating internal state determination of a state determination unit 194.

FIG. 27 is a table illustrating internal state determination of the state determination unit 197.

DESCRIPTION OF EMBODIMENTS

Figure 1:
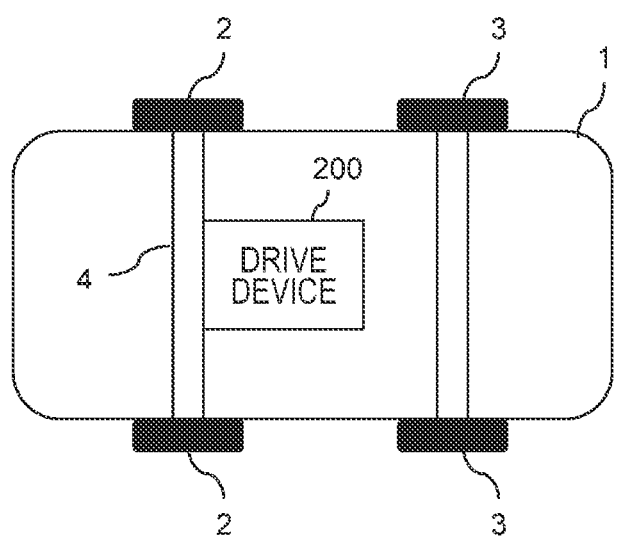
FIG. 1 illustrates an example of a vehicle 1 on which a drive device 200 is mounted.

FIG. 1 is a diagram illustrating an example of a vehicle on which a drive device of the present invention is mounted. A vehicle 1 illustrated in FIG. 1 includes driving wheels 2 and non-driving wheels 3, and is equipped with a drive device 200. The drive device 200 is connected to an axle 4 having the driving wheels 2 attached to both ends thereof, and includes a power conversion device 100 and a motor 190 (see FIG. 2) therein. Then, in accordance with operation of an accelerator pedal by a driver, the power conversion device 100 and the motor 190 are controlled to generate a driving force, and the driving force is transmitted to the axle 4. Thus, the driving wheels 2 are driven to cause the vehicle 1 to travel. In addition, a speed reducer may be disposed in the drive device, and the driving force of the motor 190 may be transmitted to the axle 4 via the speed reducer.

In FIG. 1, a front wheel of the vehicle 1 is the driving wheel 2, a rear wheel is the non-driving wheel 3, and the drive device 200 is connected to the axle 4 on the front wheel side. However, the drive device 200 may be connected to the axle on the rear wheel side with the rear wheel as the driving wheel. In addition, the drive device 200 may be connected to each axle using all the front and rear wheels as driving wheels, or independent drive devices 200 may be installed and connected to the left and right driving wheels instead of the axle.

Next, embodiments of the power conversion device 100 and the drive device 200 will be described below.

First Embodiment

Figure 2:
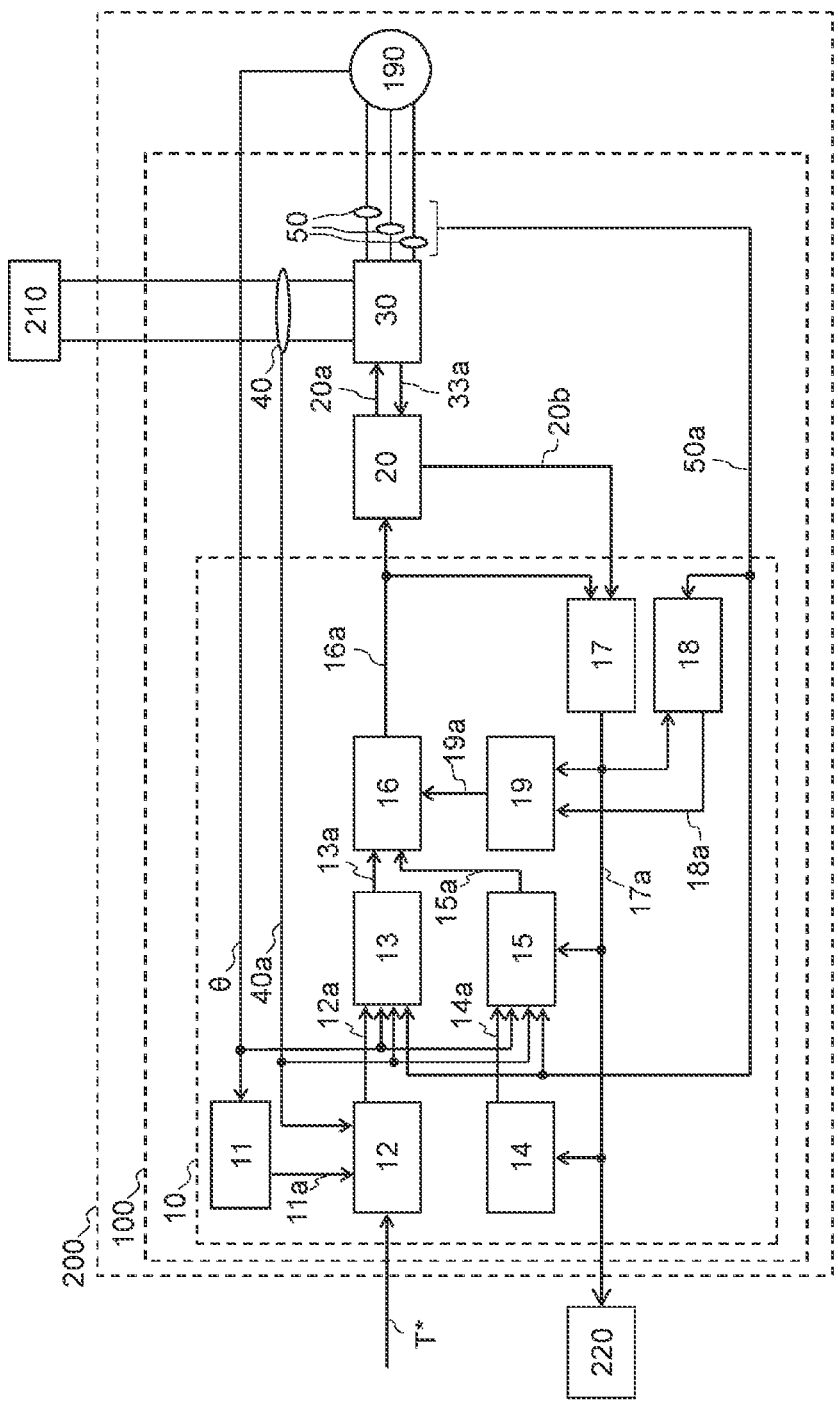
FIG. 2 illustrates a configuration example of a power conversion device 100 and a drive device 200.

FIG. 2 is a diagram illustrating a configuration example of the power conversion device 100 and the drive device 200 in the present embodiment. In the present embodiment, an example of a power conversion device and a drive device that blows only a fuse of a failure phase without blowing a fuse of a normal phase when a short-circuit failure occurs in a power semiconductor will be described.

The drive device 200 includes the power conversion device 100 and the motor 190. The motor 190 is a three-phase motor having three windings therein, and corresponds to, for example, a synchronous motor using a permanent magnet or an induction motor not using a permanent magnet. An angle sensor (not illustrated) for measuring an electric angle of the motor is mounted on the motor 190, and the angle sensor outputs the measured electric angle to the power conversion device 100 as an angle sensor value θ.

An electronic control unit (not illustrated), a DC power supply 210, and an abnormality notification device 220 are provided around the drive device. The electronic control unit notifies the drive device 200 of information such as target torque. The DC power supply 210 is a power supply for driving the motor 190, and corresponds to, for example, a battery. The abnormality notification device 220 receives a failure notification signal from the drive device 200 and notifies the passenger of occurrence of the failure. Examples of a failure notification method include a method of turning on a lamp, a method of generating a warning sound, and a method of notifying by voice.

The power conversion device 100 converts DC power obtained from the DC power supply 210 into AC power to drive the motor 190. The power conversion device 100 also has a function of converting power of the motor 190 into DC power to charge the DC power supply 210. The power conversion device 100 includes a control circuit 10, a driver circuit 20, a power conversion circuit 30, a voltage sensor 40, and an AC current sensor 50 therein. The power conversion circuit 30 receives a drive signal 20a from the driver circuit 20, drives the internal power semiconductor, and controls the current flowing through the motor 190. The internal configuration of the power conversion circuit 30 will be described first with reference to FIG. 3, and the internal configuration and other configurations of the control circuit 10 will be described later.

Figure 3:
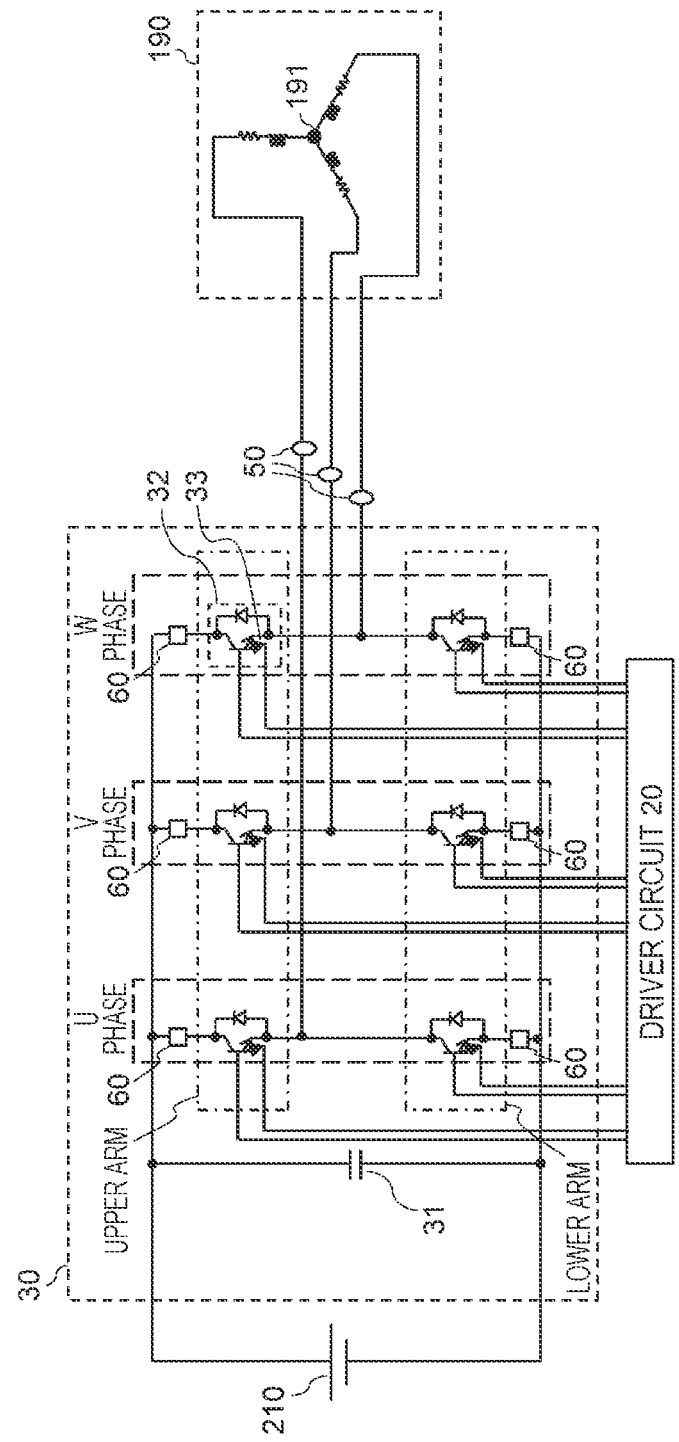
FIG. 3 is a configuration example of a power conversion circuit 30 and a motor 190.

FIG. 3 is a diagram illustrating a configuration example of the power conversion circuit 30 and the motor 190 in the present embodiment. The power conversion circuit 30 includes a smoothing capacitor 31, six power semiconductor elements 32, and six fuses 60 therein.

The smoothing capacitor 31 is a capacitor for smoothing the current generated by turning on/off the power semiconductor element 32 and suppressing ripple of the DC current supplied from the DC power supply 210 to the power conversion circuit 30. As the smoothing capacitor 31, for example, an electrolytic capacitor or a film capacitor is used.

The power semiconductor element 32 is a switching element that switches on/off according to a drive signal 20a input from the driver circuit 20, and converts DC power and AC power. The power semiconductor element 32 corresponds to, for example, a power metal oxide semiconductor field effect transistor (MOSFET), an insulated gate bipolar transistor (IGBT), or the like. In addition, the power semiconductor element 32 of the present embodiment includes a sense terminal 33. From the sense terminal 33, a current of a certain ratio, for example, $1/100$ or $1/1000$ of the current flowing between the collector and the emitter (between the drain and the source) of the power semiconductor element 32 is output as the sense current. The sense current is output from the power conversion circuit 30 to the driver circuit 20. In the following embodiments, examples in which an IGBT is used as the power semiconductor element 32 will be described.

The six power semiconductor elements 32 are divided into upper and lower two for each phase, and the output is connected to the winding of each phase of the motor 190. In the present embodiment, the upper three power semiconductor elements 32 are collectively referred to as an upper arm, and the lower three power semiconductor elements 32 are collectively referred to as a lower arm. That is, the power conversion circuit 30 is provided with upper and lower arm circuits in which the two power semiconductor elements 32 of the upper and lower arms are connected in series for each phase (U-phase, V-phase, W-phase) of the motor 190. The power conversion circuit 30 includes wires connected to a positive electrode side and a negative electrode side of the DC power supply 210, and upper and lower arm circuits of each phase are connected in parallel between the wires.

In the present embodiment, a motor neutral point 191 is in a floating state, but may be connected to the ground (not illustrated). Methods for connecting the motor neutral point 191 to the ground include a direct grounding method, a resistance grounding method, a compensation reactor grounding method, an arc-extinguishing reactor grounding method, and the like.

The six fuses 60 are arranged in series with the six power semiconductor elements 32. Each fuse 60 is blown when a current equal to or more than a fuse rated current flows for a certain period of time or more, and disconnects the wire on a plus side or a minus side of the DC power supply 210 and an output line connected to the winding of each phase of the motor 190.

In the following description, the fuse 60 corresponding to each power semiconductor element 32 of the upper arm may be referred to as an "upper arm fuse", and the fuse 60 corresponding to each power semiconductor element 32 of the lower arm may be referred to as a "lower arm fuse".

In the present embodiment, the fuse 60 is disposed between the power semiconductor element 32 and the wire on the plus side or the minus side of the DC power supply 210, but the fuse 60 may be disposed between the power semiconductor element 32 and the output line of each phase. The fuse 60 may be disposed at any position as long as the fuse 60 is connected in series with the power semiconductor elements 32 of the respective phases and can cut off the current flowing from the DC power supply 210 to the windings of the respective phases by blowing the fuse when a short-circuit failure occurs in the power semiconductor elements 32. That is, in the upper and lower arm circuits of each phase, when the upper arm fuse is connected in series with the power semiconductor element 32 of the upper arm between the wire on the plus side of the DC power supply 210 and the output line to the motor 190, and the lower arm fuse is connected in series with the power semiconductor element 32 of the lower arm between the wire on the minus side of the DC power supply 210 and the output line to the motor 190, the fuse 60 can be arranged at an arbitrary position.

In addition, in this embodiment, the fuse 60 is used for current cut off when the power semiconductor element 32 is short-circuited, but for example, a bus bar, wire bonding, or the like that is blown when a current of a certain level or more flows may be used instead of the fuse. In general, when a fuse is used, it is possible to easily design a circuit having a desired blowout time at the time of a short-circuit failure of the power semiconductor element 32. Meanwhile, in a case where a bus bar or wire bonding is used, an additional element called a fuse is not required, and thus it is excellent in terms of cost and size.

Returning to FIG. 2, the configuration of the present embodiment will be described. The voltage sensor 40 is a sensor that measures the output voltage of the DC power supply 210, and outputs the measured voltage value as a voltage sensor value 40a to the control circuit 10.

The AC current sensor 50 is a sensor that measures an AC current flowing through each phase (U-phase, V-phase, W-phase) of the motor 190, and outputs the measured AC current of each phase as an AC current value 50a to the control circuit 10. In the present embodiment, a total of three AC current sensors 50 are provided for each phase, but the AC current sensors may be provided for only two phases. In this case, since the relationship of U-phase current+V-phase current+W-phase current=0 holds, the control circuit 10 calculates the AC current sensor value for the remaining one phase by calculation. In the present embodiment, the current flowing from the power conversion circuit 30 to the motor 190 is treated as a positive current, and the current flowing from the motor 190 to the power conversion circuit 30 is treated as a negative current.

The driver circuit 20 receives a pulse width modulation (PWM) signal 16a output from a PWM signal generation unit 16 to be described later, and outputs the drive signal 20a for switching on/off of the power semiconductor element 32. In addition, the driver circuit 20 detects the occurrence of a short-circuit failure in the power semiconductor element 32 using a sense current 33a output from the power semiconductor element 32, and outputs a short-circuit failure detection signal 20b to the control circuit 10.

Normally, the PWM signal 16a is generated so that the upper and lower power semiconductor elements 32 are not simultaneously turned on. However, when a short-circuit failure occurs in the power semiconductor element 32, the upper and lower power semiconductor elements 32 can be simultaneously turned on. When the upper and lower power semiconductor elements 32 are simultaneously turned on, a large through current flows through the power semiconductor element 32. The driver circuit 20 monitors whether the sense current 33a of each power semiconductor element 32 is equal to or more than a certain threshold value, and determines that a short-circuit failure occurs in the power semiconductor element 32 in the corresponding phase when the sense current 33a is equal to or more than the certain value. The driver circuit 20 outputs the short-circuit failure detection signal 20b divided for each phase.

In the present embodiment, the short-circuit failure of the power semiconductor element 32 is determined using the sense current 33a of the power semiconductor element 32, but the short-circuit failure of the power semiconductor element 32 may be detected by another method. For example, there is a method in which a shunt resistor for current measurement is disposed on the collector side or the emitter side of the power semiconductor element 32, and a current value flowing through the shunt resistor is measured to detect a short-circuit failure of the power semiconductor element 32. In addition, since the collector-emitter voltage of the power semiconductor element 32 increases according to the flowing current, there is also a method of measuring the collector-emitter voltage to detect a short-circuit failure of the power semiconductor element 32.

The control circuit 10 communicates with an external electronic control unit (not illustrated), and receives a target torque T* of the motor 190 from the electronic control unit. When the power conversion device 100 is normal, the control circuit 10 outputs the PWM signal 16a so as to control the current of each phase output from the power conversion device 100 to a predetermined value based on the target torque T*, and drives the power conversion circuit 30 via the driver circuit 20. When determining that a failure has occurred in the power conversion device 100, the control circuit 10 outputs an abnormality notification signal to the external abnormality notification device 220.

The control circuit 10 internally includes a CPU, a RAM, a ROM, and a communication circuit (all not illustrated). The ROM may be an electrically erasable programmable ROM (EEPROM) or a flash ROM that is electrically rewritable. In addition, the control circuit 10 may include a logic circuit configured using hardware such as a field programmable gate array (FPGA).

The control circuit 10 also includes functional blocks of a motor speed calculation unit 11, a torque control-time target current calculation unit 12, a torque control-time current control unit 13, a fuse blowout-time target current calculation unit 14, a fuse blowout-time current control unit 15, a PWM signal generation unit 16, a short-circuit failure location determination unit 17, a fuse blowout determination unit 18, and a state determination unit 19. These functional blocks may be realized, for example, by the CPU executing a predetermined program in the control circuit 10, or some or all of them may be realized by hardware such as an FPGA.

The motor speed calculation unit 11 calculates a motor rotation speed from change in an angle sensor value θ of the motor, and outputs a calculated motor speed value 11a to the torque control-time target current calculation unit 12.

The torque control-time target current calculation unit 12 uses the target torque T*, the voltage sensor value 40a, and the motor speed value 11a output from the motor speed calculation unit 11 to output the target current value 12a to the torque control-time current control unit 13. The target current value 12a is calculated as a current value to be supplied to the motor 190 in order for the motor 190 to output the same torque as the target torque T*. The target current value 12a is expressed in the form of, for example, a d-axis target current value and a q-axis target current value.

The torque control-time current control unit 13 calculates a duty value 13a of each phase using the target current value 12a and the motor angle sensor value θ output by the torque control-time target current calculation unit 12, the AC current sensor value 50a of each phase, and the voltage sensor value 40a, and outputs the duty value 13a to the PWM signal generation unit 16.

The fuse blowout-time target current calculation unit 14 determines a target current of each phase at the time of fuse blowout control based on the short-circuit failure location information 17a of the power semiconductor element 32 output from the short-circuit failure location determination unit 17, and outputs the target current value 14a to the fuse blowout-time current control unit 15. Details of a method for determining the target current value 14a will be described later.

The fuse blowout-time current control unit 15 calculates the duty value 15a of each phase using the target current value 14a and the motor angle sensor value θ output from the fuse blowout-time target current calculation unit 14, the AC current sensor value 50a and the voltage sensor value 40a of each phase, and the short-circuit failure location information 17a of the power semiconductor element 32, and outputs the calculated duty value to the PWM signal generation unit 16.

The PWM signal generation unit 16 switches a signal to be output to the driver circuit 20 according to an internal state 19a output from the state determination unit 19. The PWM signal generation unit 16 includes a timer therein, and when the internal state 19a is the "normal state", the PWM signal generation unit 16 outputs the PWM signal 16a to the driver circuit 20 using the timer value and the duty 13a of each phase output by the torque control-time current control unit 13. When the internal state 19a is a "power semiconductor element short-circuit failure state" to be described later, the PWM signal generation unit 16 outputs the PWM signal 16a to the driver circuit 20 using the timer value and the duty 15a of each phase output by the fuse blowout-time current control unit 15. When the internal state 19a is a "state after fuse blowout" to be described later, the PWM signal generation unit 16 outputs a PWM signal 16a that does not drive the motor 190 to the driver circuit 20. Examples of the state in which the motor 190 is not driven include a state (referred to as a free wheel state in the present embodiment) in which all the six power semiconductor elements 32 in the power conversion circuit 30 are turned off.

The short-circuit failure location determination unit 17 determines the short-circuit failure location of the power semiconductor element 32 based on the PWM signal 16a and the short-circuit failure detection signal 20b output from the driver circuit 20. Since the short-circuit failure detection signal 20b output from the driver circuit 20 is divided for each phase, it is possible to specify in which phase the failure has occurred, but it is not possible to specify which of the upper and lower arms has failed. Therefore, it is determined that the short-circuit failure has occurred in the arm in which the short-circuit failure detection signal 20b is in the OFF state among the PWM signals 16a of the upper and lower arms in the phase in which the failure has occurred by comparing the timing when the short-circuit failure detection signal 20b is output with the state of the PWM signal 16a. This is because the upper and lower power semiconductor elements 32 are not normally simultaneously turned on, and thus, it is considered that the short-circuit failure of the power semiconductor element 32 is detected because the short-circuit failure occurs in the power semiconductor element 32 originally supposed to be in the OFF state, and the upper and lower power semiconductor elements 32 are simultaneously turned on. The short-circuit failure location determination unit 17 outputs the short-circuit failure location information 17a of the power semiconductor element 32 to the fuse blowout-time target current calculation unit 14, the fuse blowout-time current control unit 15, the fuse blowout determination unit 18, the state determination unit 19, and the external abnormality notification device 220.

The fuse blowout determination unit 18 determines whether the fuse 60 of the failure phase is blown based on the short-circuit failure location information 17a output from the short-circuit failure location determination unit 17 and the AC current sensor value 50a of each phase, and outputs a fuse blowout determination signal 18a to the state determination unit 19. When the short-circuit failure of the power semiconductor element 32 is detected, the control circuit 10 controls the current of each phase so as to blow the fuse 60 at the failure location. Therefore, a current exceeding the rated current of the fuse 60 flows through the failure phase, but when the fuse 60 at the failure location is blown, no current flows through the failure phase. The fuse blowout determination unit 18 monitors the AC current sensor value 50a of the phase in which the short-circuit failure has occurred, and determines that the fuse 60 at the failure location is blown when the state in which the absolute value of the AC current sensor value 50a is less than the threshold is continued for a certain period of time or more.

The state determination unit 19 determines whether the state of the power conversion device 100 is any one of the "normal state", the "power semiconductor element short-circuit failure state", and the "state after fuse blowout" based on the short-circuit failure location information 17a of the power semiconductor element 32 output from the short-circuit failure location determination unit 17 and the fuse blowout determination signal 18a output from the fuse blowout determination unit 18. Then, the current state (19a) is output to the PWM signal generation unit 16.

FIG. 4 is a table illustrating the internal state determination of the state determination unit 19 in the present embodiment. The state determination unit 19 determines the next state from a current state and an occurrence matter at regular time intervals, and updates the next state to the current state.

The initial state is the "normal state". First, in a case where the current state is the "normal state", upon receiving the short-circuit failure location information 17a on the power semiconductor element 32 from the short-circuit failure location determination unit 17, the state determination unit 19 changes the next state to the "power semiconductor element short-circuit failure state". Otherwise, the next state remains in the "normal state". When receiving the fuse blowout determination signal 18a from the fuse blowout determination unit 18 while the current state is the "power semiconductor element short-circuit failure state", the state determination unit 19 changes the next state to the "state after fuse blowout". Otherwise, the next state remains the "power semiconductor element short-circuit failure state". When the current state is the "state after fuse blowout", the state determination unit 19 keeps the next state as the "state after fuse blowout".

In the current control at the time of torque control, first, the d-axis target current value and the q-axis target current value according to the target torque T* are determined in the torque control-time target current calculation unit 12 illustrated in FIG. 2. Next, the torque control-time current control unit 13 calculates the duty value 13a of each phase that achieves the d-axis target current value and the q-axis target current value determined by the torque control-time target current calculation unit 12. Then, the PWM signal generation unit 16 generates the PWM signal 16a of each phase according to the duty value 13a of each phase calculated by the torque control-time current control unit 13.

The torque control-time current control unit 13 converts the three-phase AC current sensor values 50a output from the AC current sensor 50 into d-axis and q-axis current values using Expression 1. Iu, Iv, and Iw in [Expression 1] are U-phase, V-phase, and W-phase AC current sensor values, respectively, and θ is an angle sensor value. In addition, Id represents a d-axis current value after conversion, and Iq represents a q-axis current value after conversion.

$$\begin{bmatrix} I_d \\ I_q \end{bmatrix} = \sqrt{\frac{2}{3}} \begin{bmatrix} \cos(\theta) & \cos\left(\theta - \frac{2}{3}\pi\right) & \cos\left(\theta + \frac{2}{3}\pi\right) \\ -\sin(\theta) & -\sin\left(\theta - \frac{2}{3}\pi\right) & -\sin\left(\theta + \frac{2}{3}\pi\right) \end{bmatrix} \begin{bmatrix} I_u \\ I_v \\ I_w \end{bmatrix}$$ [Expression 1]

Next, the torque control-time current control unit 13 obtains a difference between the d-axis current and the d-axis target current value and a difference between the q-axis current and the q-axis target current value. The torque control-time current control unit 13 performs feedback control on the d-axis current difference and the q-axis current difference to determine the d-axis target voltage value and the q-axis target voltage value. The torque control-time current control unit 13 converts the d-axis target voltage value and the q-axis target voltage value into the form of the α-axis target voltage value and the β-axis target voltage value using [Expression 2] so as to be the values of the α-axis and the β-axis. In [Expression 2], Vd is the d-axis target voltage value, Vq is the q-axis target voltage value, θ is the angle sensor value, Vα is a α-axis target voltage value, and Vβ is a β-axis target voltage value.

$$\begin{bmatrix} V_\alpha \\ V_\beta \end{bmatrix} = \begin{bmatrix} \cos\theta & -\sin\theta \\ \sin\theta & \cos\theta \end{bmatrix} \begin{bmatrix} V_d \\ V_q \end{bmatrix}$$ [Expression 2]

Then, the torque control-time current control unit 13 converts the a-axis target voltage value and the β–axis target voltage value into target voltage values of the U phase, the V phase, and the W phase using [Expression 3]. In [Expression 3], Vα is an α-axis target voltage value, Vβ is a β-axis target voltage value, Vu is a U-phase target voltage value, Vv is a V-phase target voltage value, and Vw is a W-phase target voltage value.

$$\begin{bmatrix} V_u \\ V_v \\ V_w \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} V_\alpha \\ V_\beta \end{bmatrix}$$ [Expression 3]

Finally, the torque control-time current control unit 13 calculates the duty value 13a of each phase from the target voltage value of each phase and the voltage sensor value 40a.

In the current control when the fuse is blown, first, a target current value 14a (U-phase target current value (Iu), V-phase target current value (Iv), W-phase target current value (Iw)) of each phase when the fuse is blown is determined in the fuse blowout-time target current calculation unit 14. Then, the target current value 14a of each phase is converted into the d-axis target current value (Id) and the q-axis target current value (Iq) using the conversion formula of [Expression 1]. This conversion can be performed by setting Iu as a U-phase target current value, Iv as a V-phase target current value, Iw as a W-phase target current value, Id as a d-axis current target value, and Iq as a q-axis target current value in the conversion expression of [Expression 1].

Next, the fuse blowout-time current control unit 15 calculates the duty value 15a of each phase that achieves the d-axis target current value and the q-axis target current value determined by the fuse blowout-time target current calculation unit 14. The PWM signal generation unit 16 generates the PWM signal 16a of each phase according to the duty value 15a of each phase calculated by the fuse blowout-time current control unit 15.

FIG. 5 is a setting example of the target current value 14a of each phase when the fuse is blown. In the fuse blowout control, when a short-circuit failure occurs in the power semiconductor element 32 of a certain phase, a current equal to or more than a fuse rated current is controlled to flow in the failure phase. Therefore, the target current value 14a of the failure phase is set such that the absolute value of the target current value becomes equal to or more than the fuse rated current. The target current value 14a of each phase is set so as to satisfy the U-phase target current value+the V-phase target current value+the W-phase target current value=0.

When the short-circuit failure occurs in the power semiconductor element 32 of the upper arm, the current in the failure phase easily flows from the power conversion circuit 30 toward the motor 190, so that the fuse blowout-time target current calculation unit 14 sets the target current value in the failure phase to a positive value. On the other hand, when the short-circuit failure occurs in the power semiconductor element 32 of the lower arm, the current of the failure phase easily flows from the motor 190 toward the power conversion circuit 30, and thus the fuse blowout-time target current calculation unit 14 sets the target current value of the failure phase to a negative value.

The target current value of the normal phase may be set to the fuse rated current or higher, or may be set to less than the fuse rated current. When the target current value of the normal phase is set to be less than the fuse rated current, it is possible to prevent the fuse of the normal phase from being erroneously blown. When the target current value of the normal phase is set to be equal to or more than the fuse rated current, there is a possibility that the fuse of the normal phase is erroneously blown. However, even in this case, when the target current value flowing to the failure phase and the target current value flowing to the normal phase are adjusted, the fuse of the failure phase can be blown earlier than the fuse of the normal phase is blown. In addition, when the target current value of the normal phase is set to be equal to or more than the fuse rated current, the value of the target current flowing to the failure phase can be increased, so that the fuse of the failure phase can be more quickly blown.

In view of the above, in the example of FIG. 5, in the event of a U-phase upper arm short-circuit failure, the target current value 14a for the U phase is set to 1.8 times the fuse rated current, and the target current values 14a for the V phase and the W phase are set to −0.9 times the fuse rated current.

The reason why the target current values 14a of the V phase and the W phase are set to −0.9 times the fuse rated current instead of −1.0 times is that the current actually flowing may exceed the target current value in the process of control, and thus the target current value is set slightly lower in anticipation of this. The control error is not necessarily 0.1 times the fuse rated current.

Similarly, in the event of a U-phase lower arm short-circuit failure, the target current value 14a for the U phase is set to −1.8 times the fuse rated current, and the target current values 14a for the V phase and the W phase are set to 0.9 times the fuse rated current.

In the event of a V-phase upper arm short-circuit failure, the V-phase target current value 14a is set to 1.8 times the fuse rated current, and the U-phase and W-phase target current values 14a are set to −0.9 times the fuse rated current. In the event of a V-phase lower arm short-circuit failure, the target current value 14a for the V phase is set to −1.8 times the fuse rated current, and the target current values 14a for the U phase and the W phase are set to 0.9 times the fuse rated current.

In the event of a W-phase upper arm short-circuit failure, the W-phase target current value 14a is set to 1.8 times the fuse rated current, and the U-phase and V-phase target current values 14a are set to −0.9 times the fuse rated current. In the event of a W-phase lower arm short-circuit failure, the target current value 14a for the W-phase is set to −1.8 times the fuse rated current, and the target current values 14a for the U-phase and V-phase are set to 0.9 times the fuse rated current.

In FIG. 5, the normal two-phase target current values 14a are set to the same value and in the same direction, but it is not always necessary to set the same value and the target current value 14a in the same direction. However, when the normal two-phase target current values 14a are set in the same direction and the absolute values of the normal two-phase target current values 14a are increased, the absolute value of the failure phase target current value 14a can be further increased. As a result, a large current can flow through the failure phase, and the fuse 60 in the failure phase can be blown in a shorter time.

The duty value calculation in the fuse blowout-time current control unit 15 is basically performed in the same procedure as the torque control-time current control unit 13. However, this differs from the torque control-time current control unit 13 in two points. One of them is to perform control so that the power semiconductor elements 32 on the upper and lower opposite sides of the same phase as that of the power semiconductor element 32 in which a short-circuit failure has occurred are turned off.

When the power semiconductor elements 32 on the upper and lower opposite sides of the same phase as that of the power semiconductor element 32 in which the short-circuit failure has occurred are turned on, a through current flows between the power modules on the upper and lower sides of the failure phase, and the fuse 60 corresponding to the power semiconductor element 32 on the upper and lower sides opposite to the failed power semiconductor element 32 may be erroneously blown. In order to prevent this, in the present embodiment, the power semiconductor elements 32 on the upper and lower opposite sides of the same phase as that of the power semiconductor element 32 in which a short-circuit failure has occurred are turned off.

Another difference is that the target voltage is corrected by a conversion portion from the α-axis target voltage value (Vα) and the β-axis target voltage value (Vβ) to the U-phase target voltage value (Vu), the V-phase target voltage value (Vv), and the W-phase target voltage value (Vw).

For example, assuming that the voltage of the DC power supply 210 is Vdc when a short-circuit failure occurs in the power semiconductor element 32 of the U-phase upper arm and the power semiconductor element 32 of the U-phase lower arm is turned off, the voltage output from the U-phase upper and lower arm circuits is fixed at ½·Vdc. In addition, for example, when a short-circuit failure occurs in the power semiconductor element 32 of the U-phase lower arm and the power semiconductor element 32 of the U-phase upper arm is turned off, the voltage output from the U-phase upper and lower arm circuits is fixed at −½·Vdc. Therefore, even when the normal U-phase, V-phase, and W-phase target voltages are converted, the power conversion circuit 30 cannot output a voltage according to the target voltage. Therefore, it is necessary to calculate the target voltages of the remaining two phases in consideration of the difference between the output voltages of the failure phases so that voltages corresponding to the α-axis target voltage value (Vα) and the β-axis target voltage value (Vβ) that are the same as those before the occurrence of the failure can be output even after the occurrence of the failure.

When the short-circuit failure occurs in the U-phase power semiconductor element 32, the target voltage values of the V phase and the W phase are calculated by [Expression 4]. Here, when the voltage of the DC power supply 210 is Vdc, the value of the U-phase target voltage value (Vu) is set to ½·Vdc when the power semiconductor element 32 of the U-phase upper arm has a short-circuit failure, and is set to −½·Vdc when the power semiconductor element 32 of the U-phase lower arm has a short-circuit failure. By setting the U-phase target voltage value in this manner, control is performed such that the power semiconductor element 32 on the side where the U-phase short-circuit failure has occurred is always turned on, and the power semiconductor element 32 on the side where the U-phase short-circuit failure has not occurred is always turned off.

$$V_v = -\sqrt{\frac{3}{2}} V_\alpha + \frac{1}{\sqrt{2}} V_\beta + V_u \qquad \text{[Expression 4]}$$

-continued $$V_w = -\sqrt{\frac{3}{2}} V_\alpha + \frac{1}{\sqrt{2}} V_\beta + V_u$$

When the short-circuit failure occurs in the V-phase power semiconductor element 32, the target voltage values of the U phase and the W phase are calculated by [Expression 5]. Here, when the voltage of the DC power supply 210 is Vdc, the value of the V-phase target voltage value (Vv) is set to ½·Vdc when the power semiconductor element 32 of the V-phase upper arm has a short-circuit failure, and is set to −½·Vdc when the power semiconductor element 32 of the V-phase lower arm has a short-circuit failure. By setting the V-phase target voltage value in this manner, control is performed such that the power semiconductor element 32 on the side where the V-phase short-circuit failure has occurred is always turned on, and the power semiconductor element 32 on the side where the V-phase short-circuit failure has not occurred is always turned off.

$$V_u = \sqrt{\frac{3}{2}} V_\alpha - \frac{1}{\sqrt{2}} V_\beta + V_v \quad \text{[Expression 5]}$$

$$V_w = -\sqrt{2} V_\beta + V_v$$

When the short-circuit failure occurs in the W-phase power semiconductor element 32, the target voltage values of the U phase and the V phase are calculated by [Expression 6]. Here, when the voltage of the DC power supply 210 is Vdc, the value of the W-phase target voltage value (Vw) is set to ½·Vdc when the power semiconductor element 32 of the W-phase upper arm has a short-circuit failure, and is set to −½·Vdc when the power semiconductor element 32 of the W-phase lower arm has a short-circuit failure. By setting the W-phase target voltage value in this manner, the power semiconductor element 32 on the side where the W-phase short-circuit failure has occurred is controlled to always be in the ON state, and the power semiconductor element 32 on the side where the W-phase short-circuit failure has not occurred is controlled to always be in the OFF state.

$$V_u = \sqrt{\frac{3}{2}} V_\alpha + \frac{1}{\sqrt{2}} V_\beta + V_w \quad \text{[Expression 6]}$$

$$V_v = \sqrt{2} V_\beta + V_w$$

Figure 6:
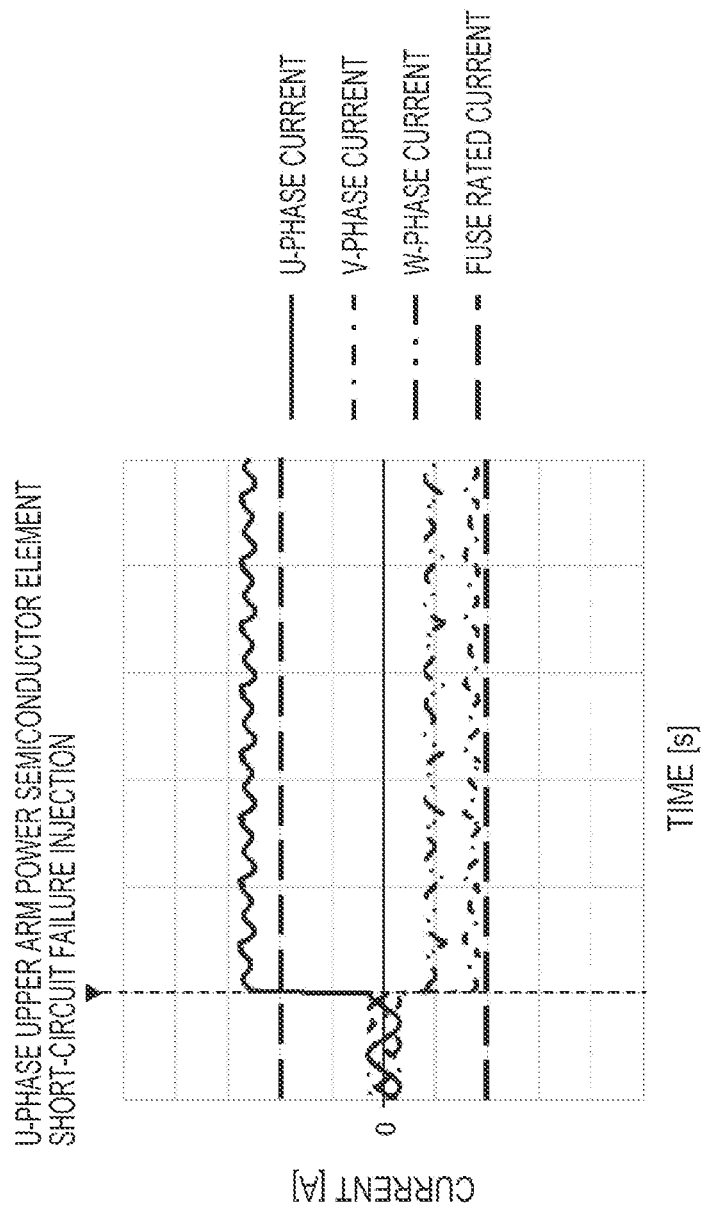
FIG. 6 illustrates an example of a current waveform at the time of fuse blowout control.

FIG. 6 is a diagram illustrating an example of a current waveform during the fuse blowout control according to the present embodiment. In the example of FIG. 6, when a short-circuit failure occurs in the power semiconductor element 32 of the U-phase upper arm, the U-phase target current value is set to 1.4 times the fuse rated current, the V-phase target current value is set to −0.9 times the fuse rated current, and the W-phase target current value is set to −0.5 times the fuse rated current. In the example of FIG. 6, the current flowing through each phase is substantially the same as the target current value, and the current value of the failed U-phase is controlled to be equal to or more than the fuse rated current, and the normal V-phase and W-phase currents are controlled to be less than the fuse rated current.

In the example illustrated in FIG. 6, in order to describe the fuse blowout control after the occurrence of the short-circuit failure in the power semiconductor element, the fuse blowing-time current continues to flow even after the occurrence of the short-circuit failure. However, actually, the U-phase fuse is blown after a predetermined time elapses after the current equal to or more than the fuse rated current starts to flow in the U-phase, and the state shifts to the free wheel state. In addition, the current waveforms of the V-phase current and the W-phase current are set to different target current values so as not to overlap with each other in the drawing, but as a matter of course, the target current value may be set as in the example illustrated in FIG. 5, or may be set to another value.

Figure 7:
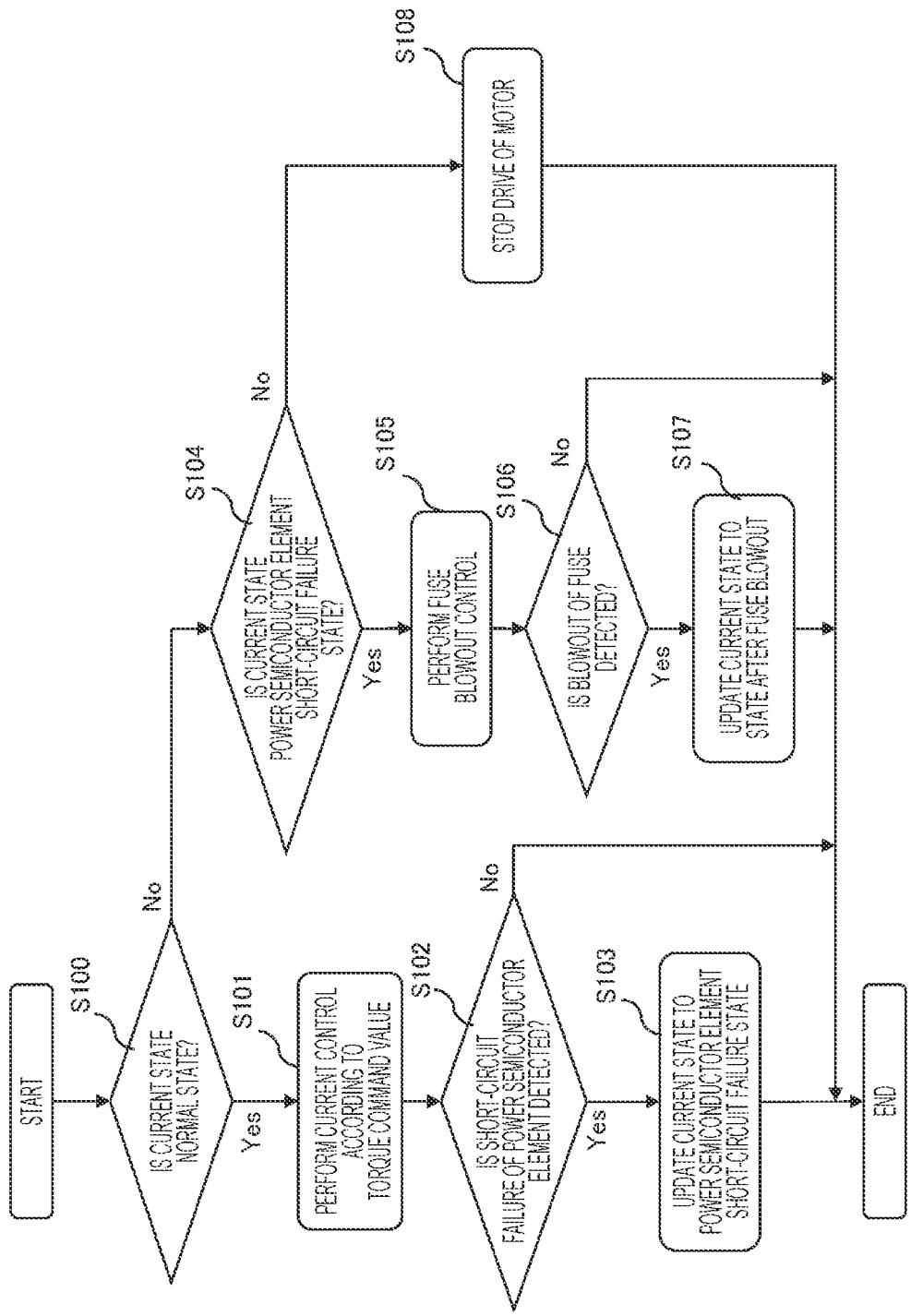
FIG. 7 illustrates an example of a control flowchart.

FIG. 7 is an example of a control flowchart in the present embodiment. In the present embodiment, the control circuit 10 illustrated in FIG. 2 periodically performs the control of FIG. 7 at regular intervals.

First, in the processing of Step S100, the control circuit 10 determines whether or not the internal state 19a output from the state determination unit 19 is a "normal state". When the internal state 19a is the "normal state", the process proceeds to Step S101, and when the internal state is other than the "normal state", the process proceeds to Step S104.

In the processing of Step S101, the control circuit 10 performs current control according to the torque command value. More specifically, as described above, the torque control-time target current calculation unit 12 generates the target current value 12a according to the target torque T*, and the torque control-time current control unit 13 generates the duty value 13a of each phase according to the target current value 12a. Then, the PWM signal generation unit 16 generates the PWM signal 16a based on the duty value 13a of each phase, and outputs the PWM signal 16a to the driver circuit 20.

Next, in the processing of Step S102, the short-circuit failure location determination unit 17 determines whether the occurrence of the short-circuit failure in any one of the power semiconductor elements 32 is detected based on the short-circuit failure detection signal 20b output from the driver circuit 20. When the short-circuit failure is detected, the determination of the short-circuit failure location is performed as described above using the PWM signal 16a, the short-circuit failure location information 17a is output based on the determination result, and then the process proceeds to Step S103. In the processing of Step S103, the state determination unit 19 determines that the current state of the power conversion device 100 is the "power semiconductor short-circuit failure state" and updates the internal state 19a. After executing the processing of Step S103, the control circuit 10 ends the control flowchart of FIG. 7.

Meanwhile, when no short-circuit failure is detected in any of the power semiconductor elements 32, the control circuit 10 does not execute the processing of Step S103 and ends the control flowchart of FIG. 7. In this case, the short-circuit failure location determination unit 17 does not output the short-circuit failure location information 17a, and the state determination unit 19 maintains the internal state 19a in the "normal state".

In a case where it is determined in Step S100 that the internal state 19a output from the state determination unit 19 is not the "normal state", in the processing of Step S104, the control circuit 10 determines whether or not the internal state 19a is the "power semiconductor element short-circuit failure state". When the internal state 19a is the "power semiconductor element short-circuit failure state", the process proceeds to Step S105, and when the internal state is other than the "power semiconductor element short-circuit failure state", the process proceeds to Step S108.

In the processing of Step S105, the control circuit 10 performs fuse blowout control. More specifically, as described above, the fuse blowout-time target current calculation unit 14 generates the target current value 14a of each phase based on the short-circuit failure location information 17a, and the fuse blowout-time current control unit 15 generates the duty value 15a of each phase according to the target current value 14a. Then, the PWM signal generation unit 16 generates the PWM signal 16a based on the duty value 15a of each phase, and outputs the PWM signal 16a to the driver circuit 20. As a result, the driving of the other power semiconductor elements 32 is controlled such that the current flowing through the power semiconductor elements 32 determined as the short-circuit failure location by the short-circuit failure location determination unit 17 exceeds the fuse rated current.

Next, in the processing in Step S106, the fuse blowout determination unit 18 determines whether or not the blowout of the fuse 60 in the failure phase is detected based on the AC current sensor value 50a for the phase current in the failure phase. When the blowout of the fuse 60 in the failure phase is detected, the fuse blowout determination signal 18a is output, and then the process proceeds to Step S107. In the processing of Step S107, the state determination unit 19 determines that the current state of the power conversion device 100 is the "state after fuse blowout" and updates the internal state 19a. After executing the processing of Step S107, the control circuit 10 ends the control flowchart of FIG. 7.

Meanwhile, when the blowout of the fuse 60 in the failure phase is not detected, the control circuit 10 does not execute the processing of Step S107 and ends the control flowchart of FIG. 7. In this case, the fuse blowout determination unit 18 does not output the fuse blowout determination signal 18a, and the state determination unit 19 maintains the internal state 19a in the "power semiconductor element short-circuit failure state".

When it is determined in Step S104 that the internal state 19a output from the state determination unit 19 is not the "power semiconductor element short-circuit failure state", that is, when the internal state 19a is the "state after fuse blowout", the control circuit 10 determines in the processing of Step S108 that the fuse 60 in the failure phase is blown. Then, the PWM signal generation unit 16 outputs the PWM signal 16a to the driver circuit 20 to stop the driving of the motor 190 so that the power conversion circuit 30 is in the free wheel state.

As described above, in the present embodiment, when a short-circuit failure occurs in any of the power semiconductor elements 32, the current flowing through the power semiconductor element 32 at the failure location is controlled to be equal to or more than the rated current of the fuse 60, so that only the fuse 60 in the failure phase can be blown without blowing the normal two-phase fuse 60. In addition, after the fuse in the failure phase is blown, each of the other power semiconductor elements 32 in the power conversion circuit 30 is brought into a free wheel state, so that a state in which the motor 190 is not driven can be maintained.

Second Embodiment

In the present embodiment, an example of the power conversion device 100 and the drive device 200 capable of blowing only the fuse of the failure phase in a shorter time without blowing the fuse 60 of the normal phase at the time of the short-circuit failure of the power semiconductor element 32 and continuing the drive of the motor 190 even after the fuse is blown will be described.

Figure 8:
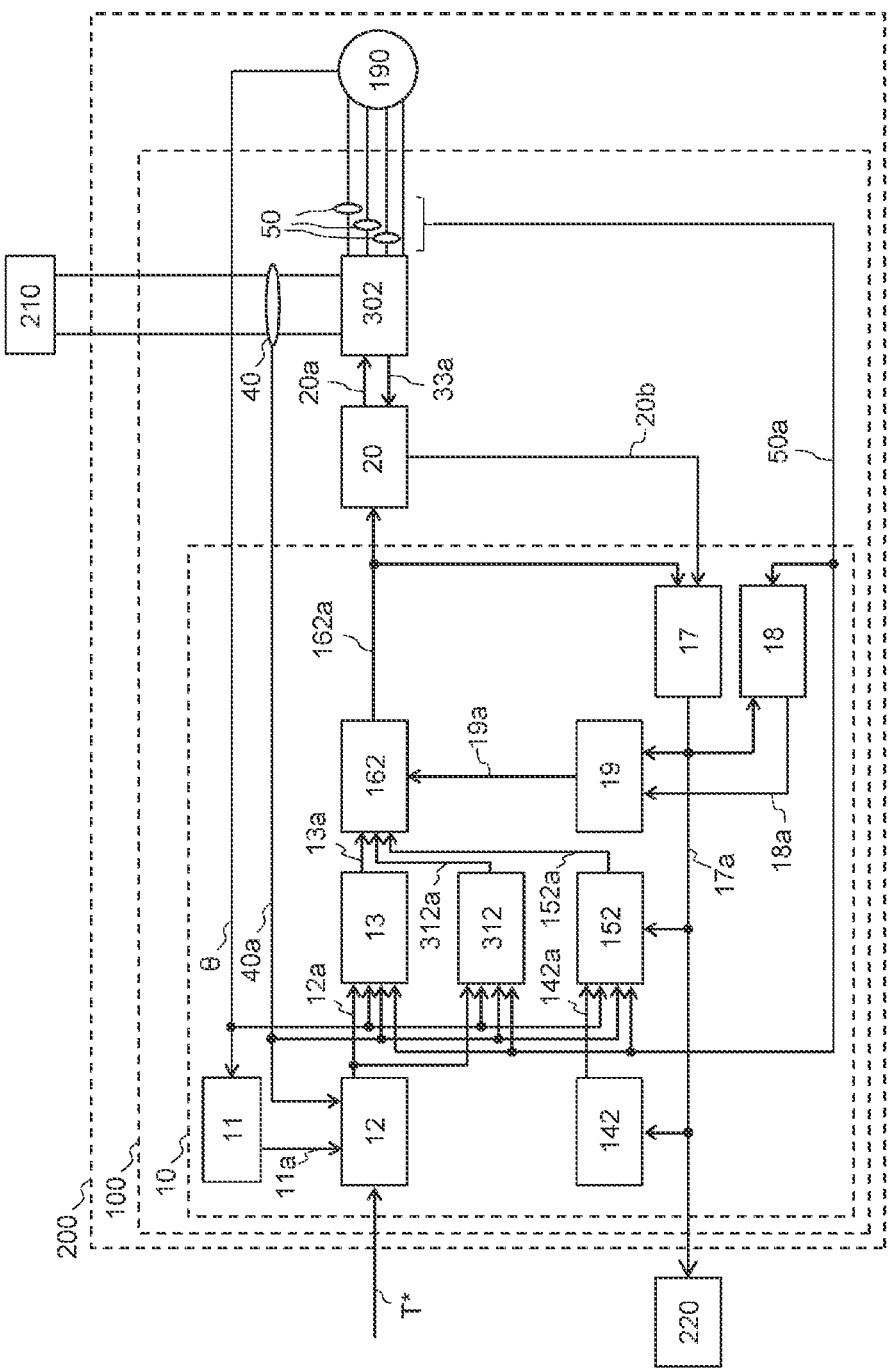
FIG. 8 illustrates a configuration example of the power conversion device 100 and a drive device 200.

FIG. 8 is a diagram illustrating a configuration example of the power conversion device 100 and the drive device 200 according to the present embodiment. The power conversion device 100 and the drive device 200 according to the present embodiment include a power conversion circuit 302 having a configuration different from that of the power conversion circuit 30 according to the first embodiment. In addition, the control circuit 10 in the power conversion device 100 according to the present embodiment includes a current control unit after fuse blowout 312 in addition to the functional blocks according to the first embodiment, and further includes a fuse blowout-time target current calculation unit 142, a fuse blowout-time current control unit 152, and a PWM signal generation unit 162 which are different from the fuse blowout-time target current calculation unit 14, the fuse blowout-time current control unit 15, and the PWM signal generation unit 16 according to the first embodiment, respectively. The description of the components common to the first embodiment will be omitted.

Figure 9:
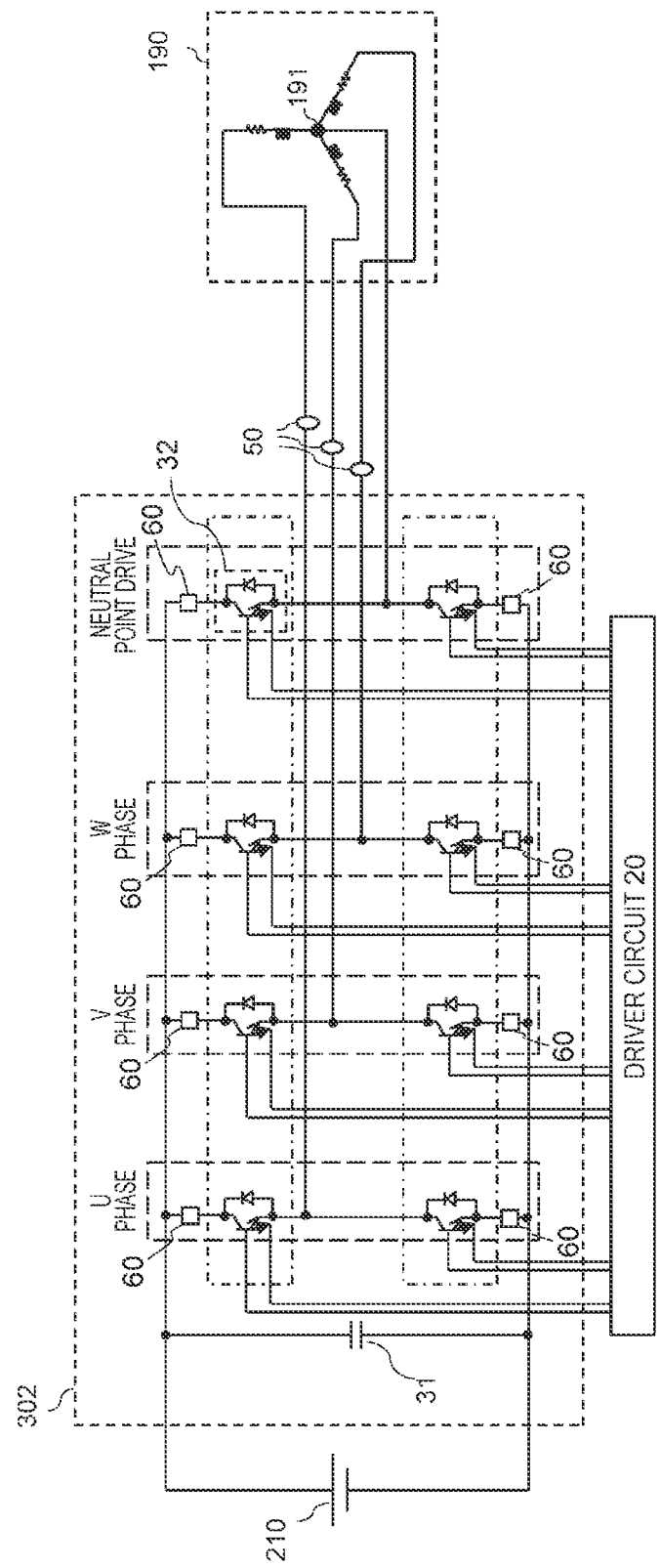
FIG. 9 illustrates a configuration example of the power conversion circuit 30 and a motor 190.

FIG. 9 is a diagram illustrating a configuration example of the power conversion circuit 302 and the motor 190 in the present embodiment. The power conversion circuit 302 of the present embodiment includes upper and lower arm circuits for driving a motor neutral point voltage in addition to the circuit of First Embodiment. Similarly to the upper and lower arm circuits of each phase, the upper and lower arm circuits for driving the motor neutral point voltage include power semiconductor elements 32 of two upper and lower arms connected in series, and fuses 60 (an upper arm fuse and a lower arm fuse) arranged in series with these power semiconductor elements 32. An output of the upper and lower arm circuits for driving the motor neutral point voltage is connected to the neutral point 191 of the motor 190.

The driver circuit 20 of the present embodiment includes, in addition to the circuit of the first embodiment, a circuit that drives each power semiconductor element 32 of the upper and lower arm circuits for driving the motor neutral point voltage connected to the neutral point 191.

Moreover, in the present embodiment, similarly to the first embodiment, the fuse 60 is disposed between the power semiconductor element 32 and the wire on the plus side or the minus side of the DC power supply 210, but the fuse 60 may be disposed between the power semiconductor element 32 and the output line of each phase or the connection line of the neutral point 191. An arrangement position of the fuse 60 is not limited as long as the fuse 60 is connected in series with the respective phases or the power semiconductor elements 32 for driving the motor neutral point voltage, and current flowing from the DC power supply 210 to the windings of the respective phases can be cut off by blowing the fuse when a short-circuit failure occurs in the power semiconductor elements 32. That is, in each of the phases and the upper and lower arm circuits for driving the motor neutral point voltage, when the upper arm fuse is connected in series with the power semiconductor element 32 of the upper arm between the wire on the positive side of the DC power supply 210 and the output line to the motor 190 or the connection line of the neutral point 191, and the lower arm fuse is connected in series with the power semiconductor element 32 of the lower arm between the wire on the negative side of the DC power supply 210 and the output line to the motor 190 or the connection line of the neutral point 191, the fuse 60 can be arranged at any position.

Using the target current value 12a, the motor angle sensor value θ, the AC current sensor value 50a of each phase, and the voltage sensor value 40a output from the torque control-time target current calculation unit 12, the current control unit after fuse blowout 312 in FIG. 8 calculates the duty value 312a of each phase and the motor neutral point, and outputs the duty value to the PWM signal generation unit 162. Specific control of the current control unit after fuse blowout 312 will be described later.

The PWM signal generation unit 162 of the present embodiment switches a signal to be output to the driver circuit 20 according to the internal state 19a output from the state determination unit 19. When the internal state 19a is the "normal state", the PWM signal generation unit 162 generates the PWM signal 162a using the timer value and the duty value 13a of each phase output from the torque control-time current control unit 13, and outputs the PWM signal to the driver circuit 20. When the internal state 19a is the "power semiconductor element short-circuit failure state", the PWM signal generation unit 162 generates the PWM signal 162a using the timer value and the duty value 152a of each phase and the motor neutral point output from the fuse blowout-time current control unit 15, and outputs the PWM signal to the driver circuit 20. When the internal state 19a is the "state after fuse blowout", the PWM signal generation unit 162 generates the PWM signal 162a using the timer value and the duty value 312a of each phase and the motor neutral point output from the current control unit after fuse blowout 312, and outputs the PWM signal to the driver circuit 20.

Next, current control during fuse blowout control in the present embodiment will be described. During the fuse blowout control in the present embodiment, in addition to the current of each phase, the current (hereinafter, referred to as motor neutral point current) flowing between the power semiconductor element 32 for driving the motor neutral point voltage and the neutral point 191 of the motor 190 is also controlled. Therefore, the fuse blowout-time target current calculation unit 142 of the present embodiment sets a target current (hereinafter, referred to as a neutral point target current) with respect to the motor neutral point current in addition to the target current of each phase.

FIG. 10 is a diagram illustrating a setting example of a target current 142a by the fuse blowout-time target current calculation unit 142 according to the present embodiment. Moreover, in the present embodiment, as in the first embodiment, the absolute value of the target current of the phase in which the short-circuit failure occurs is set to be equal to or more than the fuse rated current. When the target current value 142a of each phase and the neutral point is set, it is set so as to satisfy the U-phase target current value+the V-phase target current value+the W-phase target current value+the neutral point target current=0.

Here, the absolute value of the neutral point target current may be set to be less than the rated current of the fuse 60, or may be set to be equal to or more than the rated current of the fuse 60. In addition, the neutral point target current is set in a direction opposite to the target current of the failure phase. By setting the neutral point target current in the direction opposite to the target current of the failure phase, the absolute value of the target current of the failure phase can be increased, and the fuse 60 of the failure phase can be blown in a short time by allowing a larger current to flow therethrough.

The fuse blowout-time target current calculation unit 142 according to the present embodiment converts the set target currents of the respective phases and the neutral point into a d-axis target current value (Id), a q-axis target current value (Iq), and a zero-phase target current value (Iz) using Expression 7, and outputs these values to the fuse blowout-time current control unit 152. In the present embodiment, since the neutral point target current is set, the U-phase target current+the V-phase target current+the W-phase target current does not become 0. Therefore, unlike the first embodiment, the zero-phase target current value is also calculated.

$$\begin{bmatrix} I_d \\ I_q \\ I_z \end{bmatrix} = \sqrt{\frac{2}{3}} \begin{bmatrix} \cos(\theta) & \cos\left(\theta - \frac{2}{3}\pi\right) & \cos\left(\theta + \frac{2}{3}\pi\right) \\ -\sin(\theta) & -\sin\left(\theta - \frac{2}{3}\pi\right) & -\sin\left(\theta + \frac{2}{3}\pi\right) \\ \frac{1}{\sqrt{2}} & \frac{1}{\sqrt{2}} & \frac{1}{\sqrt{2}} \end{bmatrix} \begin{bmatrix} I_u \\ I_v \\ I_w \end{bmatrix} \quad \text{[Expression 7]}$$

The fuse blowout-time current control unit 152 according to the present embodiment calculates the duty of each phase as in the first embodiment. In addition, in the present embodiment, since it is also necessary to control on/off of the power semiconductor element 32 for driving the motor neutral point, the duty value for the motor neutral point is also calculated. The duty value for the motor neutral point is calculated as follows. First, the fuse blowout-time current control unit 152 converts the three-phase AC current sensor value 50a output from the AC current sensor 50 into a zero-phase current value using the motor angle sensor value θ. Next, the fuse blowout-time current control unit 152 obtains a difference between the zero-phase current and the zero-phase target current value. The fuse blowout-time current control unit 152 performs feedback control on the zero-phase current difference to determine a zero-phase target voltage value. The fuse blowout-time current control unit 152 calculates a neutral point target voltage value (Vn) from the zero-phase target voltage (Vz) and the target voltage value (Vu, Vv, Vw) of each phase using Expression 8. At this time, assuming that the voltage of the DC power supply 210 is Vdc, the target voltage value of the phase in which the short-circuit failure of the power semiconductor element 32 occurs is calculated as ½·Vdc when the short-circuit failure occurs in the upper arm, and is calculated as −½·Vdc when the short-circuit failure occurs in the lower arm. Finally, the fuse blowout-time current control unit 152 calculates the duty value of the motor neutral point from the neutral point target voltage value and the voltage sensor value.

$$V_n = \frac{1}{3}(V_u + V_v + V_w) - \frac{1}{\sqrt{3}} V_z \quad \text{[Expression 8]}$$

Figure 11:
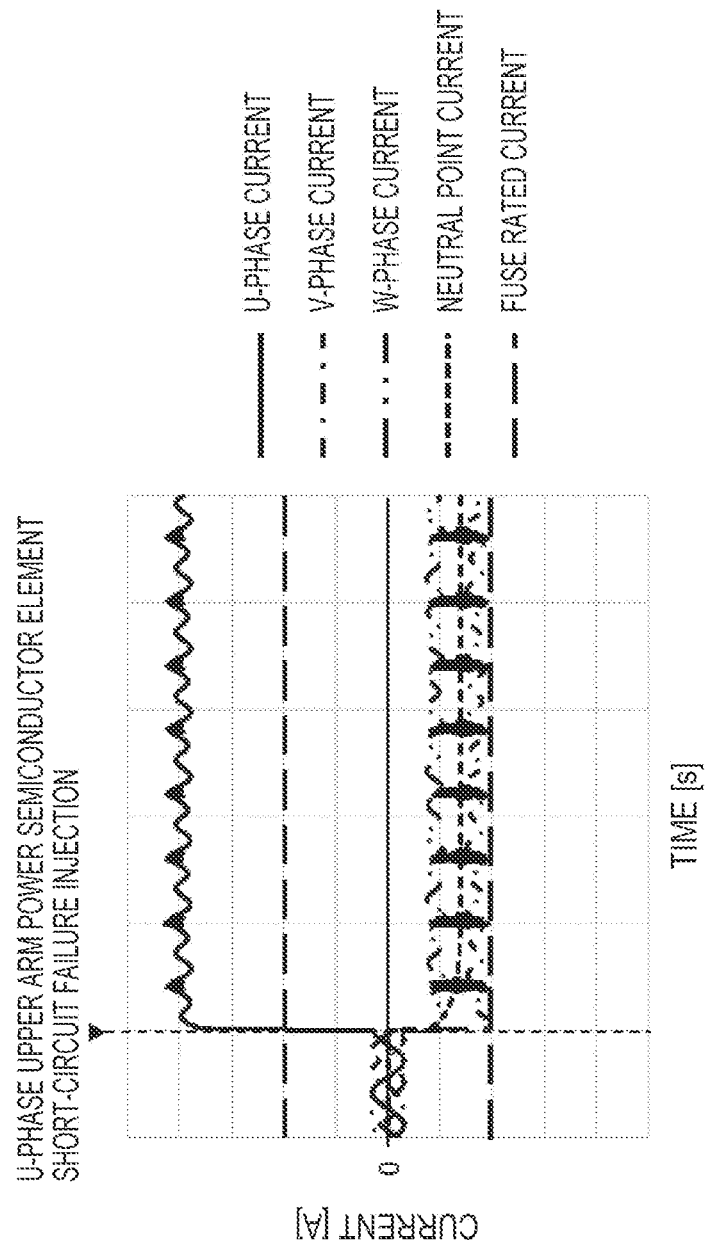
FIG. 11 illustrates an example of a current waveform at the time of fuse blowout control.

FIG. 11 is a diagram illustrating an example of the current waveform during fuse blowout control according to the present embodiment. In the example of FIG. 11, when a short-circuit failure occurs in the power semiconductor element 32 of the U-phase upper arm, the U-phase target current value is set to 2.1 times the fuse rated current, the V-phase target current value is set to −0.9 times the fuse rated current, the W-phase target current value is set to −0.5 times the fuse rated current, and the neutral point target current value is set to −0.7 times the fuse rated current.

In the example of FIG. 11, the current of each phase and the neutral point current are substantially the same as the target current value, and the current value of the failed U phase is equal to or more than the fuse rated current, and the current of the normal V phase and W phase is less than the fuse rated current. In addition, by controlling the neutral point current so as to be opposite to the current of the failed U-phase, the absolute value of the U-phase current can be increased as compared with the current waveform of the first embodiment.

Next, the current control after the fuse is blown in the present embodiment will be described. When the fuse 60 in the phase in which the short-circuit failure has occurred is blown, no current flows in the phase, and the state becomes the same as the open-phase state. At this time, by controlling on/off of each of the power semiconductor elements 32 of the remaining two phases and the power semiconductor element 32 for driving the motor neutral point voltage so that the current phase difference of the remaining two phases becomes 60 degrees, torque control in which torque ripple is suppressed can be performed.

FIG. 12 is a diagram illustrating current phases of the remaining two phases after the fuse is blown. FIG. 12 illustrates an example of a case where control is performed in a state where the current phase of the V phase is delayed by 120 degrees from the current phase of the U phase in the normal state and in a state where the current phase of the W phase is advanced by 120 degrees from the current phase of the U phase. After the U phase fuse is blown, the current is controlled so that the current phase of the W phase is advanced by 30 degrees from the normal phase and the current phase of the V phase is delayed by 30 degrees from the normal phase. After the V-phase fuse is blown, the current is controlled such that the U-phase current phase is advanced by 30 degrees from the normal phase and the W-phase current phase is delayed by 30 degrees from the normal phase. After the W-phase fuse is blown, the current is controlled so that the V-phase current phase is advanced by 30 degrees from the normal time and the U-phase current phase is delayed by 30 degrees from the normal time. The current control unit after fuse blowout 312 calculates the duty value 312a of each phase and the motor neutral point so that the current phases of the remaining two phases have the values in FIG. 12.

Figure 13:
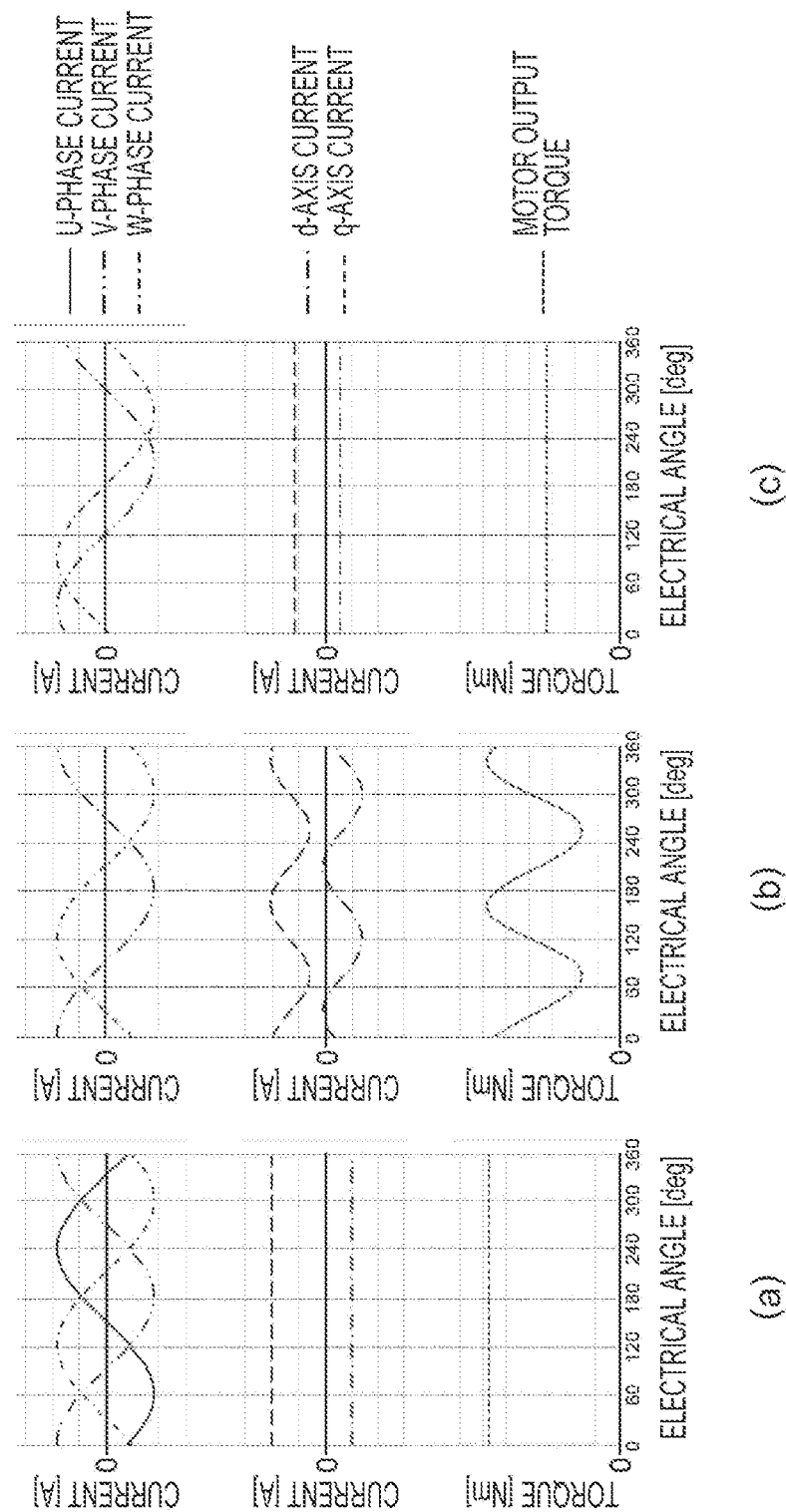
FIG. 13 illustrates an example of the current waveform and a motor output torque waveform after a fuse is blown.

FIG. 13 is a diagram illustrating an example of a current waveform and a motor output torque waveform after the fuse is blown. (a) is a waveform of a current and a torque in a normal state, (b) is a waveform of a current and a torque in a case where the currents of the V phase and the W phase are controlled while maintaining the same current phase as that in the normal state after the U phase fuse is blown, and (c) is a waveform of a current and a torque in a case where the current phases of the V phase and the W phase are controlled after the U phase fuse is blown as illustrated in FIG. 12. In (a), (b), and (c), graphs on the uppermost side represent a U-phase/V-phase/W-phase current waveform. The middle graph represents waveforms of the d-axis current and the q-axis current. The bottom graph represents the waveform of the output torque of the motor 190.

As illustrated in FIG. 13(a), during normal operation, the currents of the respective phases are controlled while maintaining a current phase difference of 120 degrees, and both the d-axis current and the q-axis current at this time have constant values. Therefore, the output torque also maintains a constant value.

As illustrated in FIG. 13(b), when the current phases of the V phase and the W phase are set to the same values as usual after the U-phase fuse is blown, the d-axis current and the q-axis current oscillatingly increase or decrease according to a change in the electrical angle. Therefore, the output torque also oscillatingly increases or decreases according to the change in the electrical angle, and the torque ripple occurs.

As illustrated in FIG. 13(c), when the control is performed such that the current phase difference between the V phase and the W phase becomes 60 degrees after the U-phase fuse is blown, the values of the d-axis current and the q-axis current become $1/\sqrt{3}$ at the normal time, but the constant value can be maintained regardless of the change in the electrical angle. Therefore, the output torque at this time is approximately $1/\sqrt{3}$ of the normal time, but it is possible to maintain a constant value regardless of the change in the electrical angle, and it is possible to suppress the occurrence of the torque ripple as illustrated in FIG. 13(b).

In the example of FIG. 13(c), when the current amplitudes of the V phase and the W phase are set to $\sqrt{3}$ times the normal time, the values of the d-axis current and the q-axis current at that time can be set to the same values as those at the normal time, and the output torque can also be set to the same values as those at the normal time.

Figure 14:
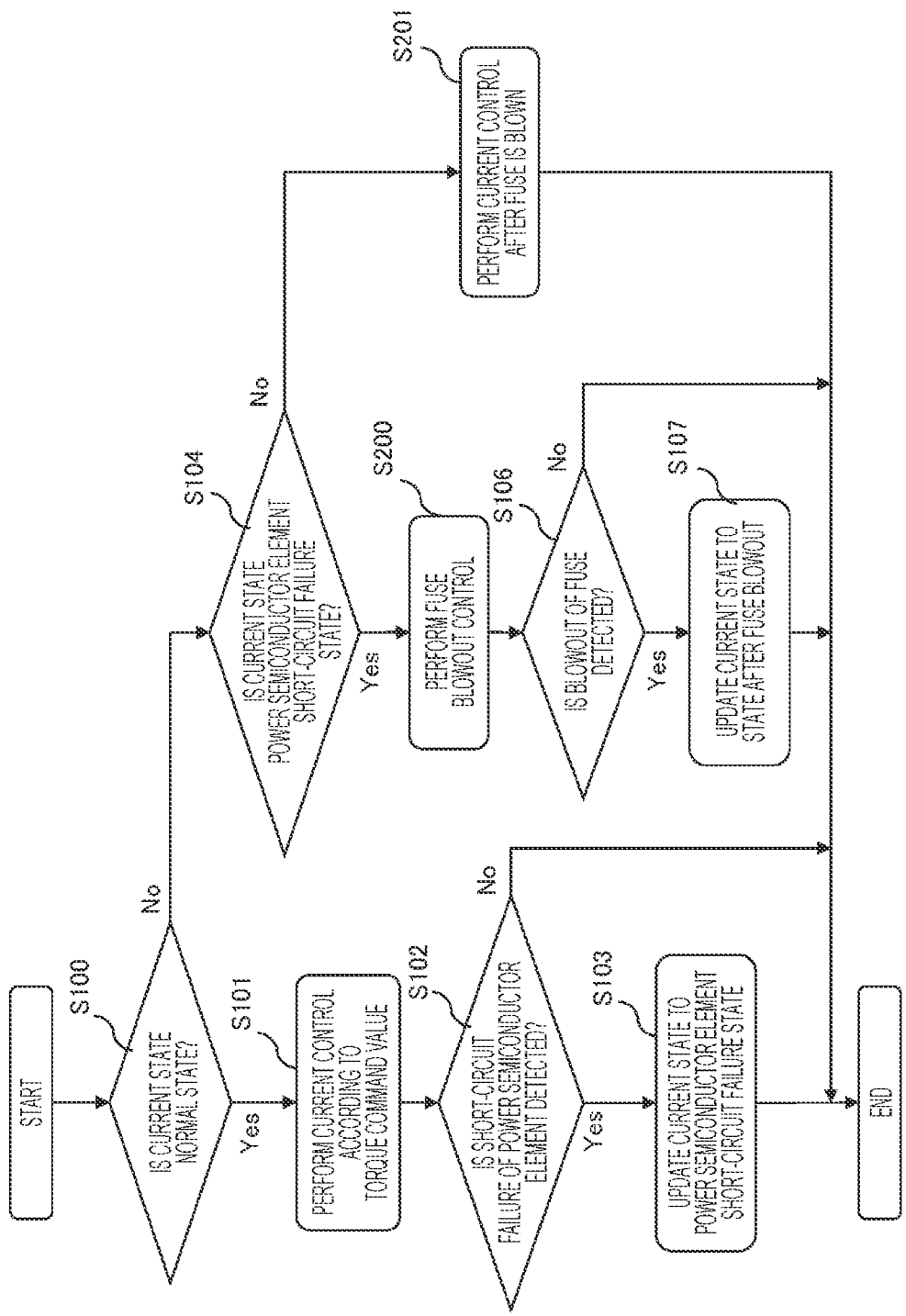
FIG. 14 illustrates an example of a control flowchart.

FIG. 14 is an example of a control flowchart in the present embodiment. In the present embodiment, the control circuit 10 illustrated in FIG. 8 periodically performs the control of FIG. 14 at regular intervals. Note that, in FIG. 14, portions performing the same processes as those in the control flowchart of FIG. 7 described in the first embodiment are denoted by the same symbols as those in FIG. 7, and description of those processes is omitted.

In the present embodiment, in the processing of Step S104, when the internal state 19a is the "power semiconductor element short-circuit failure state", the process proceeds to Step S200, and when the internal state is other than the "power semiconductor element short-circuit failure state", the process proceeds to Step S201.

In the processing of Step S200, the control circuit 10 performs fuse blowout control. More specifically, as described above, the fuse blowout-time target current calculation unit 142 generates the target current value 142a for each phase and the neutral point based on the short-circuit failure location information 17a, and the fuse blowout-time current control unit 152 generates the duty value 152a for each phase and the neutral point according to the target current value 142a. Then, the PWM signal generation unit 162 generates the PWM signal 162a based on the duty values 152a of the respective phases and the neutral points, and outputs the PWM signal 162a to the driver circuit 20. As a result, the driving of the other power semiconductor elements 32 is controlled so that the current flowing through the power semiconductor elements 32 determined as the short-circuit failure location by the short-circuit failure location determination unit 17 becomes equal to or more than the fuse rated current.

In the processing of Step S201, the control circuit 10 determines that the fuse 60 in the failure phase is blown, and performs the current control after the fuse is blown. Specifically, as described above, the current control is performed in a state where the current phase of each phase other than the failure phase is changed. That is, the current control unit after fuse blowout 312 calculates the duty value 312a of each phase and the motor neutral point so that the current phase difference between the remaining two phases excluding the failure phase becomes 60 degrees. The PWM signal generation unit 162 generates the PWM signal 162a based on the duty value 312a and outputs the PWM signal to the driver circuit 20 to control on/off of the remaining two-phase power semiconductor element 32 and the power semiconductor element 32 for driving the motor neutral point voltage.

As described above, in the present embodiment, by controlling the neutral point current so as to be in a direction opposite to the current of the failure phase, the absolute value of the current of the failure phase can be increased. Since the blowout time of the fuse 60 becomes shorter as the value of the current flowing through the fuse 60 becomes larger, the fuse 60 at the failure location can be blown faster by controlling the neutral point current as described above. In addition, as in the present embodiment, by performing control such that the current phase difference between the remaining two phases becomes 60 degrees after the fuse is blown, torque control in which torque ripple is suppressed can be continued even after the fuse is blown.

In the vehicle 1 of FIG. 1, in a case where the independent drive devices 200 are provided on the front and rear wheels, as described in the first embodiment, even when one of the drive devices 200 is stopped when the failure occurs, the remaining drive device 200 can continue the driving of the vehicle 1. However, when the drive device 200 is provided only on one of the front and rear wheels, the driving of the vehicle 1 cannot be continued when the operation of the drive device 200 is stopped due to a failure.

Meanwhile, by using the method of the present embodiment, even when the vehicle 1 is provided with the drive device 200 on only one of the front and rear wheels, the drive of the vehicle 1 can be continued after the short-circuit failure of the power semiconductor element. Therefore, it is not necessary to make the drive device 200 redundant for the purpose of continuing the driving of the vehicle after the failure, and it is possible to realize the vehicle 1 that can continue the driving even after the failure while reducing the cost.

Third Embodiment

In the fuse blowout control of the first embodiment and second embodiment, current control is performed so that a constant current flows in the failure phase. At this time, the torque output from the motor 190 periodically repeats the powering torque and the regenerative torque, and the vehicle 1 may vibrate. In this state, ride comfort of a driver is deteriorated, and thus it is desirable to blow the fuse 60 at the failure location in a shorter time and switch to the control with less torque ripple.

In view of the above problems, the present embodiment illustrates an example of the power conversion device 100 and the drive device 200 capable of blowing the fuse 60 at the failure location in a shorter time and continuing driving of the motor 190 even after blowing the fuse at the time of a short-circuit failure of the power semiconductor element.

Figure 15:
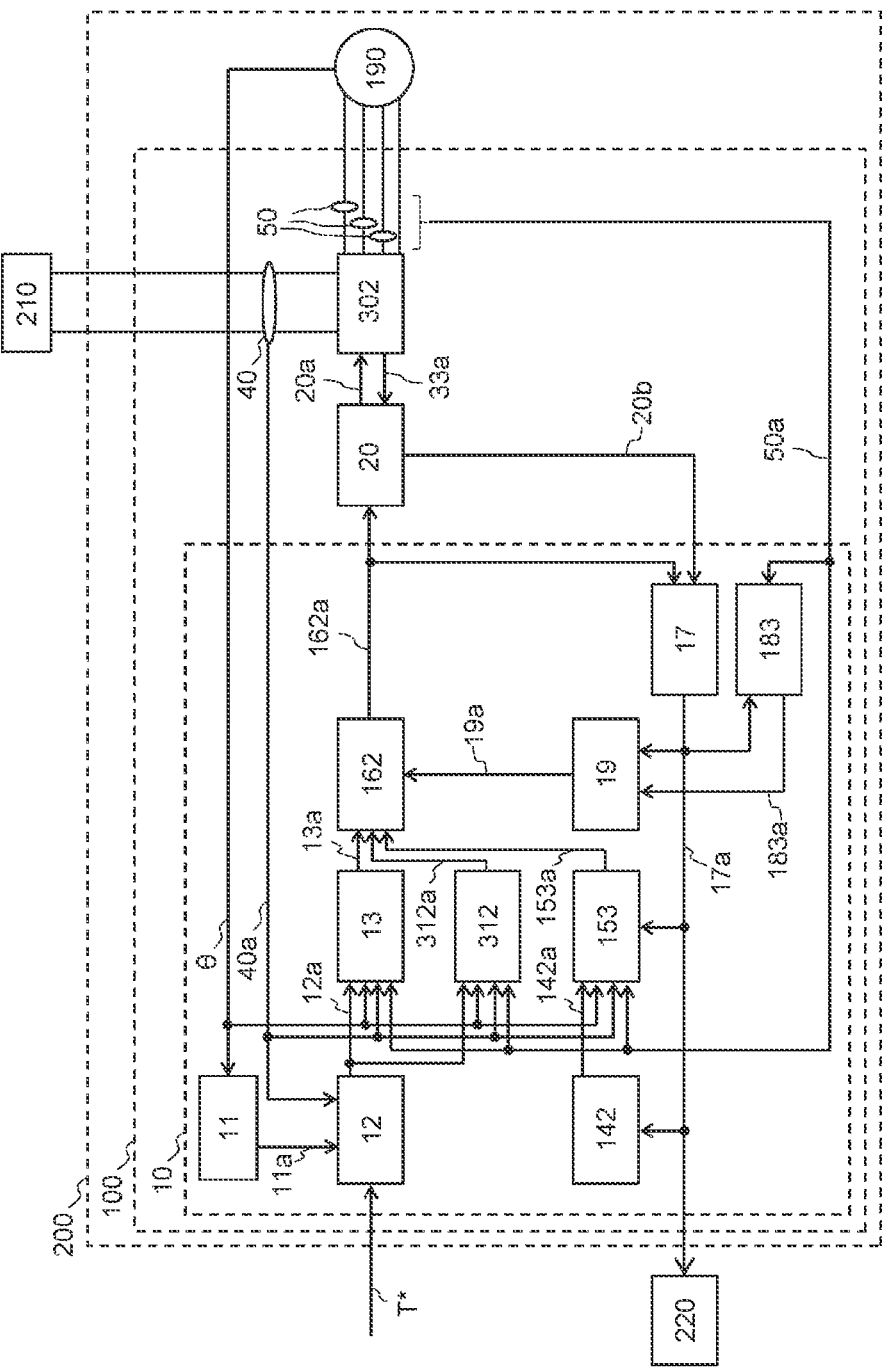
FIG. 15 illustrates a configuration example of the power conversion device 100 and a drive device 200.

FIG. 15 is a diagram illustrating a configuration example of the power conversion device 100 and the drive device 200 according to the present embodiment. The control circuit 10 in the power conversion device 100 according to the present embodiment includes a fuse blowout-time current control unit 153 and a fuse blowout determination unit 183 different from the fuse blowout-time current control unit 152 and the fuse blowout determination unit 18 according to the second embodiment, respectively. Description of components common to the first and second embodiments will be omitted.

The fuse blowout-time current control unit 153 of the present embodiment calculates the duty of each phase similarly to the fuse blowout-time current control unit 152 of the second embodiment. At this time, in the fuse blowout-time current control unit 15 of the first embodiment and the fuse blowout-time current control unit 152 of the second embodiment, the current control is performed by turning off the power semiconductor elements 32 of the arms on the upper and lower opposite sides in the same phase as that of the power semiconductor element 32 in which the short-circuit failure has occurred, but in the present embodiment, the current control is performed by turning on the power semiconductor element 32 of the arms of the upper and lower opposite sides in the same phase as that of the power semiconductor element 32 in which the short-circuit failure has occurred. As a result, in the upper and lower arm circuits of the failure phase, the power semiconductor element 32 of one arm is short-circuited, and the power semiconductor element of the other arm is turned on. That is, since the upper and lower arm circuits of the failure phase are in the same state as when the power semiconductor elements 32 of both the upper and lower arms are turned on, the voltage output from the power conversion circuit 302 to the winding of the failure phase of the motor 190 becomes 0 [V]. In the present embodiment, when converting the α-axis target voltage value (Vα) and the β-axis target voltage value (Vβ) into the U-phase target voltage value (Vu), the V-phase target voltage value (Vv), and the W-phase target voltage value (Vw), and when calculating the neutral point target voltage value (Vn) from these target voltage values (Vu, Vv, Vw), the calculation is performed with this in mind.

Figure 16:
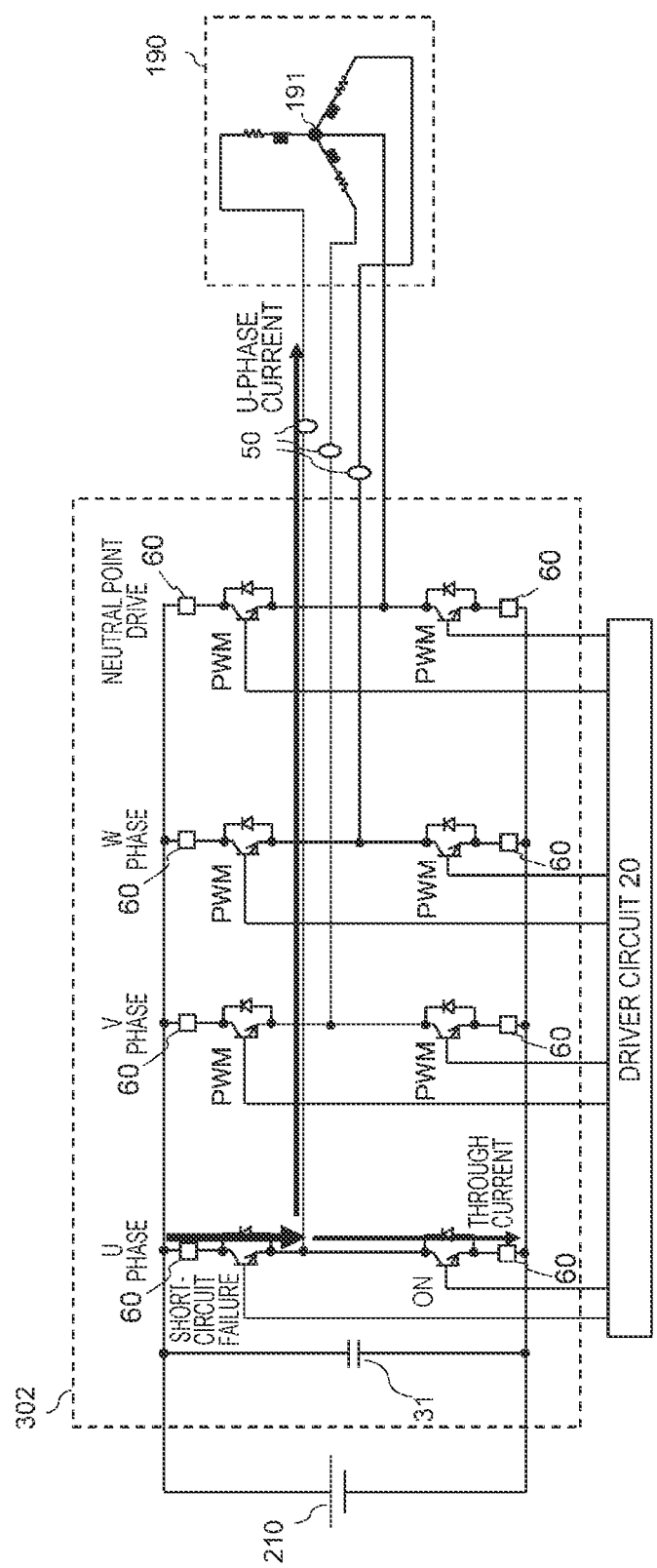
FIG. 16 illustrates an example in which fuse blowout control is performed.

FIG. 16 is a diagram illustrating an example in which the fuse blowout control is performed when a short-circuit failure occurs in the power semiconductor element 32 of the U-phase upper arm in the present embodiment.

In the present embodiment, as described above, the power semiconductor elements 32 (the power semiconductor element 32 of the U-phase lower arm) of the arms on the upper and lower opposite sides in the same phase as that of the power semiconductor element 32 (the power semiconductor element 32 of the U-phase upper arm) in which the short-circuit failure has occurred are turned on, and the on/off states of the power semiconductor elements 32 of the remaining V-phase, W-phase, and neutral points are controlled so that the current flowing through each of these phases and neutral points becomes the target current. At this time, both the through current flowing through each of the U-phase power semiconductor elements 32 of the upper and lower arms and the U-phase current are applied to the fuse 60 (upper arm fuse) corresponding to the U-phase power semiconductor element 32 of the upper arm. Therefore, a larger current can be applied to the fuse 60 as compared with the case where only the phase current is simply applied to the fuse 60 as in the first embodiment and second embodiments. Therefore, the fuse 60 at the failure location can be blown in a shorter time. When the fuse 60 at the failure location is blown by the through current, the normal power semiconductor element 32 (the power semiconductor element 32 of the U-phase lower arm) in which the short-circuit failure does not occur may be maintained in the ON state at all times, or PWM control of repeating ON/OFF according to a predetermined duty may be performed on the power semiconductor element 32.

In the first embodiment and second embodiment, the current hardly flows to the winding of the failure phase of the motor 190 after the fuse is blown. However, in the present embodiment, since the power semiconductor elements of the arms on the upper and lower opposite sides to the power semiconductor element 32 in which the short-circuit failure has occurred are turned on, the current flows to the winding wire of the failure phase even after the fuse is blown. Therefore, the blowout of the fuse 60 is determined by a method different from those in the first embodiment and second embodiment.

Figure 17:
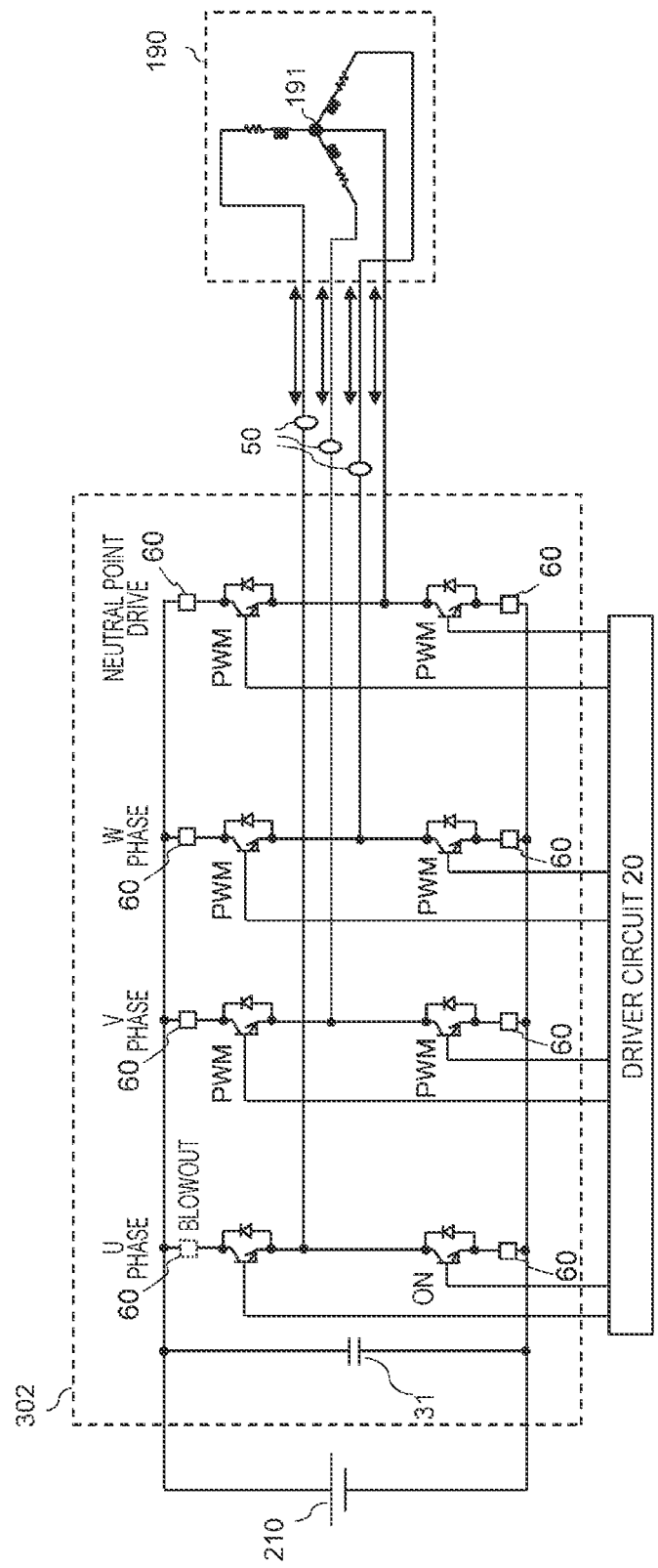
FIG. 17 illustrates a state after a fuse is blown.

FIG. 17 is a diagram illustrating a state after the fuse is blown in the present embodiment. FIG. 17 illustrates a state after the upper arm fuse corresponding to the power semiconductor element 32 of the U-phase upper arm in which the short-circuit failure has occurred in the example of FIG. 16 is blown. In this case, since the power semiconductor element 32 of the U-phase lower arm is in the ON state, the voltage output from the U-phase upper and lower arm circuits to the winding of the motor 190 is −½ Vdc. In this state, when the voltage at the neutral point 191 is more than the U-phase output voltage on average, a negative current is generated in the U phase. When the voltage at the neutral point 191 is on average equal to the U-phase output voltage, a positive and negative sinusoidal current flows in the U phase by the counter electromotive force generated in the winding of the motor 190. In the state of FIG. 17, the output voltage of the U phase is always −½ Vdc, and it is physically impossible to cause the applied voltage of the neutral point 191 to be lower than −½ Vdc, so that the voltage of the neutral point 191 does not fall below the U phase output voltage.

As described above, when the power semiconductor element 32 of the U-phase upper arm is short-circuited, the phase current flowing in the U phase is in the positive state before the upper arm fuse corresponding to the power semiconductor element 32 is blown, but after the upper arm fuse is blown, the phase current changes to the negative state or a sinusoidal plus and minus current. Therefore, when the phase current flowing through the failure phase is smoothed and the direction of the smoothed current is opposite to the target current for a certain period of time or more, or the smoothed current amplitude is maintained to be less than the threshold for a certain period of time or more, it can be determined that the fuse at the failure location is blown.

Figure 18:
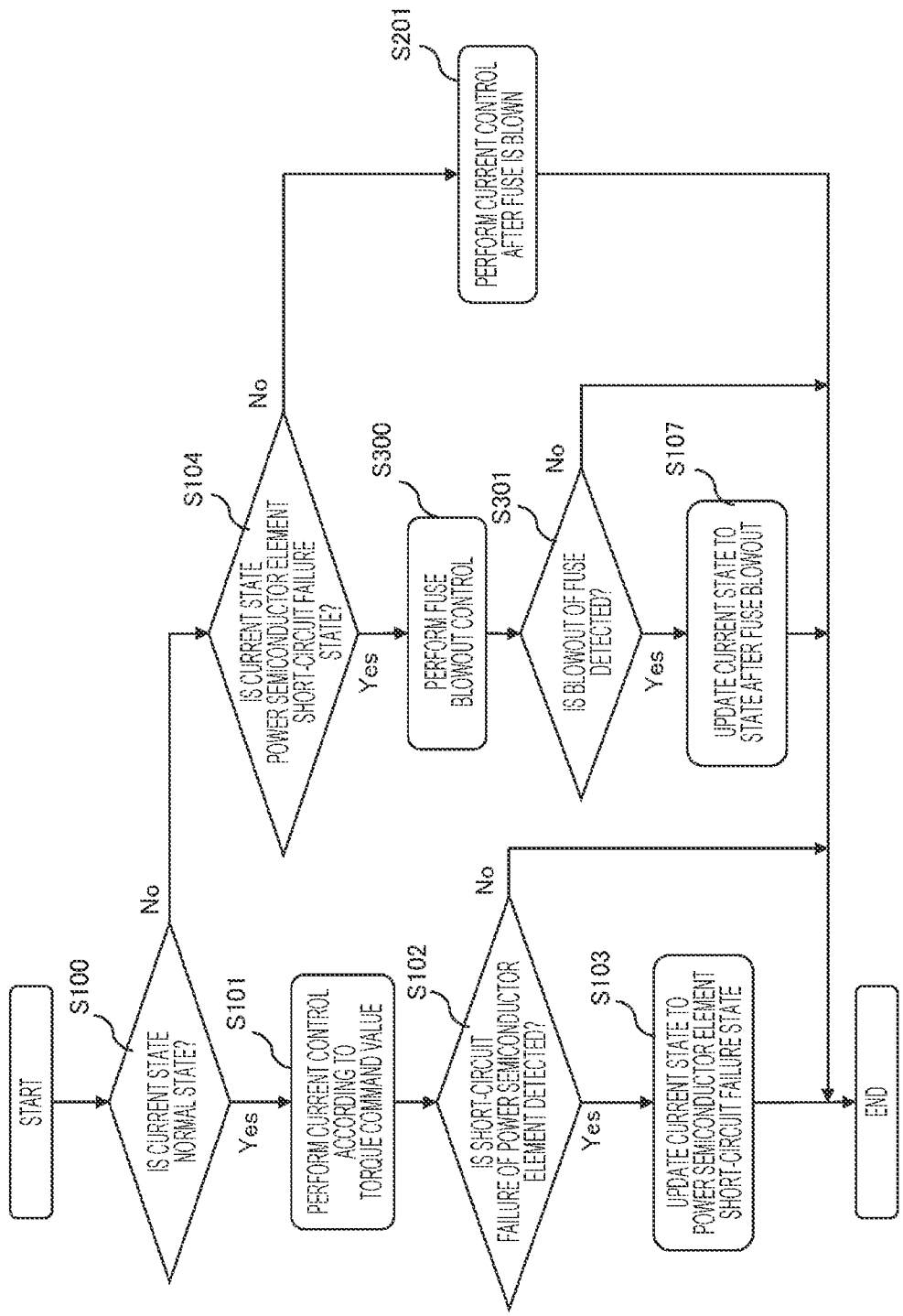
FIG. 18 illustrates an example of a control flowchart.

FIG. 18 is an example of a control flowchart in the present embodiment. In the present embodiment, the control circuit 10 illustrated in FIG. 15 periodically performs the control of FIG. 18 at regular intervals. Note that, in FIG. 18, portions performing the same processes as those in the control flowchart of FIG. 14 described in the second embodiment are denoted by the same symbols as those in FIG. 14, and description of those processes is omitted.

In the present embodiment, in the processing of Step S104, when the internal state 19*a* is the "power semiconductor element short-circuit failure state", the process proceeds to Step S300, and when the internal state is other than the "power semiconductor element short-circuit failure state", the process proceeds to Step S201.

In the processing of Step S300, the control circuit 10 performs the fuse blowout control. More specifically, as described in the second embodiment, the fuse blowout-time target current calculation unit 142 generates the target current value 142*a* for each phase and the neutral point based on the short-circuit failure location information 17*a*. As described above, the fuse blowout-time current control unit 153 generates the duty value 153*a* of each phase and the neutral point according to the target current 142*a*, and generates the duty value 153*a* so as to turn on the power semiconductor element 32 of the arms on the upper and lower opposite sides in the same phase as that of the power semiconductor element 32 in which the short-circuit failure has occurred. The PWM signal generation unit 162 generates a PWM signal 162*a* based on the duty values 153*a* of each phase and the neutral point, and outputs the PWM signal 162*a* to the driver circuit 20. As a result, the through current and the phase current flow through the power semiconductor element 32 determined to be the short-circuit failure location by the short-circuit failure location determination unit 17, and the driving of the other power semiconductor elements 32 is controlled such that the total current of the through current and the phase current becomes equal to or more than the fuse rated current.

Next, in the processing of Step S301, the fuse blowout determination unit 183 determines whether the fuse 60 at the failure location is blown using the current in the failure phase obtained by smoothing the AC current sensor value 50*a* with respect to the phase current in the failure phase. Here, as described above, when the direction of the current of the smoothed failure phase is opposite to the target current for a certain period of time or more, or when the current amplitude of the smoothed failure phase is maintained in a state of being less than the threshold for a certain period of time or more, it is determined that the fuse 60 at the failure location is blown. When the fuse 60 is blown, the fuse blowout determination signal 183*a* is output, and then the process proceeds to Step S107.

As described above, in the present embodiment, at the time of the fuse blowout control, the power semiconductor elements 32 on the upper and lower opposite sides of the same phase as that of the power semiconductor element 32 in which the short-circuit failure has occurred are turned on, and both the through current and the phase current are added to the fuse 60 at the failure location, so that the fuse 60 at the failure location can be blown in a shorter time than in the case of the second embodiment. After the fuse is blown, the motor 190 can be continuously driven as in the second embodiment.

Fourth Embodiment

In the fuse blowout control of the third embodiment, a through current is applied to the fuse 60 at the failure location, but since the through current is also applied to the normal power semiconductor element 32 in the failure phase, the power semiconductor element 32 may be heated and damaged by the through current. In this case, there is a possibility that the motor 190 cannot be continuously driven unless both the fuses 60 corresponding to the upper and lower arms of the failure phase are blown.

In the present embodiment, in order to cope with the above case, an example of the power conversion device 100 and the drive device 200 capable of blowing both the fuses 60 of the upper and lower arms of the failure phase in a short time and continuing driving of the motor 190 even after the fuse is blown will be described.

Figure 19:
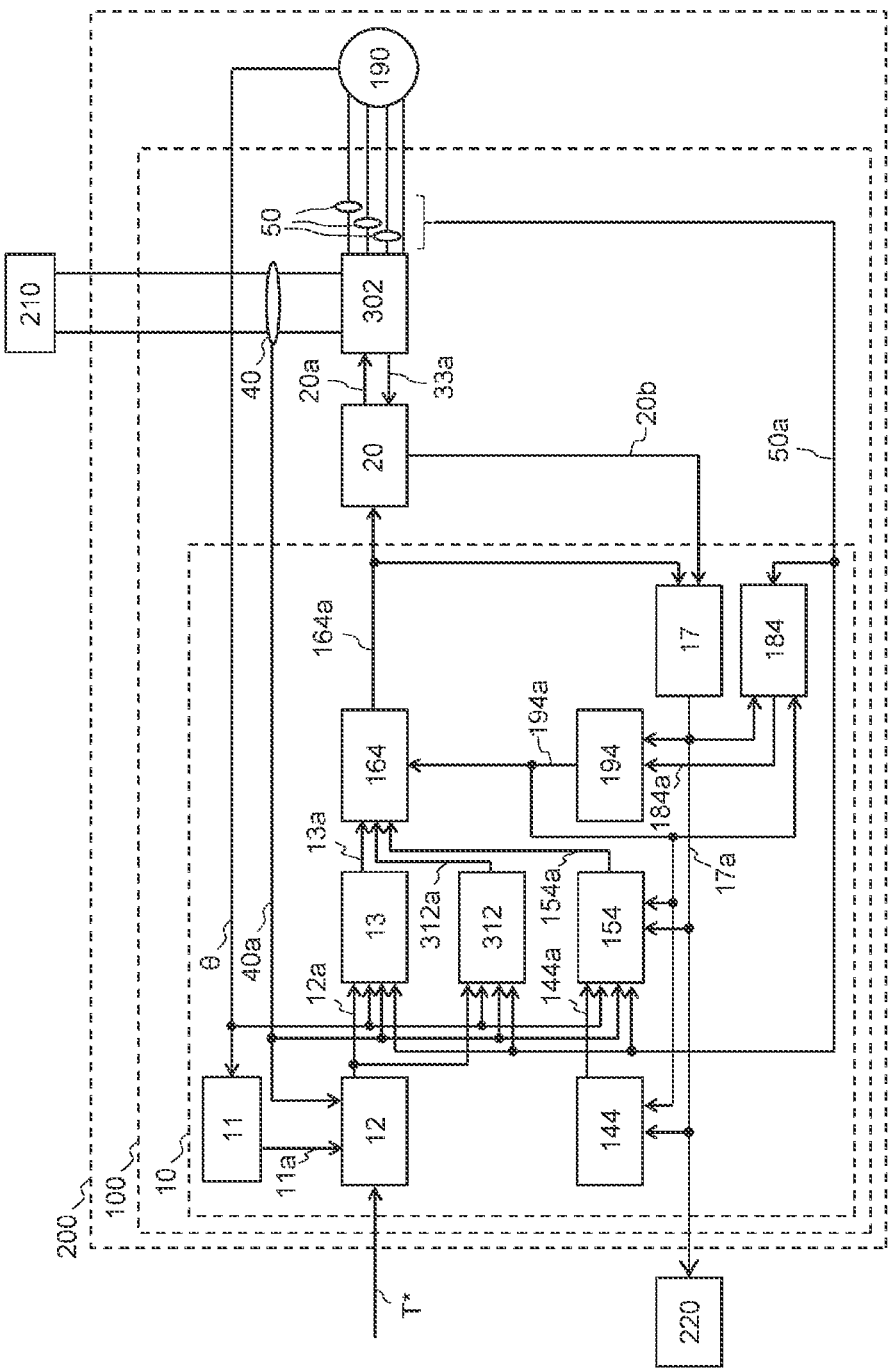
FIG. 19 illustrates a configuration example of the power conversion device 100 and the drive device 200.

FIG. 19 is a diagram illustrating a configuration example of the power conversion device 100 and the drive device 200 according to the present embodiment. The control circuit 10 in the power conversion device 100 according to the present embodiment includes a fuse blowout-time target current calculation unit 144, a fuse blowout-time current control unit 154, a state determination unit 194, a fuse blowout determination unit 184, and a PWM signal generation unit 164 that are respectively different from the fuse blowout-time target current calculation unit 142, the fuse blowout-time current control unit 153, the state determination unit 19, the fuse blowout determination unit 183, and the PWM signal generation unit 164 according to the third embodiment. Description of components common to those in the first embodiment to third embodiment will be omitted.

The state determination unit 194 according to the present embodiment determines whether the state of the power conversion device 100 is any one of a "normal state", a "power semiconductor element short-circuit failure state", a "state after upper fuse is blown", a "state after lower fuse is blown", and a "state after both fuses are blown" based on the short-circuit failure location information 17a of the power semiconductor element 32 output from the short-circuit failure location determination unit 17 and the fuse blowout determination signal 184a output from the fuse blowout determination unit 184. Here, among the fuses 60 provided in the upper arm and the lower arm in the upper and lower arm circuits in the failure phase, the fuse blowout determination signal 184a output from the fuse blowout determination unit 184 can distinguish between a signal indicating the blowout of the fuse 60 (upper arm fuse) corresponding to the upper arm, a signal indicating the blowout of the fuse 60 (lower arm fuse) corresponding to the lower arm, and a signal indicating the blowout of both the fuses 60 (upper arm fuse and lower arm fuse) corresponding to the upper and lower arms. Hereinafter, the fuse blowout determination signal 184a indicating the blowout of the upper arm fuse is referred to as an "upper fuse blowout signal", the fuse blowout determination signal 184a indicating the blowout of the lower arm fuse is referred to as a "lower fuse blowout signal", and the fuse blowout determination signal 184a indicating the blowout of both the upper arm fuse and the lower arm fuse is referred to as a "both fuses blowout signal". The state determination unit 194 outputs the current state (194a) to the fuse blowout-time target current calculation unit 144, the fuse blowout-time current control unit 154, the PWM signal generation unit 164, and the fuse blowout determination unit 184.

FIG. 20 is a table illustrating the internal state determination of the state determination unit 194 in the present embodiment. The state determination unit 194 determines the next state from the current state and the occurrence matter at regular time intervals, and updates the next state to the current state. The initial state is the "normal state". First, in a case where the current state is the "normal state", upon receiving the short-circuit failure location information 17a on the power semiconductor element 32 from the short-circuit failure location determination unit 17, the state determination unit 194 changes the next state to the "power semiconductor element short-circuit failure state". Otherwise, the next state remains in the "normal state".

When the upper fuse blowout signal is received as the fuse blowout determination signal 184a from the fuse blowout determination unit 184 while the current state is the "power semiconductor element short-circuit failure state", the state determination unit 194 changes the next state to the "state after upper fuse is blown". When the lower fuse blowout signal is received as the fuse blowout determination signal 184a from the fuse blowout determination unit 184 while the current state is the "power semiconductor element short-circuit failure state", the next state is changed to the "state after lower fuse is blown". Otherwise, the next state remains the "power semiconductor element short-circuit failure state".

When receiving the both fuses blowout signal as the fuse blowout determination signal 184a from the fuse blowout determination unit 184 while the current state is the "state after upper fuse is blown", the state determination unit 194 changes the next state to the "state after both fuses are blown". Otherwise, the next state remains the "state after upper fuse is blown".

When receiving the both fuses blowout signal as the fuse blowout determination signal 184a from the fuse blowout determination unit 184 while the current state is the "state after lower fuse is blown", the state determination unit 194 changes the next state to the "state after both fuses are blown". Otherwise, the next state remains the "state after lower fuse is blown".

When the current state is the "state after both fuses are blown", the state determination unit 194 keeps the next state as the "state after both fuses are blown".

The PWM signal generation unit 164 of the present embodiment switches a PWM signal 164a to be output to the driver circuit 20 according to the internal state 194a output from the state determination unit 194. When the internal state 194a is the "normal state", the PWM signal generation unit 164 generates the PWM signal 164a using the timer value and the duty value 13a of each phase output from the torque control-time current control unit 13, and outputs the PWM signal to the driver circuit 20. When the internal state 194a is one of the "power semiconductor element short-circuit failure state", the "state after upper fuse is blown", and the "state after lower fuse is blown", the PWM signal generation unit 164 generates the PWM signal 164a using the timer value and the duty value 154a of each phase and the motor neutral point output from the fuse blowout-time current control unit 154, and outputs the PWM signal to the driver circuit 20. When the internal state 194a is the "state after both fuses are blown", the PWM signal generation unit 164 generates the PWM signal 164a using the timer value and the duty value 312a of each phase and the motor neutral point output from the current control unit after fuse blowout 312, and outputs the PWM signal to the driver circuit 20.

Next, current control during fuse blowout control in the present embodiment will be described. The fuse blowout control of the present embodiment is performed in two stages.

First, when the internal state 194a output from the state determination unit 194 is the "power semiconductor element short-circuit failure state", fuse blowout control in the first stage is performed. At this time, the fuse blowout-time target current calculation unit 144 sets a target current value 144a for each phase and the neutral point to 0 [A]. Then, the fuse blowout-time current control unit 154 generates the duty value 154a with respect to the failure phase so that the power semiconductor elements 32 of the arms on the upper and lower opposite sides in the same phase as that of the power semiconductor element 32 in which the short-circuit failure has occurred are turned on. As a result, the power semiconductor elements 32 of both the upper and lower arms of the failure phase are turned on, a through current flows through both the fuses 60 corresponding to these power semiconductor elements 32, and either one fuse 60 of the upper and lower arms of the failure phase is blown by the through current. For the other two phases and the neutral point, the duty value 154a is generated according to the target current value 144a (0 [A] for each phase) output from the fuse blowout-time target current calculation unit 144. This is equivalent to controlling the output voltages of the normal two phases and the neutral point so as to cancel the induced voltage (counter electromotive force) generated in the motor winding of each phase.

At this time, similarly to the fuse blowout control of the third embodiment, it is necessary for the fuse blowout-time current control unit 154 to calculate the duty values 154a of the other two phases and the neutral point while keeping in mind that the voltage output from the power conversion circuit 302 to the winding of the failure phase of the motor 190 becomes 0 [V]. When the motor rotational speed is low, the current flowing through each phase can be set to 0 [A] by turning off both the upper and lower arms of the power semiconductor elements 32 of the other two phases and the neutral point. Therefore, such a duty value 154a may be generated. As described above, the control is performed such that the phase current of each phase does not flow at the time of the fuse blowout control by the through current, whereby the fuse blowout determination described later can be easily performed, and the heat generation of the power semiconductor of the normal phase during the fuse blowout control can be suppressed.

When the internal state 194a output from the state determination unit 194 is the "state after upper fuse is blown" or the "state after lower fuse is blown", the fuse blowout control in the second stage is performed. In this state, the fuse 60 of one of the upper and lower arms of the failure phase is blown by the fuse blowout control in the first stage, so that the remaining fuse 60 cannot be blown using the through current. Therefore, in the fuse blowout control in the second stage, similarly to the second embodiment, the phase current of the failure phase is controlled to melt the remaining fuse 60. At this time, the fuse blowout-time target current calculation unit 144 determines the target current value 144a for each phase and the neutral point by the same method as in the second embodiment. Then, the fuse blowout-time current control unit 154 generates the duty value 154a with respect to the failure phase so that the power semiconductor elements 32 of the arms on the upper and lower opposite sides in the same phase as that of the power semiconductor element 32 in which the short-circuit failure has occurred are turned on. For the other two phases and the neutral point, the duty value 154a is generated according to the target current value 144a output from the fuse blowout-time target current calculation unit 144.

At this time, when the internal state 194a is the "state after upper fuse is blown", in the upper and lower arm circuits in the failure phase, the upper arm fuse is blown, and only the power semiconductor element 32 on the lower arm side is in the ON state. Therefore, the output voltage thereof is −½ Vdc. Meanwhile, when the internal state 194a is the "state after lower fuse is blown", in the upper and lower arm circuits in the failure phase, the lower arm fuse is blown, and only the power semiconductor element 32 on the upper arm side is in the ON state, so that the output voltage thereof is ½ Vdc. With this in mind, the fuse blowout-time current control unit 154 needs to calculate the duty values 154a of the other two phases and the neutral point.

Next, the fuse blowout determination in the present embodiment will be described. The fuse blowout determination unit 184 according to the present embodiment performs the fuse blowout determination in two stages according to the fuse blowout control performed in two stages as described above.

First, fuse blowout determination at the time of fuse blowout control by a through current will be described. The fuse blowout determination is made when one power semiconductor element 32 of the upper and lower arms is in a short-circuit failure state and the other power semiconductor element 32 is in the ON state in any phase. That is, the fuse blowout determination is made when the internal state 194a output from the state determination unit 194 is the "power semiconductor element short-circuit failure state" and the first-stage fuse blowout control is performed. In this state, when none of the fuses 60 of the upper and lower arms is blown, the target current value 144a of each phase is 0 [A], so that the phase current of the failure phase is controlled to be substantially 0 [A].

After the upper arm fuse is blown by the through current, the output voltage of the failure phase becomes −½ Vdc as described above, so that a negative current flows through the failure phase. After the lower arm fuse is blown, the output voltage of the failure phase becomes ½ Vdc, so that a positive current flows through the failure phase. Therefore, when the current value obtained by smoothing the phase current flowing through the failure phase is a positive value and a state in which the magnitude of the current value is equal to or more than a predetermined threshold is maintained for a predetermined time or more, the fuse blowout determination unit 184 determines that the lower arm fuse of the failure phase is blown, and outputs the lower fuse blowout signal to the state determination unit 194. When the current value obtained by smoothing the phase current flowing through the failure phase is a negative value and a state in which the magnitude of the current value is equal to or more than a predetermined threshold is maintained for a predetermined time or more, the fuse blowout determination unit 184 determines that the upper arm fuse of the failure phase is blown and outputs an upper fuse blowout signal to the state determination unit 194.

Next, fuse blowout determination at the time of the fuse blowout control by the phase current will be described. The fuse blowout determination is made after the fuse 60 of one of the upper and lower arms in the failure phase is blown. That is, the fuse blowout determination is made when the internal state 194a output from the state determination unit 194 is in the "state after upper fuse is blown" or the "state after lower fuse is blown" and the second-stage fuse blowout control is performed. In this state, when any one of the fuses 60 of the upper and lower arms in the failure phase is not blown, the current corresponding to the target current values 144a set by the fuse blowout-time target current calculation unit 144 flow in the failure phase.

When both the fuses 60 of the upper and lower arms of the failure phase are blown, no current flows in the failure phase. Therefore, when a state in which the absolute value of the current in the failure phase is equal to or less than the threshold is maintained for a certain period of time or more, the fuse blowout determination unit 184 determines that the remaining fuses 60 in the failure phase are blown, and outputs the both fuses blowout signal to the state determination unit 194.

Figure 21:
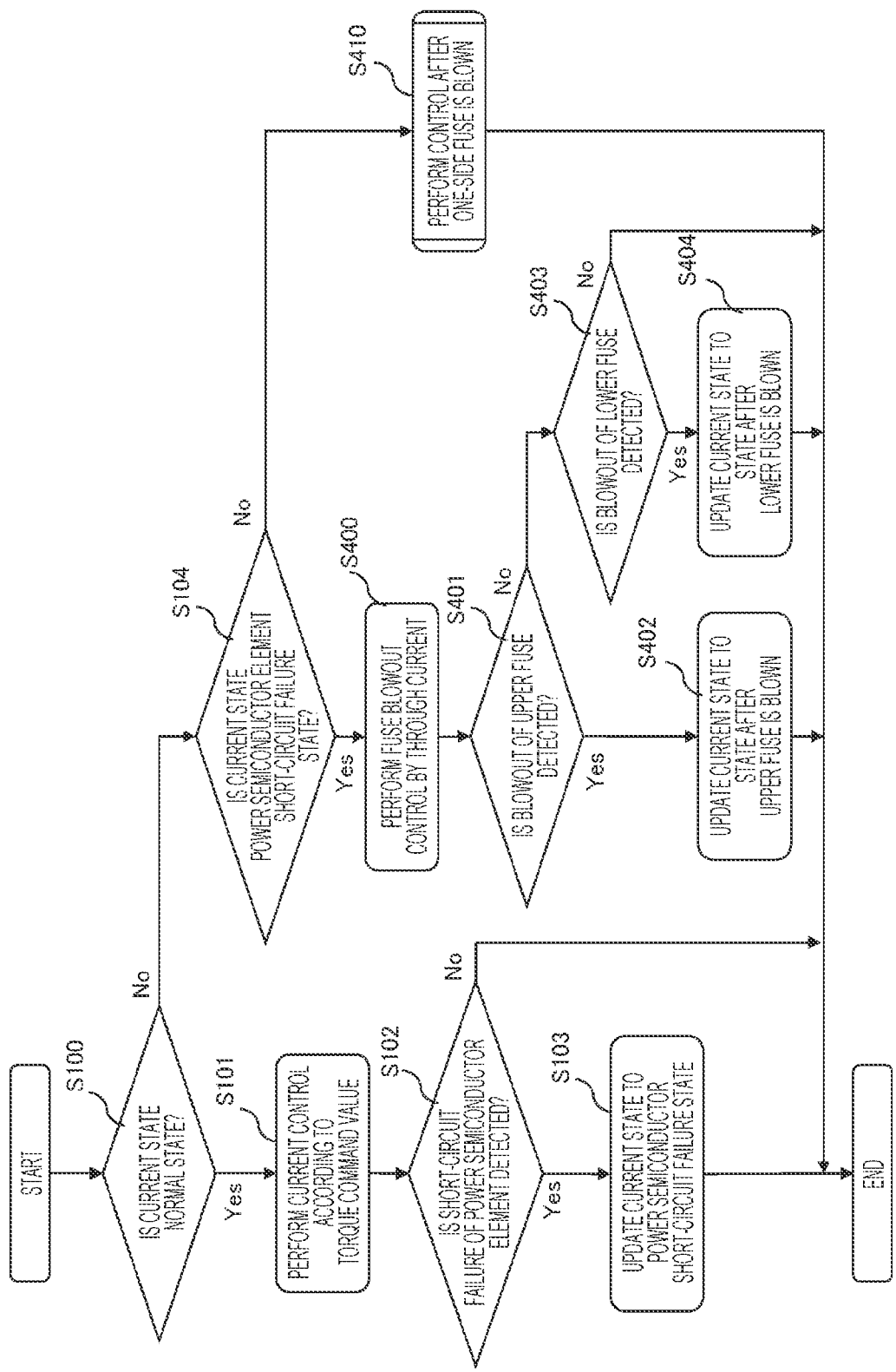
FIG. 21 illustrates an example of a control flowchart.
Figure 22:
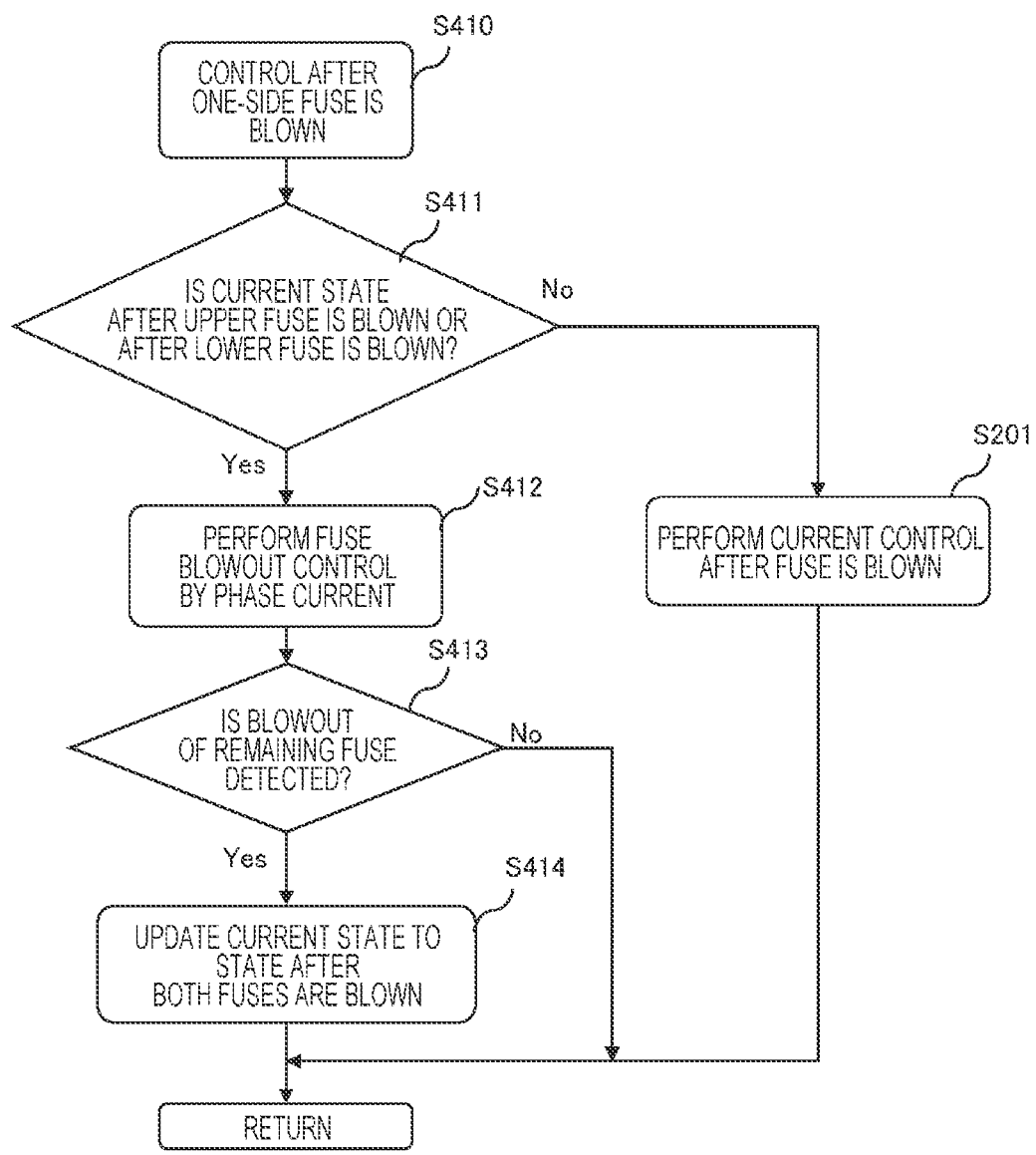
FIG. 22 illustrates an example of the control flowchart.

FIGS. 21 and 22 are examples of a control flowchart in the present embodiment. In the present embodiment, the control circuit 10 illustrated in FIG. 19 periodically performs the control of FIGS. 21 and 22 at regular intervals. In FIGS. 21 and 22, the same reference signs as those in FIG. 14 are given to portions where the same processes as those in the control flowchart of FIG. 14 described in the second embodiment are performed, and the description of those processes is omitted.

In the present embodiment, in the processing of Step S104, when the internal state 194a is the "power semiconductor element short-circuit failure state", the process proceeds to Step S400, and when the internal state is other than the "power semiconductor element short-circuit failure state", the process proceeds to Step S410.

In the processing of Step S400, the control circuit 10 performs the fuse blowout control using a through current. More specifically, as described above, the fuse blowout-time target current calculation unit 144 sets the target current value 142a for each phase and the neutral point to 0 [A]

based on the short-circuit failure location information 17a and the internal state 194a. Then, the fuse blowout-time current control unit 154 generates the duty value 154a of each phase and the neutral point according to the target current 144a, and generates the duty value 154a so that the power semiconductor elements 32 of the arms on the upper and lower opposite sides in the same phase as that of the power semiconductor element 32 in which the short-circuit failure has occurred are turned on. The PWM signal generation unit 164 generates a PWM signal 164a based on the duty values 154a of each phase and the neutral point, and outputs the PWM signal 164a to the driver circuit 20. As a result, a through current flows through each of the power semiconductor elements 32 determined to be a short-circuit failure location by the short-circuit failure location determination unit 17 and the power semiconductor elements 32 of the arms on the upper and lower opposite sides in the same phase as that of the power semiconductor elements 32, and the driving of each power semiconductor element 32 of the failure phase is controlled so that the through current becomes equal to or more than the fuse rated current.

Next, in the processing of Step S401, the fuse blowout determination unit 184 uses the current of the failure phase obtained by smoothing the AC current sensor value 50a with respect to the phase current of the failure phase to perform the fuse blowout determination at the time of the fuse blowout control by the through current, and determines whether or not the fuse 60 on the upper arm side of the failure phase is detected. More specifically, as described above, when the smoothed current value of the failure phase is a negative value and a state in which the magnitude of the current value is equal to or more than a predetermined threshold is maintained for a predetermined time or more, it is determined that the upper arm fuse of the failure phase is blown. When the blowout of the upper arm fuse is detected, the upper fuse blowout signal is output, and then the process proceeds to Step S402. When the blowout of the fuse 60 on the upper arm side is not detected, the process proceeds to Step S403.

In the processing of Step S402, the state determination unit 194 determines that the current state of the power conversion device 100 is the "state after upper fuse is blown" and updates the internal state 194a. After executing the processing of Step S402, the control circuit 10 ends the control flowcharts of FIGS. 21 and 22.

In the processing of Step S403, the fuse blowout determination unit 184 uses the current of the failure phase obtained by smoothing the AC current sensor value 50a with respect to the phase current of the failure phase to perform the fuse blowout determination at the time of the fuse blowout control by the through current, and determines whether or not the fuse 60 on the lower arm side of the failure phase is detected. More specifically, as described above, when the smoothed current value of the failure phase is a positive value and a state in which the magnitude of the current value is equal to or more than a predetermined threshold is maintained for a predetermined time or more, it is determined that the lower arm fuse of the failure phase is blown. When the blowout of the lower arm fuse 60 is detected, the lower fuse blowout signal is output, and then the process proceeds to Step S404.

In the processing of Step S404, the state determination unit 194 determines that the current state of the power conversion device 100 is the "state after lower fuse is blown" and updates the internal state 194a. After executing the processing of Step S404, the control circuit 10 ends the control flowcharts of FIGS. 21 and 22.

Meanwhile, when the blowout of the fuse 60 on the lower arm side is not detected, the control circuit 10 does not execute the processing of Step S404, and ends the control flowcharts of FIGS. 21 and 22. In this case, the fuse blowout determination unit 184 does not output the fuse blowout determination signal 184a, and the state determination unit 194 maintains the internal state 194a in the "power semiconductor element short-circuit failure state".

When it is determined in Step S104 that the internal state 194a output from the state determination unit 194 is not the "power semiconductor element short-circuit failure state", that is, when the internal state 194a is any one of the "state after upper fuse is blown", the "state after lower fuse is blown", and the "state after both fuses are blown", the control circuit 10 performs, in Step S410, control after one-side fuse is blown illustrated in FIG. 22.

In the control after one-side fuse is blown of FIG. 22, first, in the processing of Step S411, the control circuit 10 determines whether the internal state 194a output from the state determination unit 194 is in the "state after upper fuse is blown" or the "state after lower fuse is blown". When the internal state 194a is either the "state after upper fuse is blown" or the "lower fuse blowout state", the process proceeds to Step S412. When the internal state 194a is not either the "upper fuse blowout state" or the "state after lower fuse is blown", that is, the internal state is the "state after both fuses are blown", the process proceeds to Step S201.

In the processing of Step S412, the control circuit 10 performs fuse blowout control using a phase current. More specifically, as in the second embodiment, the fuse blowout-time target current calculation unit 144 generates the target current value 144a for each phase and the neutral point based on the short-circuit failure location information 17a. Then, the fuse blowout-time current control unit 154 generates the duty value 154a of each phase and the neutral point according to the target current 144a, and generates the duty value 154a so that the power semiconductor elements 32 of the arms on the upper and lower opposite sides in the same phase as that of the power semiconductor element 32 in which the short-circuit failure has occurred are turned on. The PWM signal generation unit 164 generates a PWM signal 164a based on the duty values 154a of each phase and the neutral point, and outputs the PWM signal 164a to the driver circuit 20. As a result, the driving of the other power semiconductor elements 32 is controlled so that the phase current flowing through the fuse 60 of the arms on the upper and lower opposite sides to the fuse 60 whose blowout is detected in Step S401 or S403 in the failure phase becomes equal to or more than the fuse rated current.

Next, in the processing of Step S413, the fuse blowout determination unit 184 uses the current of the failure phase obtained from the AC current sensor value 50a with respect to the phase current of the failure phase to perform the fuse blowout determination at the time of the fuse blowout control by the phase current, and determines whether the blowout of the remaining fuses 60 of the failure phase has been detected. More specifically, as described above, when the state in which the absolute value of the current value of the failure phase is equal to or less than the predetermined threshold is maintained for a certain period of time or more, it is determined that the remaining fuses 60 are blown. When the blowout of the remaining fuses 60 in the failure phase is detected, the both fuses blowout signal is output, and then the process proceeds to Step S414.

In the processing of Step S414, the state determination unit 194 determines that the current state of the power conversion device 100 is the "state after both fuses are blown" and updates the internal state 194a. After executing the processing of Step S414, the control circuit 10 ends the control flowcharts of FIGS. 21 and 22.

Meanwhile, when the blowout of the remaining fuses 60 in the failure phase is not detected, the control circuit 10 does not execute the processing of Step S414, and ends the control flowcharts of FIGS. 21 and 22. In this case, the fuse blowout determination unit 184 does not output the fuse blowout determination signal 184a, and the state determination unit 194 maintains the internal state 194a in the "state after upper fuse is blown" or the "state after lower fuse is blown".

As described above, in the present embodiment, during the fuse blowout control, first, the power semiconductor elements 32 on the upper and lower opposite sides of the same phase as that of the power semiconductor element 32 in which the short-circuit failure has occurred are turned on, the fuse 60 in one of the upper and lower arms in the failure phase is blown by the through current, and then the fuse 60 remaining after the current is passed through the failure phase is blown by the phase current, so that both the fuses 60 in the upper and lower arms in the failure phase can be blown. After the fuse is blown, the motor 190 can be continuously driven as in the second embodiment.

Further, in the control method of the present embodiment, when the fuse 60 of one of the upper and lower arms of the failure phase is blown by the through current, the fuse 60 remaining in the failure phase is also heated by the through current, and the fuse can be blown by adding a small phase current. Therefore, the time for performing the fuse blowout control by the phase current can be shortened as compared with the second embodiment, and the heat generation of each power semiconductor element 32 of the normal phase by the fuse blowout control can be suppressed. In other words, in the control system of the second embodiment, when the power semiconductor element 32 of the normal phase has a high temperature, it is necessary to control the target current when the fuse is blown while suppressing the target current, and it takes time to fuse the fuse 60. Meanwhile, in the control method of the present embodiment, even when the power semiconductor element 32 of the normal phase is at a high temperature, a large current can flow because the driving time of the power semiconductor element 32 of the normal phase is short. Therefore, the fuse 60 in the failure phase can be blown in a shorter time than in the second embodiment.

Fifth Embodiment

In the present embodiment, an example of the power conversion device 100 and the drive device 200 that are lower in cost and size and can continue driving of the motor 190 even after a short-circuit failure of the power semiconductor element 32 will be described.

Figure 23:
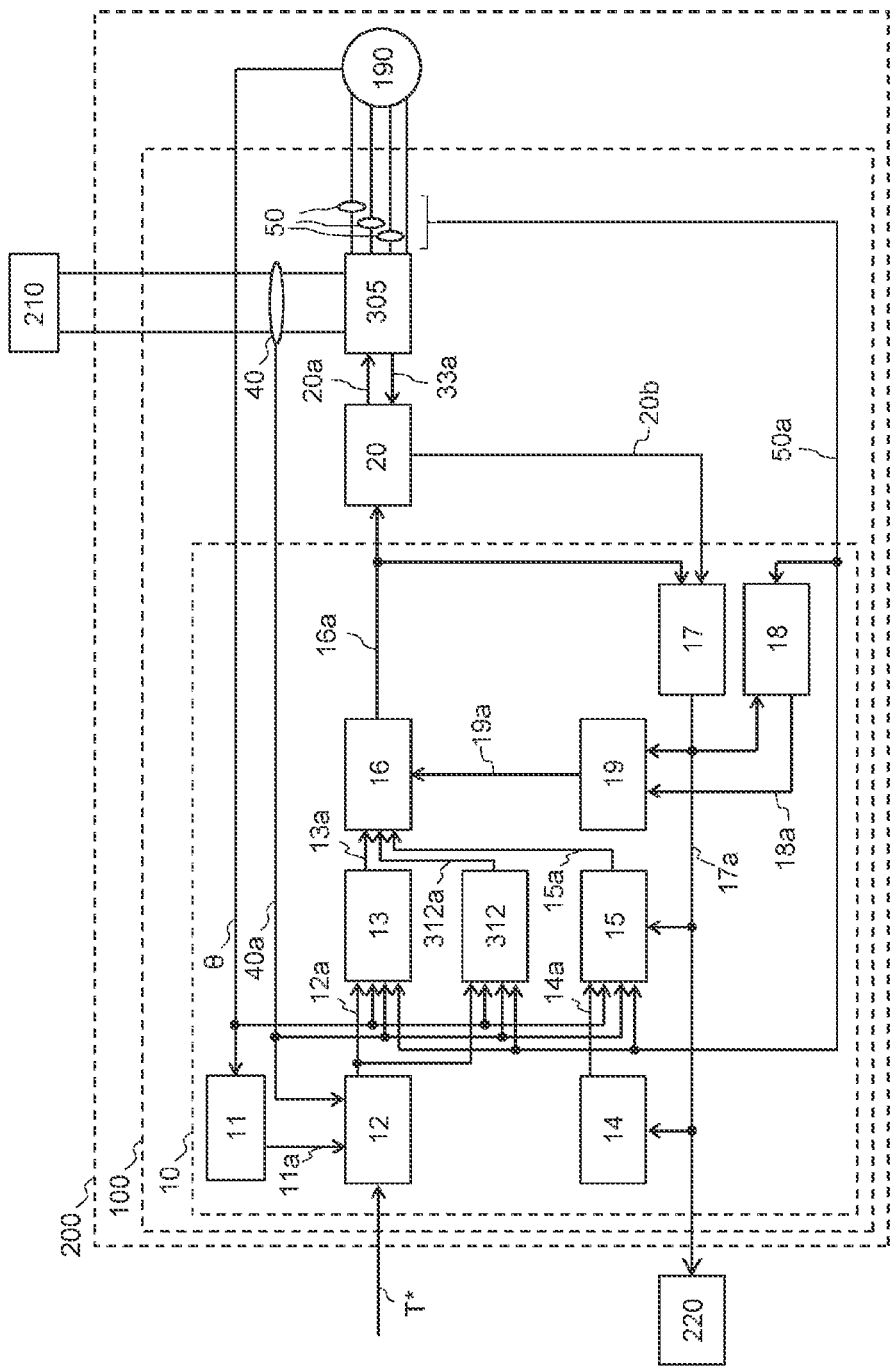
FIG. 23 illustrates a configuration example of the power conversion device 100 and the drive device 200.

FIG. 23 is a diagram illustrating a configuration example of the power conversion device 100 and the drive device 200 according to the present embodiment. The power conversion device 100 according to the present embodiment includes a power conversion circuit 305 having a configuration different from that of the power conversion circuit 302 according to the second embodiment. Description of components common to those in the first embodiment to fourth embodiment will be omitted.

Figure 24:
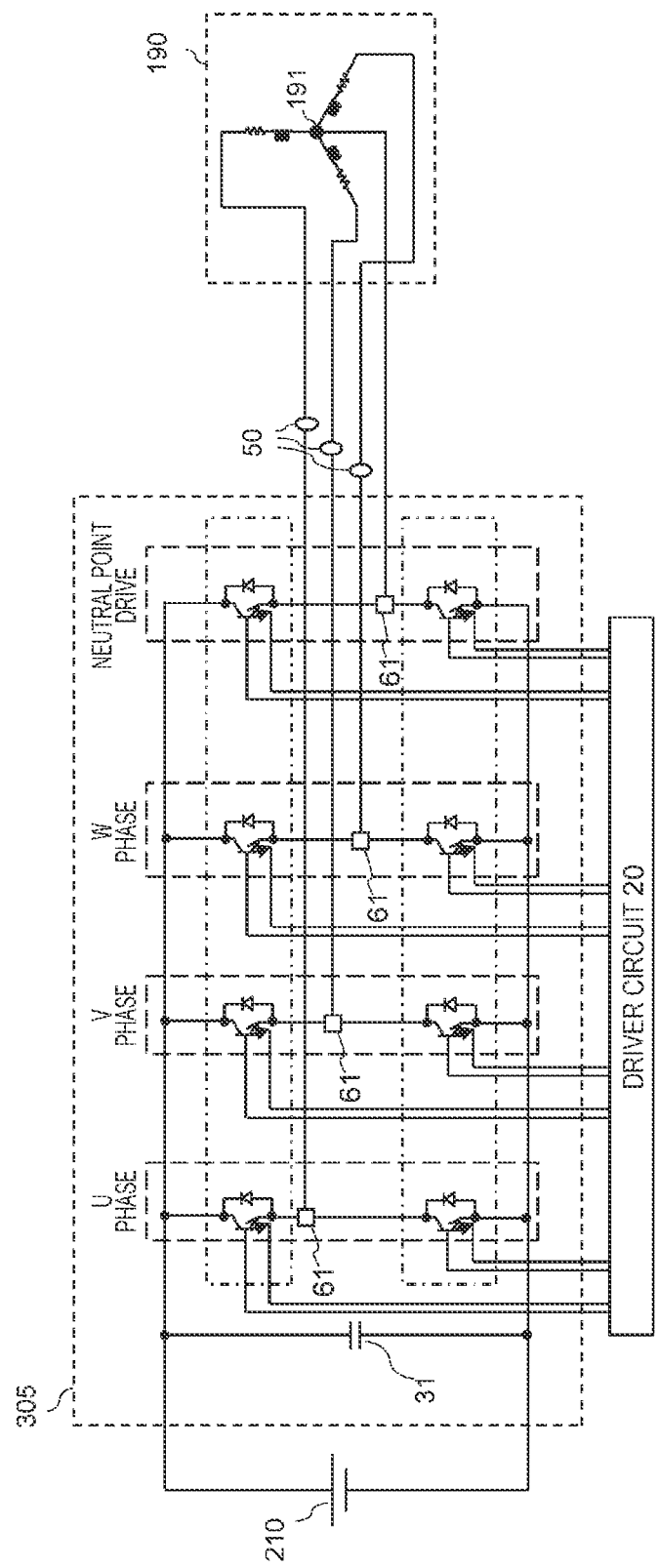
FIG. 24 illustrates a configuration example of a power conversion circuit 305 and the motor 190.

FIG. 24 is a diagram illustrating a configuration example of the power conversion circuit 305 and the motor 190 in the present embodiment. Similarly to the power conversion circuit 302 of the second embodiment, the power conversion circuit 305 of this example includes upper and lower arm circuits for driving the motor neutral point voltage connected to the neutral point 191 of the motor 190, in addition to the upper and lower arm circuits of each layer. Further, the power conversion circuit 305 of the present embodiment is different from the power conversion circuit 302 of the second embodiment in that a trifurcated fuse 61 is provided instead of the fuse 60 in each phase and in the upper and lower arm circuits for driving the motor neutral point voltage. The trifurcated fuse 61 is connected to the power semiconductor element 32 of the upper arm, the power semiconductor element 32 of the lower arm, and the output line of the motor 190 in each of the upper and lower arm circuits.

In the present embodiment, by configuring the power conversion circuit 305 as described above, it is possible to reduce the number of fuses, which is eight in the second embodiment, to four, which is half of the eight fuses. Therefore, it is possible to reduce the cost and size of the power conversion device 100 and the drive device 200 while having the ability to drive the motor 190 even after the short-circuit failure of the power semiconductor element 32.

As described in the first embodiment, also in the present embodiment, a bus bar, wire bonding, or the like blown when a certain current or more is applied may be used instead of the fuse.

Further, in the present embodiment, the example of the power conversion circuit 305 in which the fuse 60 is replaced with the trifurcated fuse 61 has been described based on the second embodiment, but the trifurcated fuse 61 of the present embodiment can be combined with the configuration of the power conversion circuit in another embodiment.

Sixth Embodiment

In the present embodiment, an example of the power conversion device 100 and the drive device 200 capable of blowing the fuse 60 at the failure location with higher accuracy in a short time and continuing driving of the motor 190 even after the fuse is blown at the time of a short-circuit failure of the power semiconductor element 32 will be described.

Figure 25:
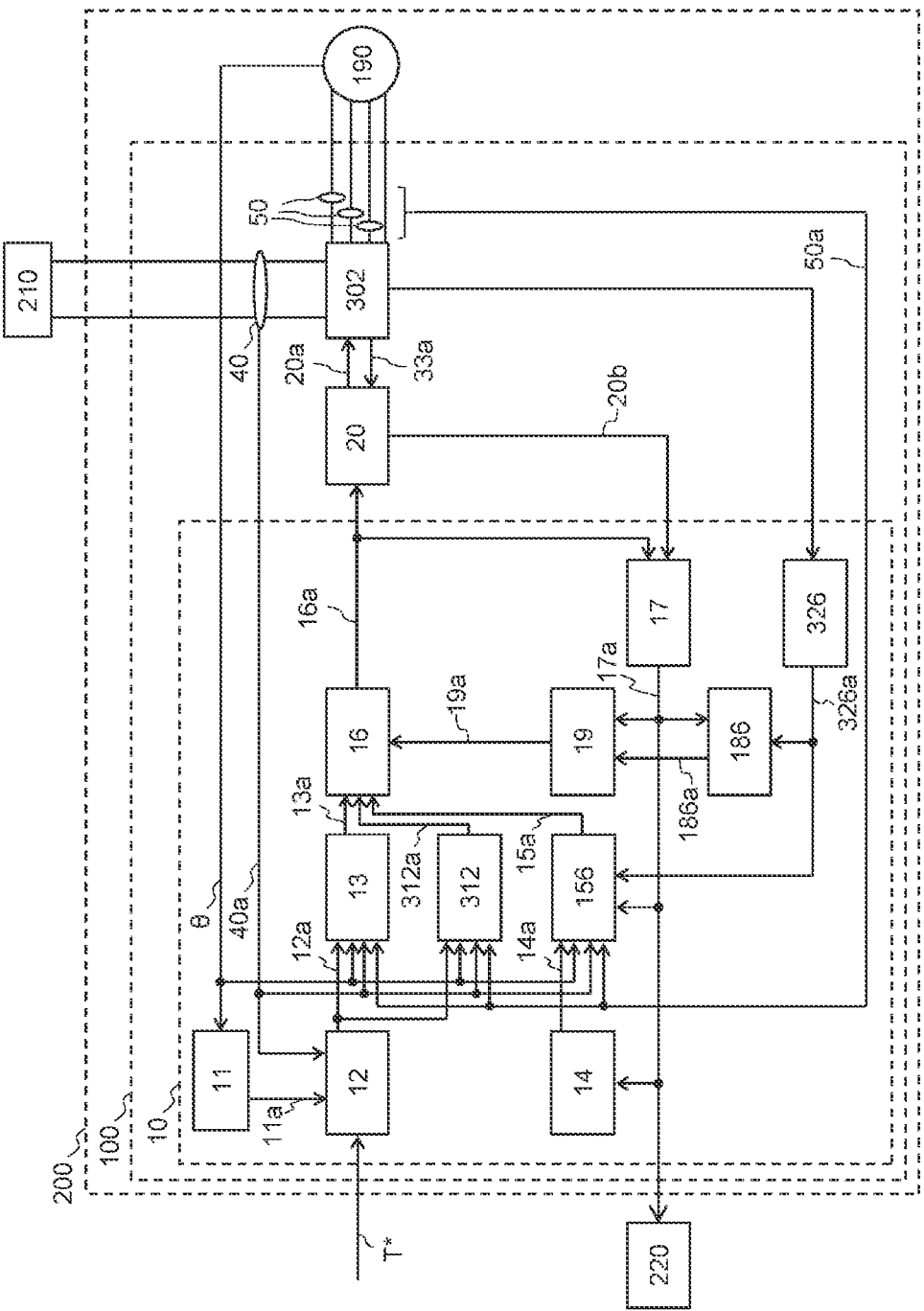
FIG. 25 illustrates a configuration example of the power conversion device 100 and the drive device 200.

FIG. 25 is a diagram illustrating a configuration example of the power conversion device 100 and the drive device 200 according to the present embodiment. A control circuit 10 in a power conversion device 1000 according to the present embodiment includes an output voltage detection unit 326 in addition to the functional blocks of the second embodiment. The fuse blowout-time current control unit 152 and the fuse blowout determination unit 18 of the second embodiment respectively have different fuse blowout-time current control units 156 and fuse blowout determination units 186. Description of components common to those in the first embodiment to fifth embodiment will be omitted.

The output voltage detection unit 326 measures the voltage output from the power conversion circuit 302 to the winding of each phase of the motor 190, and outputs a voltage value 326a of each phase based on the measurement result to the fuse blowout-time current control unit 156 and the fuse blowout determination unit 186.

The fuse blowout-time current control unit 156 of the present embodiment basically performs the same control as the fuse blowout-time current control unit 152 of the second embodiment. However, in the second embodiment, the output voltage of the failure phase is estimated from the location of the power semiconductor element 32 in which the short-circuit failure occurs, and the target voltage values of the normal two phases and the neutral point are calculated. However, in the present embodiment, the target voltage values of the normal two phases and the neutral point are calculated using the actual output voltage value 326a of the failure phase output by the output voltage detection unit 326. As a result, the influence of the voltage drop due to the bus bar or the like can be reflected in the target voltage value, and the current control when the fuse is blown can be performed with higher accuracy.

The fuse blowout determination unit 186 according to the present embodiment determines whether the fuse 60 is blown in the failure phase based on not the phase current but the output voltage value 326a of the failure phase output from the output voltage detection unit 326. As described above, the output voltage of the phase in which the short-circuit failure occurs in the power semiconductor element 32 of any one of the upper and lower arms is ½ Vdc when the short-circuit failure occurs in the power semiconductor element 32 of the upper arm and the power semiconductor element 32 of the lower arm is in the OFF state before the fuse 60 is blown, and is −½ Vdc when the short-circuit failure occurs in the power semiconductor element 32 of the lower arm and the power semiconductor element 32 of the upper arm is in the OFF state. In addition, when the short-circuit failure occurs in one of the power semiconductor elements 32 of the upper and lower arms and the other power semiconductor element 32 is in the ON state, the voltage Vdc becomes a value near ½ Vdc. Meanwhile, when the fuse 60 corresponding to the power semiconductor element 32 in which the short-circuit failure occurs is blown, the output voltage of the failure phase changes according to the position of the fuse 60.

Therefore, the fuse blowout determination unit 186 performs the fuse blowout determination by detecting a change in the output voltage of the failure phase from the output voltage value 326a. For example, when the short-circuit failure has occurred in the power semiconductor element 32 of the upper arm and the power semiconductor element 32 of the lower arm is in the OFF state, it can be determined that the upper arm fuse has been blown in a case where the output voltage of the failure phase has decreased from ½ Vdc to a certain threshold or less. Similarly, when the short-circuit failure occurs in the power semiconductor element 32 of the lower arm and the power semiconductor element 32 of the upper arm is in the OFF state, it can be determined that the lower arm fuse is blown when the output voltage of the failure phase increases from −½ Vdc to a certain threshold or more. Since the change in the output voltage is steeper than the change in the phase current, the fuse blowout determination can be made in a shorter time, and the motor drive control can be continued in a shorter time.

As described above, in the present embodiment, the output voltage value 326a of each phase output from the output voltage detection unit 326 is used for current control at the time of the fuse blowout and the fuse blowout determination, so that current control at the time of the fuse blowout can be performed with higher accuracy, and fuse blowout determination can be performed in a shorter time.

In the present embodiment, based on the second embodiment, examples of the fuse blowout-time current control unit 156 and the fuse blowout determination unit 186 that perform current control and fuse blowout determination at the time of the fuse blowout based on the output voltage value 326a output from the output voltage detection unit 326 are described. However, the output voltage detection unit 326, the fuse blowout-time current control unit 156, and the fuse blowout determination unit 186 of the present embodiment can be combined with other embodiments. In particular, in combination with the fourth embodiment in which the fuse blowout determination is complicated, the effect of shortening the time for the fuse blowout determination can be further increased.

Specifically, in the fuse blowout control by the through current performed in the fourth embodiment, when both the fuses 60 are not blown, the short-circuit failure occurs in one of the power semiconductor elements 32 of the upper and lower arms, and the other power semiconductor element 32 is turned on, so that the output voltage of the failure phase detected by the output voltage detection unit 326 has a value around 0 [V]. Meanwhile, when the upper arm fuse 60 is blown, the output voltage of the failure phase has a value around −½ Vdc, and when the lower arm fuse 60 is blown, the output voltage of the failure phase has a value around ½ Vdc. Therefore, in each processing of Steps S401 and S403 in the control flowcharts of FIGS. 21 and 22 described in the fourth embodiment, the fuse blowout determination can be performed by detecting these voltage changes in the output voltage of the failure phase detected by the output voltage detection unit 326. That is, in the processing of Step S403, the fuse blowout determination unit 186 can determine whether or not the voltage output from the power conversion circuit 302 to the winding of the failure phase and detected by the output voltage detection unit 326 is equal to or more than a predetermined threshold set to be more than 0 [V], and determine that the lower arm fuse of the failure phase is blown when the voltage is equal to or more than the threshold. In the processing of Step S401, the fuse blowout determination unit 186 can determine whether the voltage output from the power conversion circuit 302 to the winding of the failure phase and detected by the output voltage detection unit 326 is equal to or less than a predetermined threshold set to be less than 0 [V], and determine that the upper arm fuse of the failure phase is blown when the voltage is equal to or less than the threshold.

Seventh Embodiment

In the present embodiment, an example of the power conversion device 100 and the drive device 200 capable of blowing the fuse 60 at the failure location by more optimal control and continuing driving of the motor 190 even after the fuse is blown at the time of the short-circuit failure of the power semiconductor element 32 will be described.

Figure 26:
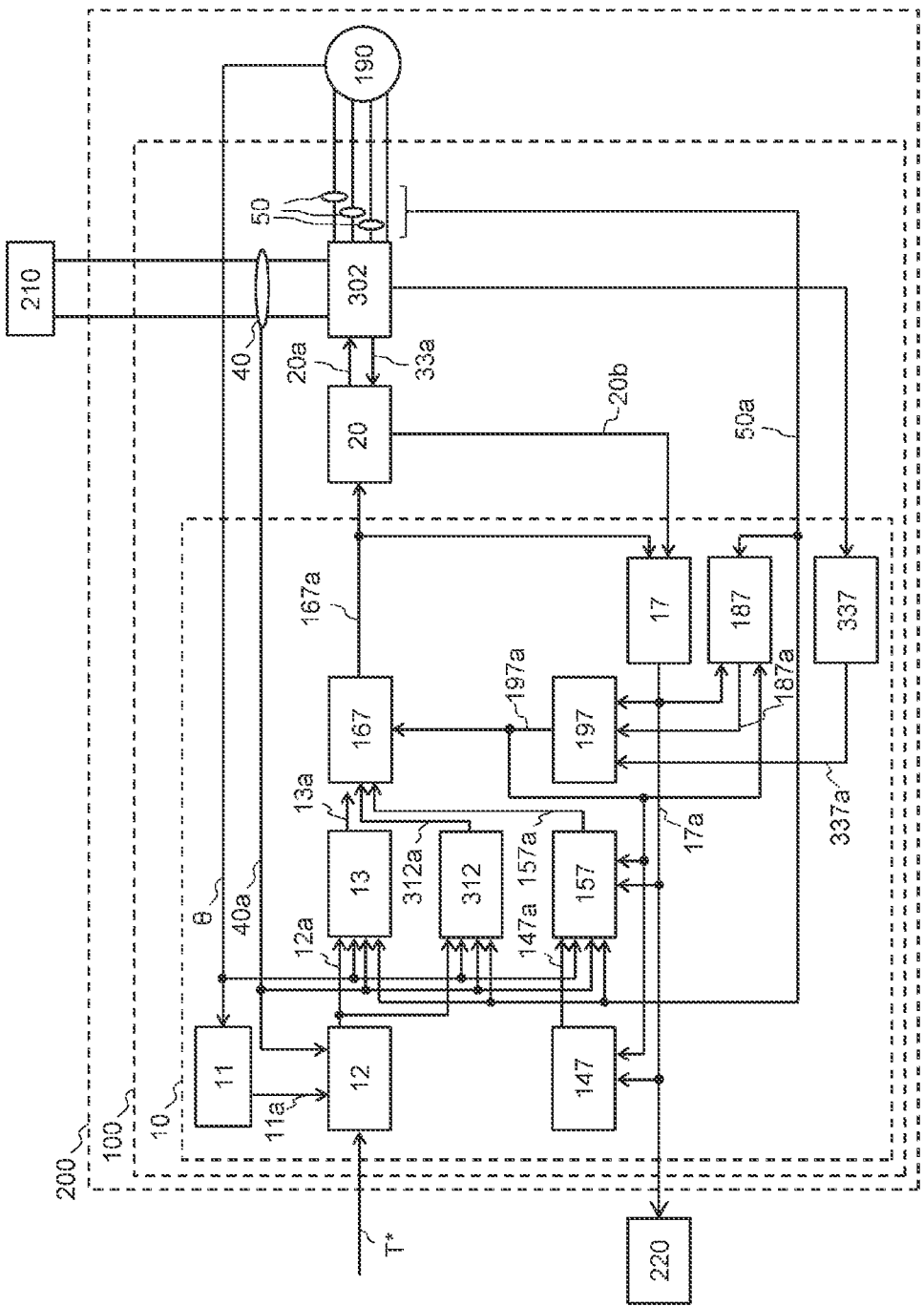
FIG. 26 illustrates a configuration example of the power conversion device 100 and the drive device 200.

FIG. 26 is a diagram illustrating a configuration example of the power conversion device 100 and the drive device 200 according to the present embodiment. The control circuit 10 in the power conversion device 100 according to the present embodiment includes a power semiconductor temperature calculation unit 337 in addition to the functional blocks of the fourth embodiment. Moreover, the control circuit 10 includes a fuse blowout-time target current calculation unit 147, a fuse blowout-time current control unit 157, a state determination unit 197, a fuse blowout determination unit 187, and a PWM signal generation unit 167 different from the fuse blowout-time target current calculation unit 144, the fuse blowout-time current control unit 154, the state determination unit 194, the fuse blowout determination unit 184, and the PWM signal generation unit 164 of the fourth embodiment. Description of components common to those in the first embodiment to sixth embodiment will be omitted.

The power semiconductor temperature calculation unit 337 measures the temperature of each power semiconductor element 32 in the power conversion circuit 302, and outputs a power semiconductor temperature 337a to the state determination unit 197 based on the measurement result.

The state determination unit 197 according to the present embodiment determines whether the state of the power conversion device 100 is any one of the "normal state", the "fuse blowout control state by through current", the "state after upper fuse is blown", the "state after lower fuse is blown", the "fuse blowout control state by phase current", and the "state after both fuses are blown" based on the short-circuit failure location information 17a of the power semiconductor element 32 output from the short-circuit failure location determination unit 17, the power semiconductor temperature 337a output from the power semiconductor temperature calculation unit 337, and the fuse blowout determination signal 187a output from the fuse blowout determination unit 187. Similarly to the fuse blowout determination signal 184a of the fourth embodiment, the fuse blowout determination signal 187a output from the fuse blowout determination unit 187 is any of the upper fuse blowout signal indicating blowout of the upper arm fuse, the lower fuse blowout signal indicating blowout of the lower arm fuse, and both fuses blowout signals indicating blowout of both the upper arm fuse and the lower arm fuse. The state determination unit 197 outputs the current state (197a) to the fuse blowout-time target current calculation unit 147, the fuse blowout-time current control unit 157, the PWM signal generation unit 167, and the fuse blowout determination unit 187.

FIG. 27 is a table illustrating the internal state determination of the state determination unit 197 in the present embodiment. The state determination unit 197 determines the next state from the current state and the occurrence matter at regular time intervals, and updates the next state to the current state. The initial state is the "normal state". First, in a case where the current state is the "normal state", when the short-circuit failure location information 17a on the power semiconductor element 32 is received from the short-circuit failure location determination unit 17, if the maximum temperature of the power semiconductor element 32 in the normal phase is equal to or more than a predetermined threshold, the state determination unit 197 changes the next state to the "control state after fuse blowout by through current". Meanwhile, when the short-circuit failure location information 17a on the power semiconductor element 32 is received from the short-circuit failure location determination unit 17, if the maximum temperature of the power semiconductor element 32 in the normal phase is less than the predetermined threshold, the next state is changed to a "control state after fuse blowout by phase current". Otherwise, the next state remains in the "normal state".

When receiving the upper fuse blowout signal as the fuse blowout determination signal 187a from the fuse blowout determination unit 187 while the current state is a "control state after fuse blowout by through current", the state determination unit 197 changes the next state to the "state after upper fuse is blown". When a lower fuse blowout signal is received as a fuse blowout determination signal 187a from the fuse blowout determination unit 187 while the current state is the "control state after fuse blowout by through current", the next state is changed to the "state after lower fuse is blown". Otherwise, the next state remains as the "control state after fuse blowout by through current".

When receiving the both fuses blowout signal as the fuse blowout determination signal 187a from the fuse blowout determination unit 187 while the current state is the "state after upper fuse is blown", the state determination unit 197 changes the next state to the "state after both fuses are blown". Otherwise, the next state remains the "state after upper fuse is blown".

When receiving the both fuses blowout signal as the fuse blowout determination signal 187a from the fuse blowout determination unit 187 while the current state is the "state after lower fuse is blown", the state determination unit 197 changes the next state to the "state after both fuses are blown". Otherwise, the next state remains the "state after lower fuse is blown".

When receiving the both fuses blowout signal as the fuse blowout determination signal 187a from the fuse blowout determination unit 187 while the current state is the "fuse blowout control state by phase current", the state determination unit 197 changes the next state to the "state after both fuses are blown". Otherwise, the next state remains the "fuse blowout control state by phase current".

When the current state is the "state after both fuses are blown", the state determination unit 197 keeps the next state as the "state after both fuses are blown".

The PWM signal generation unit 167 of the present embodiment switches the PWM signal 167a to be output to the driver circuit 20 according to the internal state 197a output from the state determination unit 197. When the internal state 197a is the "normal state", the PWM signal generation unit 167 generates the PWM signal 167a using the timer value and the duty value 13a of each phase output from the torque control-time current control unit 13, and outputs the PWM signal to the driver circuit 20. When the internal state 197a is one of the "fuse blowout control state by through current", the "state after upper fuse is blown", and the "state after lower fuse is blown", the PWM signal generation unit 167 generates the PWM signal 167a using the timer value and the duty value 157a of each phase and the motor neutral point output from the fuse blowout-time current control unit 157, and outputs the PWM signal to the driver circuit 20. When the internal state 197a is the "state after both fuses are blown", the PWM signal generation unit 167 generates the PWM signal 167a using the timer value and the duty value 312a of each phase and the motor neutral point output from the current control unit after fuse blowout 312, and outputs the PWM signal to the driver circuit 20.

Next, current control during fuse blowout control in the present embodiment will be described. The fuse blowout control of the present embodiment is divided into the following two patterns.

When the internal state 197a output from the state determination unit 197 is the "fuse blowout control state by through current", current control is performed in the same manner as the first-stage fuse blowout control (fuse blowout control by through current) in the fourth embodiment.

Meanwhile, when the internal state 197a output from the state determination unit 197 is any one of the "state after upper fuse is blown", the "state after lower fuse is blown", and the "fuse blowout control state by phase current", current control is performed in the same manner as the second-stage fuse blowout control (fuse blowout control by phase current) in the fourth embodiment.

Next, the fuse blowout determination in the present embodiment will be described. The fuse blowout determination unit 187 according to the present embodiment performs the fuse blowout determination by the following two types of methods according to the fuse blowout control performed in two patterns as described above.

When the internal state 197a output from the state determination unit 197 is the "fuse blowout control state by through current", a fuse blowout determination is made in the same manner as the first-stage fuse blowout determination (fuse blowout determination at the time of fuse blowout control by through current) in the fourth embodiment to determine whether the fuse 60 on the upper arm side has been blown or the fuse 60 on the lower arm side has been blown.

When the internal state 197a output from the state determination unit 197 is any one of the "state after upper fuse is blown", the "state after lower fuse is blown", and the "fuse blowout control state by phase current", the fuse blowout determination is performed in the same manner as the second-stage fuse blowout determination (fuse blowout determination at the time of fuse blowout control by phase current) in the fourth embodiment.

Figure 28:
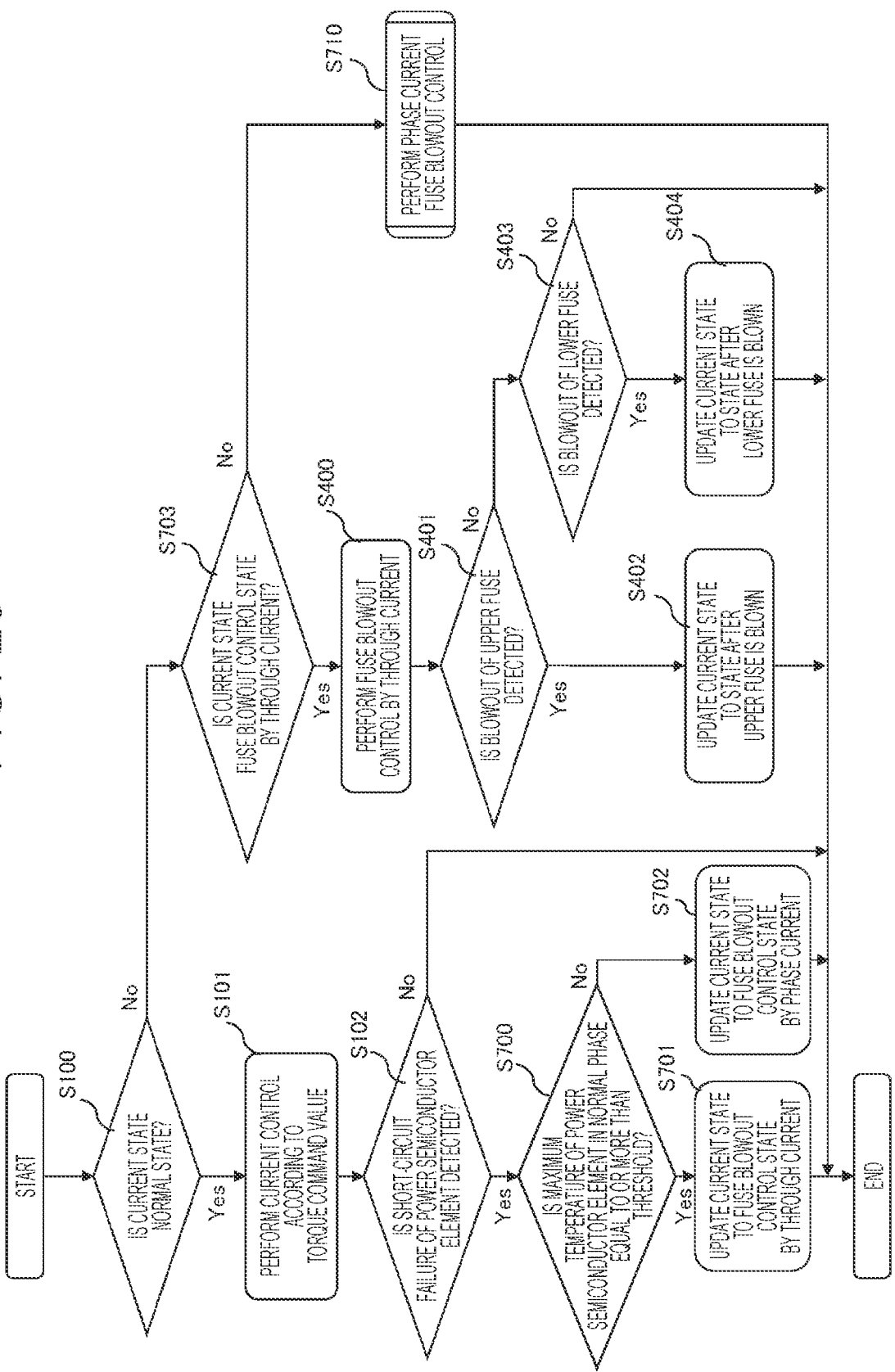
FIG. 28 illustrates an example of a control flowchart.
Figure 29:
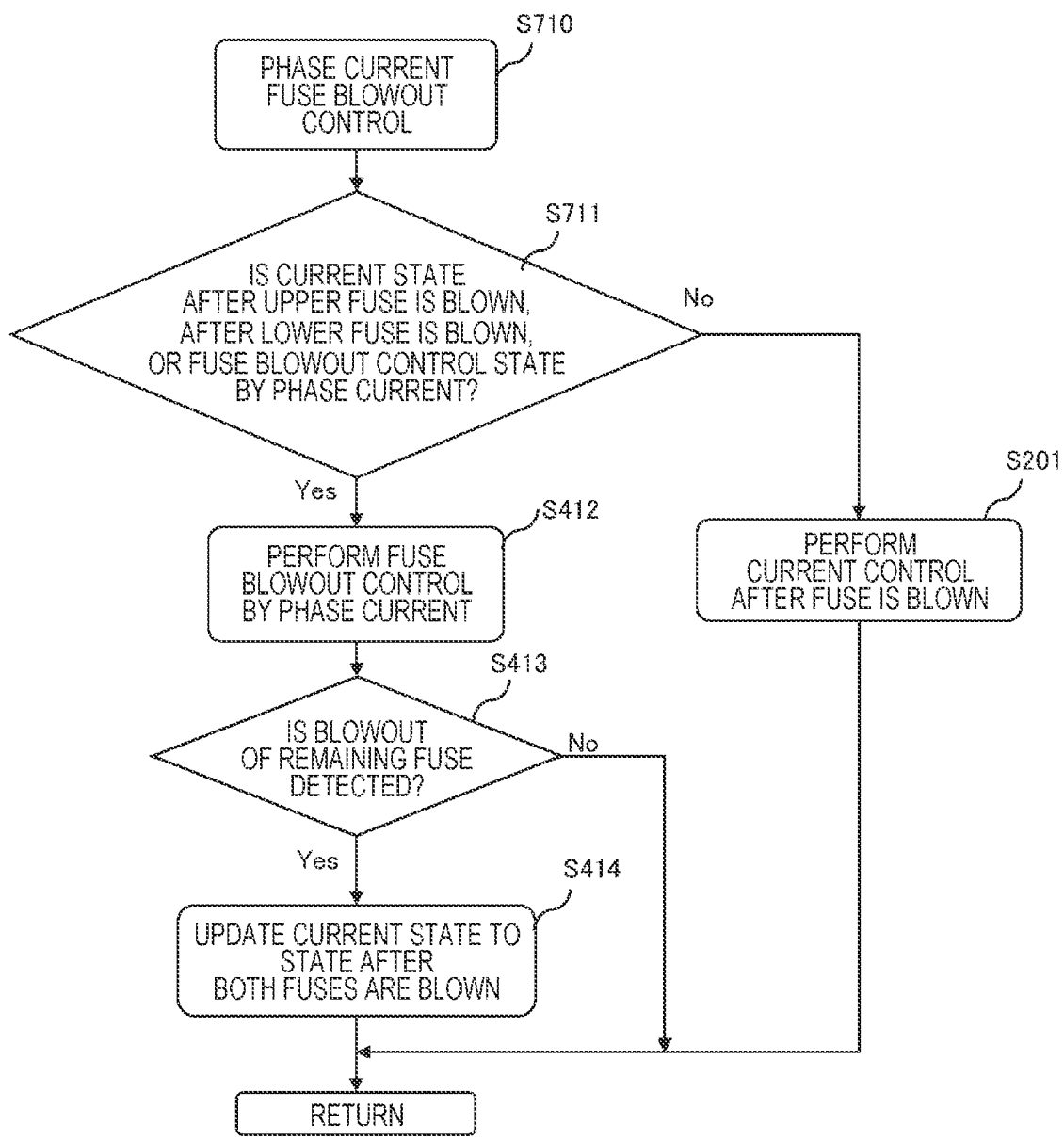
FIG. 29 illustrates an example of the control flowchart.

FIGS. 28 and 29 are examples of a control flowchart in the present embodiment. In the present embodiment, the control circuit 10 illustrated in FIG. 26 periodically performs the control of FIGS. 28 and 29 at regular intervals. Note that, in FIGS. 28 and 29, the same symbols as those in FIGS. 21 and 22 are denoted in portions where the same processes as those in the control flowcharts of FIGS. 21 and 22 described in the fourth embodiment are performed, and description of those processes is omitted.

In the present embodiment, in the processing of Step S100, when the internal state 197a is the "normal state", the process proceeds to Step S101, and when the internal state is other than the "normal state", the process proceeds to Step S703. In addition, in the processing of Step S102, in a case where the occurrence of the short-circuit failure in any of the power semiconductor elements 32 is detected, the process proceeds to Step S700.

In the processing of Step S700, the state determination unit 197 determines whether the maximum temperature of the power semiconductor element 32 of the normal phase is equal to or more than a predetermined threshold based on the short-circuit failure location information 17a output from the short-circuit failure location determination unit 17 and the power semiconductor temperature 337a output from the power semiconductor temperature calculation unit 337. In a case where the maximum temperature is equal to or more than the threshold value, the state determination unit 197 updates the internal state 197a to the "fuse blowout control state by through current" in the processing of Step S701. In a case where the maximum temperature is lower than the threshold value, the state determination unit 197 updates the internal state 197a to the "fuse blowout control state by phase current" in the processing of Step S702. After executing the processing of Step S701 or S702, the control circuit 10 ends the control flowcharts of FIGS. 28 and 29.

In the processing of Step S703, the control circuit 10 determines whether the internal state 197a is in the "fuse blowout control state by through current". The process proceeds to Step S400 when the internal state 197a is the "fuse blowout control state by through current", and the process proceeds to Step S710 when the internal state is other than the "fuse blowout control state by through current".

In Step S710, the control circuit 10 performs phase current fuse blowout control illustrated in FIG. 29. In the phase current fuse blowout control of FIG. 29, in the processing of Step S711, the control circuit 10 determines whether the internal state 197a output from the state determination unit 197 is any one of the "state after upper fuse is blown", the "state after lower fuse is blown", and the "fuse blowout control state by phase current". When the internal state 197a corresponds to any of these states, the process proceeds to Step S412, and when the internal state does not correspond to any of these states, that is, when the internal state 197a is the "state after both fuses are blown", the process proceeds to Step S201.

As described above, in the present embodiment, whether to perform the fuse blowout control by the through current or the fuse blowout control by the phase current is switched depending on whether the temperature of the power semiconductor element 32 of the normal phase is equal to or more than the threshold. As described in the effect of the fourth embodiment, in the method of blowing the fuse 60 in one of the upper and lower arms of the failure phase by the fuse blowout control using the through current, and then blowing the fuse 60 in which the failure phase remains by the phase current, the time for the fuse blowout control using the phase current is short, and the fuse in the failure phase can be blown in a short time even when the temperature of the power semiconductor element 32 in the normal phase is high. Meanwhile, when the fuse blowout control is performed by the through current, since both the fuses 60 of the upper and lower arms in the failure phase are blown, when the power semiconductor element 32 is at a low temperature, it may take more time to blow the fuse 60 than when the fuse 60 at the failure location is simply blown only by the phase current. Therefore, as in the present embodiment, when the power semiconductor element 32 of the normal phase has a high temperature, the fuses 60 of the upper and lower arms of the failure phase are blown by combining the fuse blowout control by the through current and the fuse blowout control by the phase current, and when the power semiconductor element 32 of the normal phase has a low temperature, only the fuse 60 at the failure location is blown by the fuse blowout control by the phase current, so that the fuse 60 can be blown in a shorter time.

According to each embodiment of the present invention described above, the following operational effects are obtained.

(1) The power conversion device 100 includes the power conversion circuits 30, 302, and 305 in which the upper and lower arm circuits in which the power semiconductor elements 32 as the switching elements are connected in series are connected in parallel for at least three phases, the plurality of fuses 60 and 61 that are connected in series with the power semiconductor elements 32 of the respective phases of the power conversion circuits 30, 302, 305 and blown at the predetermined rated current or more, a short-circuit failure location determination unit 17 that determines the short-circuit failure location of the power semiconductor element 32, and the fuse blowout-time current control units 15, 152, 153, 154, 156, 157 that controls the driving of another power semiconductor element 32 different from the power semiconductor element 32 such that a current flowing through the power semiconductor element 32 determined to be the short-circuit failure location by the short-circuit failure location determination unit 17 becomes equal to or more than the rated currents of the fuses 60 and 61. In this way, when the short-circuit failure occurs in the power semiconductor element 32 as the switching element, the fuses 60 and 61 at the failure location can be reliably blown.

(2) The fuse blowout-time current control unit 153 controls the power semiconductor element 32 of the phase different from the power semiconductor element 32 determined to be the short-circuit failure location such that a current flows through the winding of the motor 190 as a load to the power semiconductor element 32 of the phase different from the power semiconductor element 32 determined to be the short-circuit failure location, and switches the power semiconductor element 32 connected in series with the power semiconductor element determined to be the short-circuit failure location to the ON state (Step S300). In this way, the fuse 60 at the failure location can be blown in a short time.

(3) The power conversion circuit 302 includes the positive electrode-side wire connected to the positive electrode side of the DC power supply 210 and the negative electrode-side wire connected to the negative electrode side of the DC power supply 210. In the power conversion circuit 302, the upper and lower arm circuits of each phase are connected between the positive electrode-side wire and the negative electrode-side wire, and output lines connected to the windings of each phase of the motor 190 are connected between the power semiconductor element 32 of the upper arm and the power semiconductor element 32 of the lower arm. The plurality of fuses 60 include, in the upper and lower arm circuits of the respective phases, the upper arm fuse connected in series with the power semiconductor element 32 of the upper arm between the positive electrode-side wire and the output line, and the lower arm fuse connected in series with the power semiconductor element 32 of the lower arm between the negative electrode-side wire and the output line. The fuse blowout-time current control unit 154 sets the phase to which the power semiconductor element 32 determined to be the short-circuit failure location belongs as the failure phase, and turns on the power semiconductor element 32 connected in series with the power semiconductor element 32 determined to be the short-circuit failure location in the failure phase (Step S400). After either the upper arm fuse or the lower arm fuse of the failure phase is blown (Step S411: Yes), driving of another power semiconductor element 32 different from the power semiconductor element 32 determined to be the short-circuit failure location is controlled such that the current flowing through the other is equal to or more than the rated current of the fuse 60 (Step S412). In this way, both the fuses 60 of the upper and lower arms of the failure phase can be blown in a short time, and the driving of the motor 190 can be continued even after the fuse is blown.

(4) The power conversion device 100 includes the fuse blowout determination unit 184 that determines whether the fuse 60 is blown in the failure phase. When the current value obtained by smoothing the phase current flowing through the failure phase is a positive value and the state in which the magnitude of the current value is a predetermined threshold or more is maintained for a predetermined time or more, the fuse blowout determination unit 184 determines that the lower arm fuse of the failure phase is blown (Step S403). When the current value obtained by smoothing the phase current flowing through the failure phase is a negative value and a state in which the magnitude of the current value is equal to or more than the threshold value is maintained for a predetermined time or more, the fuse blowout determination unit determines that the upper arm fuse of the failure phase is blown (Step S401). In this manner, it is possible to reliably determine which the fuses of the upper and lower arms of the failure phase have been blown.

(5) The power conversion device 100 includes the output voltage detection unit 326 that measures the voltage output from the power conversion circuit 302 to the windings of each phase of the motor 190, and the fuse blowout determination unit 186 that determines whether the fuse 60 has been blown in a failure phase. When the voltage output from the power conversion circuit 302 to the winding of the failure phase is more than or equal to a predetermined first threshold value, for example, a threshold value set to be more than 0 [V], the fuse blowout determination unit 186 can determine that the lower arm fuse of the failure phase is blown (Step S403). When the voltage output from the power conversion circuit 302 to the winding of the failure phase is equal to or less than a predetermined second threshold smaller than the first threshold, for example, the threshold set to be smaller than 0 [V], it can be determined that the upper arm fuse of the failure phase is blown (Step S401). In this way, it is possible to determine which fuse of the upper and lower arms of the failure phase has been blown in a shorter time.

(6) In the processing of Step S400, while the power semiconductor element 32 connected in series with the power semiconductor element 32 determined as the short-circuit failure location is turned on, the fuse blowout-time current control unit 154 controls driving of the other power semiconductor elements 32 so as to cancel the induced voltage generated in the winding of each phase except for the failure phase of the motor 190 according to the target current value 142a of each phase and the neutral point set to 0 [A]. With this configuration, it is possible to suppress the heat generation of each power semiconductor element 32 of the normal phase and suppress the temperature rise thereof. Therefore, after one of the fuses 60 in the failure phase is blown, the current allowed to flow to each phase can be further increased, and the remaining fuses 60 in the failure phase can be blown in a shorter time.

(7) The power conversion circuit 302 includes the positive electrode-side wire connected to the positive electrode side of the DC power supply 210 and the negative electrode-side wire connected to the negative electrode side of the DC power supply 210. The upper and lower arm circuits of each phase are connected between the positive electrode-side wire and the negative electrode-side wire, and output lines connected to the windings of each phase of the motor 190 are connected between the power semiconductor element 32 of the upper arm and the power semiconductor element 32 of the lower arm. The plurality of fuses 60 include, in the upper and lower arm circuits of each phase, the upper arm fuse connected in series with the power semiconductor element 32 of the upper arm between the positive electrode-side wire and the output line, and the lower arm fuse connected in series with the power semiconductor element 32 of the lower arm between the negative electrode-side wire and the output line. When the temperature of another power semiconductor element 32 different from the power semiconductor element 32 determined to be the short-circuit failure location is less than the predetermined threshold (Step S700: No), the fuse blowout-time current control unit 157 sets the phase to which the power semiconductor element 32 determined to be the short-circuit failure location belongs as the failure phase, turns off the power semiconductor element 32 connected in series with the power semiconductor element 32 determined to be the short-circuit failure location in the failure phase, and controls driving of the power semiconductor element 32 of each phase except for the failure phase such that the current flowing through the power semiconductor element 32 determined to be the short-circuit failure location is equal to or more than the rated current of the fuse 60 (Step S702). When the temperature of the other power semiconductor element 32 different from the power semiconductor element 32 determined to be the short-circuit failure location is equal to or more than the threshold (Step S700: Yes), the power semiconductor element 32 connected in series with the power semiconductor element 32 determined to be the short-circuit failure location in the failure phase is turned on (Step S701), and after either the upper arm fuse or the lower arm fuse in the failure phase is blown (Step S711: Yes), driving of the other power semiconductor element 32 different from the power semiconductor element 32 determined to be the short-circuit failure location is controlled so that the current flowing through the other power semiconductor element becomes equal to or more than the rated current of the fuse 60 (Step S412). In this way, the fuses 60 of both the upper and lower arms of the failure phase can be blown in a shorter time, and the driving of the motor 190 can be continued even after the fuses are blown.

(8) In the upper and lower arm circuits of each phase, output lines connected to the windings of each phase of the motor 190 are connected between the power semiconductor element 32 of the upper arm and the power semiconductor element 32 of the lower arm. The plurality of fuses connected in series with the power semiconductor elements 32 of the respective phases include, in the upper and lower arm circuits of the respective phases, the trifurcated fuse 61 connected with the power semiconductor element 32 of the upper arm, the power semiconductor element 32 of the lower arm, and the output line. With this configuration, since the number of fuses can be reduced in the power conversion circuits 30, 302, and 305, cost reduction and miniaturization of the power conversion device 100 can be achieved.

The present invention is not limited to the above-described embodiments, and other forms conceivable within the scope of the technical idea of the present invention are also included within the scope of the present invention as long as the features of the present invention are not impaired. In addition, a part of the configuration of a certain embodiment may be replaced with the configuration of another embodiment, or the configuration of another embodiment may be added to the configuration of a certain embodiment.

REFERENCE SIGNS LIST 1 vehicle
2 driving wheel
3 non-driving wheel
4 axle
10 control circuit
11 motor speed calculation unit
11a motor speed value
12 torque control-time target current calculation unit
12a target current value
13 torque control-time current control unit
13a duty value
14, 142, 144, 147 fuse blowout-time target current calculation unit
14a, 142a, 144a, 147a target current value
15, 152, 153, 154, 156, 157 fuse blowout-time current control unit
15a, 152a, 153a, 154a, 156a, 157a duty value
16, 162, 164, 167 PWM signal generation unit
16a, 162a, 164a, 167a PWM signal
17 short-circuit failure location determination unit
17a short-circuit failure location information
18, 183, 184, 186, 187 fuse blowout determination unit
18a, 183a, 184a, 186a, 187a fuse blowout determination signal
19, 194, 197 state determination unit
19a, 194a, 197a internal state
20 driver circuit
20a drive signal
20b short-circuit failure detection signal
30, 302, 305 power conversion circuit
31 smoothing capacitor
32 power semiconductor element
33 sense terminal
33a sense current
40 voltage sensor
40a voltage sensor value
50 AC current sensor
50a AC current sensor value
60 fuse
61 trifurcated fuse
100 power conversion device
190 motor
191 motor neutral point
200 drive device
210 DC power supply
220 abnormality notification device
312 current control unit after fuse blowout
312a duty value
326 output voltage detection unit
337 power semiconductor temperature calculation unit

The invention claimed is:

1. A power conversion device comprising:
a power conversion circuit in which upper and lower arm circuits in which switching elements are connected in series are connected in parallel for at least three phases;
a plurality of fuses that are connected in series with the switching elements of the respective phases of the power conversion circuit and blown at a predetermined rated current or more;
a short-circuit failure location determination unit that determines a short-circuit failure location of the switching element; and
a fuse blowout-time current control unit that controls driving of another switching element different from the switching element so that a current flowing through the switching element determined to be the short-circuit failure location by the short-circuit failure location determination unit becomes equal to or more than the rated current of the fuse,
wherein the fuse blowout-time current control unit controls a switching element of a phase different from a phase of the switching element determined to be the short-circuit failure location such that a current flows through a load to the switching element of the phase different from the phase of the switching element determined to be the short-circuit failure location, and switches a switching element connected in series with the switching element determined to be the short-circuit failure location to an ON state.

2. The power conversion device according to claim 1,
wherein the power conversion circuit includes a positive electrode-side wire connected to a positive electrode side of a DC power supply and a negative electrode-side wire connected to a negative electrode side of the DC power supply,
the upper and lower arm circuits of the respective phases are connected between the positive electrode-side wire and the negative electrode-side wire, and output lines connected to windings of the respective phases of a motor are connected between the switching element of the upper arm and the switching element of the lower arm,
the plurality of fuses include an upper arm fuse connected in series with the switching element of the upper arm between the positive electrode-side wire and the output line and a lower arm fuse connected in series with the switching element of the lower arm between the negative electrode-side wire and the output line in the upper and lower arm circuits of each phase, and the fuse blowout-time current control unit sets a phase to which the switching element determined to be the short-circuit failure location belongs as a failure phase, and turns on the switching element connected in series with the switching element determined to be the short-circuit failure location in the failure phase, and controls driving of another switching element different from the switching element determined to be the short-circuit failure location such that a current flowing through the other is equal to or more than a rated current of the fuse after any one of the upper arm fuse and the lower arm fuse of the failure phase is blown.

3. The power conversion device according to claim 2, further comprising a fuse blowout determination unit that determines whether the fuse is blown in the failure phase, wherein the fuse blowout determination unit determines that the lower arm fuse of the failure phase is blown when a current value obtained by smoothing a phase current flowing through the failure phase is a positive value, and a state in which a magnitude of the current value is a predetermined threshold or more is maintained for a predetermined time or more, and determines that the upper arm fuse of the failure phase is blown when the current value obtained by smoothing the phase current flowing through the failure phase is a negative value, and a state in which the magnitude of the current value is the threshold or more is maintained for the predetermined time or more.

4. The power conversion device according to claim 2, further comprising:

an output voltage detection unit that measures a voltage output from the power conversion circuit to the winding of each phase of the motor; and a fuse blowout determination unit that determines whether the fuse is blown in the failure phase, wherein the fuse blowout determination unit determines that the lower arm fuse of the failure phase is blown when the voltage output from the power conversion circuit to the winding of the failure phase is a predetermined first threshold or more, and determines that the upper arm fuse of the failure phase is blown when the voltage output from the power conversion circuit to the winding of the failure phase is equal to or less than a predetermined second threshold smaller than the first threshold.

5. The power conversion device according to claim 2, wherein the fuse blowout-time current control unit controls driving of the other switching elements so as to cancel an induced voltage generated in a winding of each phase except for the failure phase of the motor while a switching element connected in series with a switching element determined to be the short-circuit failure location is turned on.

6. The power conversion device according to claim 1, wherein the power conversion circuit includes a positive electrode-side wire connected to a positive electrode side of a DC power supply and a negative electrode-side wire connected to a negative electrode side of the DC power supply, the upper and lower arm circuits of the respective phases are connected between the positive electrode-side wire and the negative electrode-side wire, and output lines connected to windings of the respective phases of a motor are connected between the switching element of the upper arm and the switching element of the lower arm, the plurality of fuses include an upper arm fuse connected in series with the switching element of an upper arm between the positive electrode-side wire and the output line and a lower arm fuse connected in series with the switching element of a lower arm between the negative electrode-side wire and the output line in the upper and lower arm circuits of each phase, when a temperature of another switching element different from the switching element determined to be the short-circuit failure location is less than a predetermined threshold, the fuse blowout-time current control unit sets a phase to which the switching element determined to be the short-circuit failure location belongs as a failure phase, turns off the switching element connected in series with the switching element determined to be the short-circuit failure location in the failure phase, and controls driving of the switching element of each phase except for the failure phase such that a current flowing through the switching element determined to be the short-circuit failure location becomes equal to or more than a rated current of the fuse, and when a temperature of another switching element different from the switching element determined to be the short-circuit failure location is equal to or more than the threshold, the fuse blowout-time current control unit turns on the switching element connected in series with the switching element determined to be the short-circuit failure location in the failure phase, and after any one of the upper arm fuse and the lower arm fuse in the failure phase is blown, the fuse blowout-time current control unit controls driving of the other switching element different from the switching element determined to be the short-circuit failure location such that a current flowing through the other becomes equal to or more than a rated current of the fuse.

7. The power conversion device according to claim 1, wherein in the upper and lower arm circuits of the respective phases, output lines connected to windings of the respective phases of a motor are respectively connected between the switching element of the upper arm and the switching element of the lower arm, and the plurality of fuses include trifurcated fuses respectively connected to the switching element of the upper arm, the switching element of the lower arm, and the output line in the upper and lower arm circuits of the respective phases.

8. A drive device comprising:

a power conversion device that outputs a three-phase alternating current; and a rotating electrical machine that is driven by the three-phase alternating current, wherein the power conversion device includes a power conversion circuit in which upper and lower arm circuits in which switching elements are connected in series are connected in parallel for at least three phases, a plurality of fuses that are connected in series with the switching elements of the respective phases of the power conversion circuit and blown at a predetermined rated current or more, a short-circuit failure location determination unit that determines a short-circuit failure location of the switching element, and a fuse blowout-time current control unit that controls driving of another switching element different from the switching element so that a current flowing through the switching element determined to be the short-circuit failure location by the short-circuit failure location determination unit becomes equal to or more than the rated current of the fuse,
wherein the fuse blowout-time current control unit controls a switching element of a phase different from a phase of the switching element determined to be the short-circuit failure location such that a current flows through a load to the switching element of the phase different from the phase of the switching element determined to be the short-circuit failure location, and switches a switching element connected in series with the switching element determined to be the short-circuit failure location to an ON state.

9. The drive device according to claim 8,
wherein the power conversion circuit includes a positive electrode-side wire connected to a positive electrode side of a DC power supply and a negative electrode-side wire connected to a negative electrode side of the DC power supply, the upper and lower arm circuits of the respective phases are connected between the positive electrode-side wire and the negative electrode-side wire, and output lines connected to windings of the respective phases of the rotating electrical machine are connected between the switching element of the upper arm and the switching element of the lower arm,
the plurality of fuses include an upper arm fuse connected in series with the switching element of the upper arm between the positive electrode-side wire and the output line and a lower arm fuse connected in series with the switching element of the lower arm between the negative electrode-side wire and the output line in the upper and lower arm circuits of each phase, and
the fuse blowout-time current control unit
sets a phase to which the switching element determined to be the short-circuit failure location belongs as a failure phase, and turns on the switching element connected in series with the switching element determined to be the short-circuit failure location in the failure phase, and
controls driving of another switching element different from the switching element determined to be the short-circuit failure location such that a current flowing through the other is equal to or more than a rated current of the fuse after any one of the upper arm fuse and the lower arm fuse of the failure phase is blown.

10. The drive device according to claim 9, further comprising a fuse blowout determination unit that determines whether the fuse is blown in the failure phase,
wherein the fuse blowout determination unit determines that the lower arm fuse of the failure phase is blown when a current value obtained by smoothing a phase current flowing through the failure phase is a positive value, and a state in which a magnitude of the current value is a predetermined threshold or more is maintained for a predetermined time or more, and
determines that the upper arm fuse of the failure phase is blown when the current value obtained by smoothing the phase current flowing through the failure phase is a negative value, and a state in which the magnitude of the current value is the threshold or more is maintained for the predetermined time or more.

11. The drive device according to claim 9, further comprising:
an output voltage detection unit that measures a voltage output from the power conversion circuit to the winding of each phase of the rotating electrical machine; and
a fuse blowout determination unit that determines whether the fuse is blown in the failure phase,
wherein the fuse blowout determination unit
determines that the lower arm fuse of the failure phase is blown when the voltage output from the power conversion circuit to the winding of the failure phase is a predetermined first threshold or more, and
determines that the upper arm fuse of the failure phase is blown when the voltage output from the power conversion circuit to the winding of the failure phase is equal to or less than a predetermined second threshold smaller than the first threshold.

12. The drive device according to claim 9,
the fuse blowout-time current control unit controls driving of the other switching elements so as to cancel an induced voltage generated in a winding of each phase except for the failure phase of the rotating electrical machine while a switching element connected in series with a switching element determined to be the short-circuit failure location is turned on.

13. The drive device according to claim 8,
wherein the power conversion circuit includes a positive electrode-side wire connected to a positive electrode side of a DC power supply and a negative electrode-side wire connected to a negative electrode side of the DC power supply,
the upper and lower arm circuits of the respective phases are connected between the positive electrode-side wire and the negative electrode-side wire, and output lines connected to windings of the respective phases of the rotating electrical machine are connected between the switching element of the upper arm and the switching element of the lower arm,
the plurality of fuses include an upper arm fuse connected in series with the switching element of an upper arm between the positive electrode-side wire and the output line and a lower arm fuse connected in series with the switching element of a lower arm between the negative electrode-side wire and the output line in the upper and lower arm circuits of each phase,
when a temperature of another switching element different from the switching element determined to be the short-circuit failure location is less than a predetermined threshold, the fuse blowout-time current control unit sets a phase to which the switching element determined to be the short-circuit failure location belongs as a failure phase, turns off the switching element connected in series with the switching element determined to be the short-circuit failure location in the failure phase, and controls driving of the switching element of each phase except for the failure phase such that a current flowing through the switching element determined to be the short-circuit failure location becomes equal to or more than a rated current of the fuse, and
when a temperature of another switching element different from the switching element determined to be the short-circuit failure location is equal to or more than the threshold, the fuse blowout-time current control unit turns on the switching element connected in series with the switching element determined to be the short-circuit failure location in the failure phase, and after any one of the upper arm fuse and the lower arm fuse in the failure phase is blown, the fuse blowout-time current control unit controls driving of the other switching element different from the switching element determined to be the short-circuit failure location such that a current flowing through the other becomes equal to or more than a rated current of the fuse.

14. The drive device according to claim 8,
wherein in the upper and lower arm circuits of the respective phases, output lines connected to windings of the respective phases of the rotating electrical machine are respectively connected between the switching element of the upper arm and the switching element of the lower arm, and the plurality of fuses include trifurcated fuses respectively connected to the switching element of the upper arm, the switching element of the lower arm, and the output line in the upper and lower arm circuits of the respective phases.

* * * * *